US012552806B2

(12) United States Patent
McKenna et al.

(10) Patent No.: US 12,552,806 B2
(45) Date of Patent: Feb. 17, 2026

(54) ANDROGEN RECEPTOR REGULATION BY SMALL MOLECULE ENANTIOMERS

(71) Applicant: University of Southern California, Los Angeles, CA (US)

(72) Inventors: Charles E. McKenna, Los Angeles, CA (US); David B. Agus, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 132 days.

(21) Appl. No.: 17/913,126

(22) PCT Filed: Mar. 22, 2021

(86) PCT No.: PCT/US2021/023512
§ 371 (c)(1),
(2) Date: Sep. 20, 2022

(87) PCT Pub. No.: WO2021/189051
PCT Pub. Date: Sep. 23, 2021

(65) Prior Publication Data
US 2023/0133119 A1 May 4, 2023
US 2024/0208985 A2 Jun. 27, 2024

Related U.S. Application Data

(60) Provisional application No. 62/992,668, filed on Mar. 20, 2020.

(51) Int. Cl.
C07D 491/08 (2006.01)

(52) U.S. Cl.
CPC .................. *C07D 491/08* (2013.01)

(58) Field of Classification Search
None
See application file for complete search history.

(56) References Cited

U.S. PATENT DOCUMENTS

| | | | |
|---|---|---|---|
| 4,559,157 A | 12/1985 | Smith et al. | |
| 4,608,392 A | 8/1986 | Jacquet et al. | |
| 4,820,508 A | 4/1989 | Wortzman | |
| 4,938,949 A | 7/1990 | Borch et al. | |
| 4,992,478 A | 2/1991 | Geria | |
| 7,141,578 B2 | 11/2006 | Salvati et al. | |
| 7,470,797 B2 | 12/2008 | Salvati et al. | |
| 7,517,904 B2 | 4/2009 | Salvati et al. | |
| 7,655,689 B2 | 2/2010 | Salvati et al. | |
| 9,205,102 B2 | 12/2015 | Gleave et al. | |
| 11,274,078 B2 * | 3/2022 | Shi | C07D 295/033 |
| 2002/0173445 A1 | 11/2002 | Salvati et al. | |
| 2004/0077605 A1 | 4/2004 | Salvati et al. | |
| 2005/0119228 A1 | 6/2005 | Salvati et al. | |
| 2006/0264459 A1 | 11/2006 | Salvati et al. | |
| 2008/0214643 A1 | 9/2008 | Salvati et al. | |
| 2010/0256180 A1 | 10/2010 | Shan et al. | |
| 2010/0331324 A1 | 12/2010 | Norris et al. | |
| 2012/0238533 A1 | 9/2012 | Cleve et al. | |
| 2015/0157656 A1 | 6/2015 | Gleave et al. | |

FOREIGN PATENT DOCUMENTS

| | | |
|---|---|---|
| EP | 3957633 A1 | 2/2022 |
| WO | 03062241 A1 | 7/2003 |
| WO | WO-2008157291 A2 | 12/2008 |
| WO | 2008157291 A3 | 3/2009 |
| WO | 2011029782 A1 | 3/2011 |
| WO | WO-2012047617 A1 | 4/2012 |
| WO | WO-2012067664 A1 | 5/2012 |
| WO | WO-2016057924 A1 | 4/2016 |
| WO | 2020211822 A1 | 10/2020 |
| WO | WO-2021189051 A1 | 9/2021 |

OTHER PUBLICATIONS

Database Registry Chemical Abstracts Service, Columbus, Ohio, Accession No. RN 406222-58-0, Entered STN: Apr. 19, 2002.*
Database Registry Chemical Abstracts Service, Columbus, Ohio, Accession No. RN 573738-99-5, Entered STN: Aug. 26, 2003.*
CAplus Registry Number: RN 573750-85-3. [Database Registry Chemical Abstracts Service, Columbus, Ohio, Accession No. RN 573750-85-3, Entered STN: Aug. 26, 2003] (Year: 2003).*
Attar et al., "Discovery of BMS-641988, a Novel and Potent Inhibitor of Androgen Receptor Signaling for the Treatment of Prostate Cancer," Cancer Res., 69(16):6522-6530, Aug. 2009.
Balog et al., "Discovery of BMS-641988, a Novel Androgen Receptor Antagonist for the Treatment of Prostate Cancer," ACS Med Chem Lett., 6(8):908-912, Jun. 2015.
Foster et al., "Drug Safety Is a Barrier to the Discovery and Development of New Androgen Receptor Antagonists," Prostate, 71(5):480-488, Apr. 2011.
Gavai et al., "Novel Androgen Receptor Antagonists for the Treatment of Prostate Cancer," Chap. 6, RSC Drug Discovery Series No. 4, Accounts in Drug Discovery: Case Studies in Medicinal Chemistry, Royal Society of Chemistry 2011, Published on Sep. 30, 2010.
Grasso et al., "The Mutational Landscape of Lethal Castration-Resistant Prostate Cancer," Nature, 487(7406):239-243, Jul. 2012.
International Search Report and Written Opinion of the ISA/US in PCT/US2021/023512, dated Aug. 5, 2021; 11pgs.
Moilanen et al., "Discovery of ODM-201, A New Generation Androgen Receptor Inhibitor Targeting Resistance Mechanisms to Androgen Signaling-Directed Prostate Cancer Therapies," Sci Rep., 5(12007):1-11; Jul. 2015.

(Continued)

*Primary Examiner* — Adam C Milligan
*Assistant Examiner* — Jed A Kucharczk
(74) *Attorney, Agent, or Firm* — WILSON SONSINI GOODRICH & ROSATI

(57) ABSTRACT

Herein is reported a class of chiral compounds with paradoxical effects on the androgen receptor (AR). The (R)-enantiomers behave like classical anti-androgens while the (S)-enantiomers activate AR signaling. In castration-resistant prostate cancer, the change during the course of therapy to growth in the presence of AR targeted therapeutics, a harbinger of progression to lethal disease, is commonly attributed to acquired mutations of the AR-ligand binding domain. This is the first report of an antagonist-agonist duality solely due to structural enantiomerism, without any modification to the AR binding site.

22 Claims, 12 Drawing Sheets

(56) References Cited

OTHER PUBLICATIONS

Patsch et al., "Paradoxical Androgen Receptor Regulation by Small Molecule Enantiomers," Proc Natl Acad Sci USA, 118(12):e2100918118, Mar. 2021.

Rathkopf et al., "Phase I Dose-Escalation Study of the Novel Antiandrogen BMS-641988 in Patients with Castration-Resistant Prostate Cancer," Clin Cancer Res., 17(4):880-888, Feb. 2011.

Salvati et al., "Identification and Optimization of a Novel Series of [2.2.1]-Oxabicyclo Imide-Based Androgen Receptor Antagonists," Bioorg Med Chem Lett., 18(6):1910-1915, Mar. 2008.

Partial Search Report and Written Opinion of the European Patent Office dated Nov. 17, 2023 in EP Application No. 21771481.5; 18pgs.

Patsch et al., "Abstract 5339: Paradoxical androgen receptor regulation by small molecule enantiomers", Cancer Res., vol. 80, No. 16, 5339, Aug. 2020.

Extended Search Report and Written Opinion of the European Patent Office dated Feb. 8, 2024 in EP Application No. 21771481.5; 15pgs.

Balbas, Minna D. et al. Overcoming mutation-based resistance to antiandrogens with rational drug design. Elife 2:e00499, 1-21 (2013).

Bambury, R. M. and Scher, H. I. Enzalutamide: Development from Bench to Bedside. Urologic oncology 33:(6)280-288 (2015).

Beretta, Giovanni L. and Nadia Zaffaroni. Androgen Receptor-Directed Molecular Conjugates for Targeting Prostate Cancer. Front Chem 7:369, 1-8 (2019).

Bisson, William H. et al. Molecular Basis of Agonicity and Antagonicity in the Androgen Receptor Studied by Molecular Dynamics Simulations. Journal of molecular graphics & modelling 27(4):452-458 (2008).

Bohl, Casey E. et al. Structural Basis for Accommodation of Nonsteroidal Ligands in the Androgen Receptor. The Journal of biological chemistry 280(45):37747-37754 (2005).

Bohl, Casey E. et al. Structural basis for antagonism and resistance of bicalutamide in prostate cancer. Proc Natl Acad Sci U S A 102(17):6201-6206 (2005).

Brinkmann Albert O. Molecular Mechanisms of Androgen Action—a Historical Perspective. Methods in Molecular Biology 776:3-24 (2011).

Chiu, Chi-Li et al. Intracellular kinetics of the androgen receptor shown by multimodal Image Correlation Spectroscopy (mICS). Scientific reports 6:22435, 1-13 (2016).

Clegg, Nicola J. et al. ARN-509: a novel antiandrogen for prostate cancer treatment. Cancer Res 72(6):1494-1503 (2012).

Duan, Mojie, et al. Structural Diversity of Ligand-Binding Androgen Receptors Revealed by Microsecond Long Molecular Dynamics Simulations and Enhanced Sampling. J. Chem. Theory Comput. 12(9):4611-4619 (2016). DOI: 10.1021/acs.jctc.6b00424.

Food and Drug Administration, HHS. International Conference on Harmonisation; Guidance on Q6A Specifications: Test Procedures and Acceptance Criteria for New Drug Substances and New Drug Products: Chemical Substances. Notice. Federal Register 65(251):83041-83063 (2000).

Friesner, Richard A. et al. Glide: a new approach for rapid, accurate docking and scoring. 1. Method and assessment of docking accuracy. J Med Chem 47(7):1739-1749 (2004).

Gao, Wenqing. et al. Chemistry and Structural Biology of Androgen Receptor. Chemical Reviews 105(9):3352-3370 (2005).

Hara, Takahito. et al. Novel Mutations of Androgen Receptor: a Possible Mechanism of Bicalutamide Withdrawal Syndrome. Cancer Research 63(1):149-153 (2003).

Hartig, Sean M. et al. Automated microscopy and image analysis for androgen receptor function. Methods in molecular biology 776:313-331 (2011).

Higano, Celestia. Enzalutamide, apalutamide, or darolutamide: are apples or bananas best for patients? Nature reviews. Urology 16(6):335-336 (2019).

Hodgson, MC. Structural Basis for Nuclear Receptor Corepressor Recruitment by Antagonist-liganded Androgen Receptor. Molecular Cancer Therapeutics 7(10):3187-3194 (2008).

Huber, Kilian V.M. et al. Stereospecific targeting of MTH1 by (S)-crizotinib as an anticancer strategy. Nature 508(7495):222-227 (2014).

Hughes, S. M. plater: Read, Tidy, and Display Data from Microtiter Plates. Journal of Open Source Software 1, 106.

Jiang, Yuqiu. et al. Detection of androgen receptor mutations in circulating tumor cells in castration-resistant prostate cancer. Clin Chem 56(9):1492-1495 (2010).

Joseph, James D. et al. A clinically relevant androgen receptor mutation confers resistance to second-generation antiandrogens enzalutamide and ARN-509. Cancer Discov 3(9):1020-1029 (2013).

Knights, Kathleen M. et al. In Vitro Drug Metabolism Using Liver Microsomes. Curr Protoc Pharmacol 74:7.8.1-7.8.24 (2016).

Kojetin, Douglas D, and Thomas P Burris. Small Molecule Modulation of Nuclear Receptor Conformational Dynamics: Implications for Function and Drug Discovery. Molecular pharmacology 83(1):1-8 (2013).

Korenchuk, Susan, et al. VCaP, a cell-based model system of human prostate cancer. In Vivo 15(2):163-168 (2001).

Kuil, CW et al. Ligand-induced Conformational Alterations of the Androgen Receptor Analyzed by Limited Trypsinization. Studies on the Mechanism of Antiandrogen Action. The Journal of biological chemistry 270(46):27569-27576 (1995).

Kunwittaya, Sarun. et al. Influence of logBB cut-off on the Prediction of Blood-brain Barrier Permeability. Biomedical and Applied Technology Journal 1:16-34 (2013).

Lin, Ann. et al. Off-target Toxicity is a Common Mechanism of Action of Cancer Drugs Undergoing Clinical Trials. Science Translational Medicine 11(509):eaaw8412 (2019).

Livak, K J, and T D Schmittgen. Analysis of relative gene expression data using real-time quantitative PCR and the 2(-Delta Delta C(T)) Method. Methods 25(4):402-408 (2001).

Madauss, Kevin P. et al. A structural and in vitro characterization of asoprisnil: a selective progesterone receptor modulator. Mol Endocrinol 21(5):1066-1081 (2007).

Marcelli, Marco, et al. Quantifying effects of ligands on androgen receptor nuclear translocation, intranuclear dynamics, and solubility. Journal of Cellular Biochemistry 98(4):770-788 (2006).

Marhefka, Craig A. et al. Design, Synthesis, and Biological Characterization of Metabolically Stable Selective Androgen Receptor Modulators. Journal of Medicinal Chemistry 47(4):993-998 (2004).

Matias, P.M. et al. Structural evidence for ligand specificity in the binding domain of the human androgen receptor. Implications for pathogenic gene mutations. The Journal of biological chemistry 275(34):26164-26171 (2000).

McDonald, Shawn, et al. Ligand responsiveness in human prostate cancer: Structural analysis of mutant androgen receptors from LNCaP and CWR22 tumors. Cancer Res 60:2317-2322 (2000).

Muthyala, Rajeev S. et al. Bridged bicyclic cores containing a 1,1-diarylethylene motif are high-affinity subtype-selective ligands for the estrogen receptor. J Med Chem 46(9):1589-1602 (2003).

Nagata, Naoya. et al. Subtle Structural Changes in Tetrahydroquinolines, a New Class of Nonsteroidal Selective Androgen Receptor Modulators, Induce Different Functions. Journal of chemical information and modeling 52(8):2257-2264 (2012).

Patsch, Katherin. et al. Image-Based Tracking of Heterogeneous Single-Cell Phenotypes. Methods in molecular biology 1745:47-63 (2018).

Patsch, Katherin. et al. Single cell dynamic phenotyping. Scientific reports 6:34785, 1-15 (2016).

PCT/US2021/023512 International Search Report and Written Opinion dated Aug. 5, 2021.

Perkins, James R. et al. ReadqPCR and NormqPCR: R packages for the reading, quality checking and normalisation of RT-qPCR quantification cycle (Cq) data. BMC Genomics 13:296, 1-8 (2012).

P'NG, Christine. et al. BPG: Seamless, automated and interactive visualization of scientific data. BMC Bioinformatics 20(1):42, 1-5 (2019).

R Core Team. R: A language and environment for statistical computing. R Foundation for Statistical Computing, URL https://www.R-project.org/. (2019).

(56) References Cited

OTHER PUBLICATIONS

Ritz, Christian. et al. Dose-Response Analysis Using R. PLos One 10(12):e0146021, 1-13 (2015).
Rydberg, Patrick. et al. SMARTCyp: A 2D Method for Prediction of Cytochrome P450-Mediated Drug Metabolism. ACS medicinal chemistry letters 1(3):96-100 (2010).
Sack, J.S. et al. Crystallographic structures of the ligand-binding domains of the androgen receptor and its T877A mutant complexed with the natural agonist dihydrotestosterone. Proceedings of the National Academy of Sciences of the United States of America 98(9):4904-4909 (2001).
Saitoh, Masayuki. et al. The presence of both the amino- and carboxyl-terminal domains in the AR is essential for the completion of a transcriptionally active form with coactivators and intranuclear compartmentalization common to the steroid hormone receptors: a three-dimensional imaging study. Molecular endocrinology 16(4):694-706 (2002).
Sakkiah, Sugunadevi. et al. Structural Changes Due to Antagonist Binding in Ligand Binding Pocket of Androgen Receptor Elucidated Through Molecular Dynamics Simulations. Frontiers in pharmacology 9:492, 1-13 (2018).
Scher, Howard I. et al. Increased survival with enzalutamide in prostate cancer after chemotherapy. The New England journal of medicine 367(13):1187-1197 (2012).
Smith, Matthew R. et al. Apalutamide Treatment and Metastasis-Free Survival in Prostate Cancer. The New England journal of medicine 378(15):1408-1418 (2018).
Steketee, Karine. et al. Broadened ligand responsiveness of androgen receptor mutants obtained by random amino acid substitution of H874 and mutation hot spot T877 in prostate cancer. Int J Cancer 100(3):309-317 (2002).
Sternberg, Cora N. Enzalutamide, an Oral Androgen Receptor Inhibitor for Treatment of Castration-45 Resistant Prostate Cancer. Future oncology 15(13):1437-1457 (2019).
Szafran, Adam T. et al. Androgen receptor functional analyses by high throughput imaging: determination of ligand, cell cycle, and mutation-specific effects. PloS one 3(11):e3605, 1-16 (2008).
Tan, J. et al. Dehydroepiandrosterone activates mutant androgen receptors expressed in the androgen-dependent human prostate cancer xenograft CWR22 and LNCaP cells. Mol Endocrinol 11(4):450-459 (1997).
Tan, M.H. Eileen. et al. Androgen receptor: Structure, Role in Prostate Cancer and Drug Discovery. Acta Pharmacologica Sinica 36(1):3-23 (2015). Published Online Jun. 9, 2014.
Tyagi, R.K. et al. Dynamics of intracellular movement and nucleocytoplasmic recycling of the ligand-activated androgen receptor in living cells. Molecular endocrinology 14(8):1162-1174 (2000).
Van Bokhoven, Adrie. et al. Molecular characterization of human prostate carcinoma cell lines. Prostate 57(3):205-225 (2003).
Vandesompele, Jo. et al. Accurate Normalization of Real-time Quantitative RT-PCR data by Geometric Averaging of Multiple Internal Control Genes. Genome biology 3(7):RESEARCH0034, 1-12 (2002).
Veldscholte, Jos. et al. A mutation in the ligand binding domain of the androgen receptor of human lNCaP cells affects steroid binding characteristics and response to anti-androgens. Biochemical and biophysical research communications 173(2):534-540 (1990).
Watson, Philip A. et al. Emerging mechanisms of resistance to androgen receptor inhibitors in prostate cancer. Nat. Rev. Cancer 15(12):701-711 (2015).
Wickham, Hadley, and Carson Sievert. ggplot2: elegant graphics for data analysis. New York: springer, 10:1-3 (2009).
Wickham, Hadley. Tidyverse: Easily Install and Load the Tidyverse. R package version 1.2.1. https://CRAN.R-project.org/package=tidyverse (2017).
Yap, Timothy A. et al. Drug Discovery in Advanced Prostate Cancer: Translating Biology into Therapy. Nature reviews. Drug discovery 15(10):699-718 (2016).
Yoshino, Hitoshi. et al. Structure-activity relationships of bioisosteric replacement of the carboxylic acid in novel androgen receptor pure antagonists. Bioorganic & medicinal chemistry 18(9):3159-3168 (2010).
Zhou, Jinming et al. Study of the impact of the T877A mutation on ligand-induced helix-12 positioning of the androgen receptor resulted in design and synthesis of novel antiandrogens. Proteins 78(3):623-637 (2010).
Zuo, Minzan, et al. Design and synthesis of indoline thiohydantoin derivatives based on enzalutamide as antiproliferative agents against prostate cancer. Eur. J. Med. Chem. 125:1002-1022 (2017). doi:10.1016/j.ejmech.2016.10.049.

* cited by examiner

ANDROGEN RECEPTOR REGULATION BY SMALL MOLECULE ENANTIOMERS

RELATED APPLICATIONS

This application is a National Stage filing under 35 U.S.C. § 371 of International Application No. PCT/US2021/023512 filed Mar. 22, 2021, which claims the benefit of U.S. Provisional Patent Application No. 62/992,668 filed Mar. 20, 2020, each of which applications are incorporated herein by reference.

BACKGROUND OF THE INVENTION

Small molecules that target the androgen receptor (AR) are the mainstay of therapy for lethal castration-resistant prostate cancer (CRPC), yet existing drugs lose their efficacy during continued treatment. This evolution of resistance is due to heterogenous mechanisms which include AR mutations causing the identical drug to activate instead of inhibiting the receptor. Understanding in molecular detail the paradoxical phenomenon wherein an AR antagonist is transformed into an agonist by structural mutations in the target receptor is thus of paramount importance.

Enzalutamide is the only Food and Drug Administration (FDA)-approved antiandrogen in metastatic castration-resistant prostate cancer (CRPC), thus there is an urgent need for novel agents. Androgen receptor (AR) activation involves a cascade of events, including binding to the AR-ligand binding domain (AR-LBD) in the cytoplasm, nuclear translocation, and transactivation "hyperspeckling," where interaction with androgen response elements (AREs) regulates gene expression. These discrete steps can be measured via fluorescence polarization, confocal microscopy, and ARE-luciferase assays.

Agonist binding induces AR conformational changes that enable helix 12 (H12) to close the binding pocket, triggering activation. Establishing a predictive AR model for antagonists is hampered by the lack of structural information about AR bound to antagonist in open conformation. The AR antagonist BMS-641988 has a chiral center at C-5 and an endo substituent [(R)-BMS]. Its unknown (S)-enantiomer [(S)-BMS] was postulated to also be an antagonist. When a new drug substance contains predominantly one enantiomer, its partner is excluded from the FDA's qualification and identification thresholds.

Prostate cancer is a leading cause of cancer death in males worldwide. All stages of prostate cancer have been shown to depend on the androgen receptor. Second generation anti-androgen drugs such as enzalutamide ultimately fail to prevent progression to terminal disease due to drug resistance and are often associated with neurotoxicity. Consequently, there is an urgent clinical need for novel anti-androgens with improved safety profiles that can overcome drug resistance.

SUMMARY

In a medicinal chemistry campaign to develop a new generation of anti-androgens, we sought to address these issues using a known AR antagonist, BMS-641988, as a point of departure and scaffold. Two potential lead compounds EITM-1702 and EITM-1707 were identified that inhibited the growth of LNCaP prostate cancer cells expressing T877A mutant AR. Computational modeling demonstrated that EITM-1702 and EITM-1707 have decreased probability of passing the blood-brain barrier (logBB<−1). Importantly, BMS-641988's neurotoxic metabolite BMS-501949 was not detected in extended duration (8 h) human liver microsome studies. EITM-1702 and EITM-1707 are thus promising compounds for further preclinical development.

Accordingly, this disclosure provides a compound of Formula I:

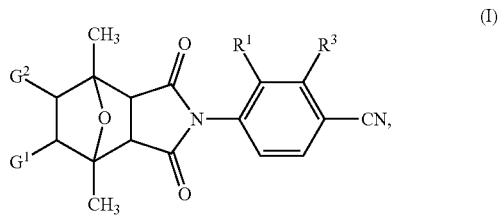

or a salt thereof;
wherein
$G^1$ is $NHR^4$ or OH;
$G^2$ is H or OH;
$R^4$ is —C(=O)heteroaryl, —C(=O)($C_1$-$C_6$)alkyl, —S(=O)$_2$($C_1$-$C_6$)alkyl, or —C(=O)heterocycloalkyl, wherein $R^4$ is substituted or unsubstituted with substituents;
$R^1$ is H, halo, —($C_1$-$C_6$)alkyl; and
$R^3$ is $CF_3$ or halo.

This disclosure also provides a method for treatment of cancer in a subject in need thereof by administering to the subject having cancer an effective amount of the compound disclosed above, thereby treating the cancer.

Additionally, this disclosure provides a pharmaceutical composition comprising the compound disclosed above and a pharmaceutically acceptable diluent or carrier.

The invention provides novel compounds of Formulas I, IA, or IB, intermediates for the synthesis of compounds of the Formulas, as well as methods of preparing compounds of the Formulas. The invention also provides compounds of the Formulas that are useful as intermediates for the synthesis of other useful compounds. The invention provides for the use of compounds of the Formulas for the manufacture of medicaments useful for the treatment of cancer in a mammal, such as a human.

The invention provides for the use of the compositions described herein for use in medical therapy. The medical therapy can be treating cancer, for example, breast cancer, lung cancer, pancreatic cancer, prostate cancer, or colon cancer. The invention also provides for the use of a composition as described herein for the manufacture of a medicament to treat a disease in a mammal, for example, cancer in a human. The medicament can include a pharmaceutically acceptable diluent, excipient, or carrier.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

FIG. 1. BMS-641988 is an AR agonist in LNCaP cells expressing AR T878A. A) Luciferase assays in cells treated with 10 μM drug+1 nM R1881. Signals are relative to 1 nM R1881 and presented as posterior mean and standard deviation (Bayesian analysis) (n=2-5 for drug treatments; n=28 for NTC). B) Individual dose-response curves (n=2, natural cubic splines of log-log data) used to estimate $ED_{50}$ values are depicted.

DETAILED DESCRIPTION

Figure 1:
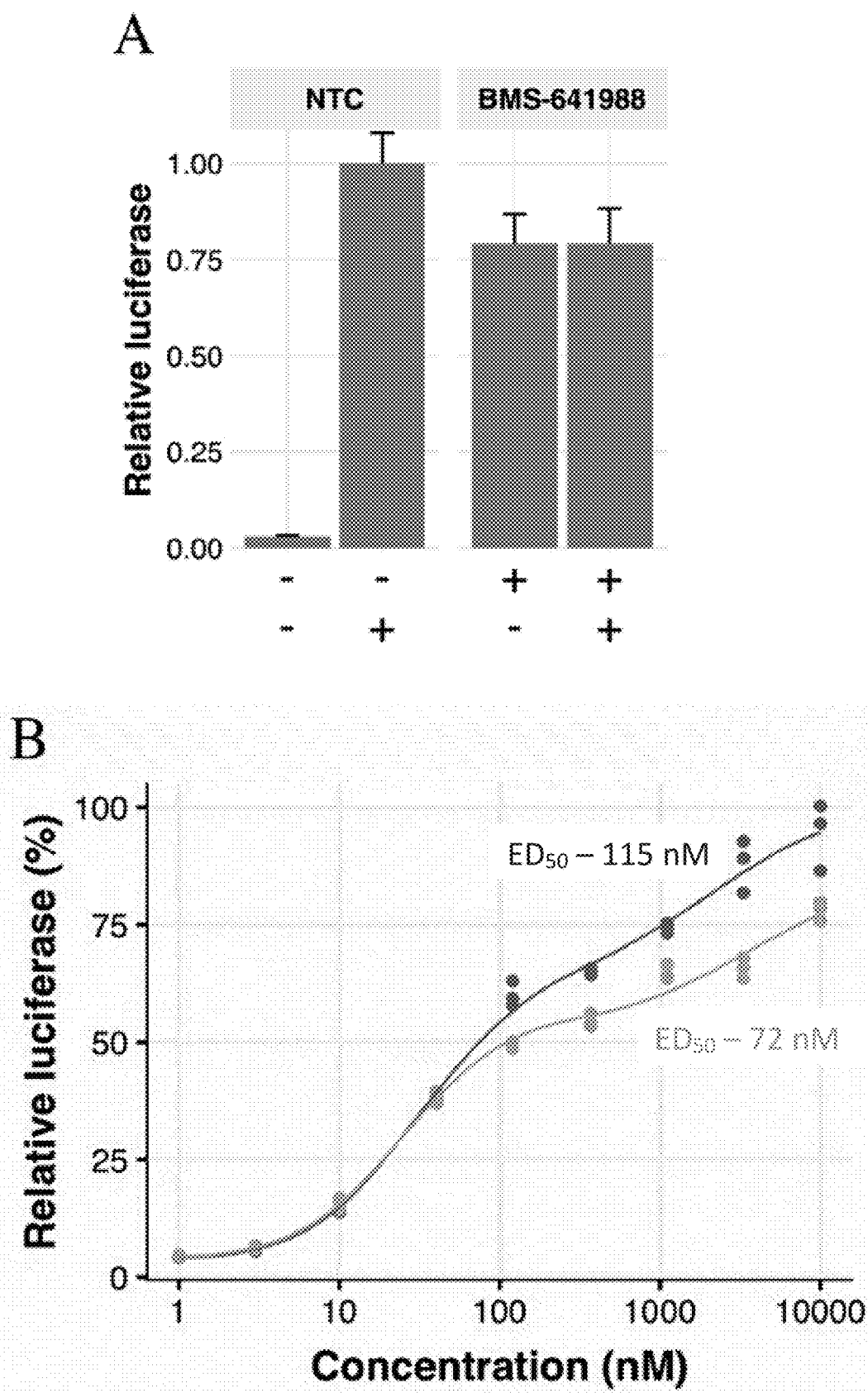

In this study of four BMS-641988 derivatives prepared as two enantiomeric pairs, we discovered that like (R)-BMS itself, the (R)-enantiomers RR)-EITM-1702 and (R)-EITM- were all AR antagonists. Unexpectedly, the corresponding (S)-enantiomers and (S)-BMS proved to be potent AR agonists.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit. For example, one or more substituents on a phenyl ring refers to one to five, or one to four, for example if the phenyl ring is disubstituted.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the endpoints of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

This disclosure provides ranges, limits, and deviations to variables such as volume, mass, percentages, ratios, etc. It is understood by an ordinary person skilled in the art that a range, such as "number1" to "number2", implies a continuous range of numbers that includes the whole numbers and fractional numbers. For example, 1 to 10 means 1, 2, 3, 4, 5, . . . 9, 10. It also means 1.0, 1.1, 1.2, 1.3, . . . , 9.8, 9.9, 10.0, and also means 1.01, 1.02, 1.03, and so on. If the variable disclosed is a number less than "number10", it implies a continuous range that includes whole numbers and fractional numbers less than number10, as discussed above. Similarly, if the variable disclosed is a number greater than "number10", it implies a continuous range that includes whole numbers and fractional numbers greater than number10. These ranges can be modified by the term "about", whose meaning has been described above.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

An "effective amount" refers to an amount effective to treat a disease, disorder, and/or condition, or to bring about a recited effect. For example, an effective amount can be an amount effective to reduce the progression or severity of the condition or symptoms being treated. Determination of a therapeutically effective amount is well within the capacity of persons skilled in the art. The term "effective amount" is intended to include an amount of a compound described herein, or an amount of a combination of compounds described herein, e.g., that is effective to treat or prevent a disease or disorder, or to treat the symptoms of the disease or disorder, in a host. Thus, an "effective amount" generally means an amount that provides the desired effect.

Alternatively, the terms "effective amount" or "therapeutically effective amount," as used herein, refer to a sufficient amount of an agent or a composition or combination of compositions being administered which will relieve to some extent one or more of the symptoms of the disease or condition being treated. The result can be reduction and/or alleviation of the signs, symptoms, or causes of a disease, or any other desired alteration of a biological system. For example, an "effective amount" for therapeutic uses is the amount of the composition comprising a compound as disclosed herein required to provide a clinically significant decrease in disease symptoms. An appropriate "effective" amount in any individual case may be determined using techniques, such as a dose escalation study. The dose could be administered in one or more administrations. However, the precise determination of what would be considered an effective dose may be based on factors individual to each patient, including, but not limited to, the patient's age, size, type or extent of disease, stage of the disease, route of administration of the compositions, the type or extent of supplemental therapy used, ongoing disease process and type of treatment desired (e.g., aggressive vs. conventional treatment).

The terms "treating", "treat" and "treatment" include (i) preventing a disease, pathologic or medical condition from occurring (e.g., prophylaxis); (ii) inhibiting the disease, pathologic or medical condition or arresting its development; (iii) relieving the disease, pathologic or medical condition; and/or (iv) diminishing symptoms associated with the disease, pathologic or medical condition. Thus, the terms "treat", "treatment", and "treating" can extend to prophylaxis and can include prevent, prevention, preventing, lowering, stopping or reversing the progression or severity of the condition or symptoms being treated. As such, the term "treatment" can include medical, therapeutic, and/or prophylactic administration, as appropriate.

As used herein, "subject" or "patient" means an individual having symptoms of, or at risk for, a disease or other malignancy. A patient may be human or non-human and may include, for example, animal strains or species used as "model systems" for research purposes, such a mouse model as described herein. Likewise, patient may include either adults or juveniles (e.g., children). Moreover, patient may mean any living organism, preferably a mammal (e.g., human or non-human) that may benefit from the administration of compositions contemplated herein. Examples of mammals include, but are not limited to, any member of the Mammalian class: humans, non-human primates such as chimpanzees, and other apes and monkey species; farm animals such as cattle, horses, sheep, goats, swine; domestic animals such as rabbits, dogs, and cats; laboratory animals including rodents, such as rats, mice and guinea pigs, and the like. Examples of non-mammals include, but are not limited to, birds, fish and the like. In one embodiment of the methods provided herein, the mammal is a human.

As used herein, the terms "providing", "administering," "introducing," are used interchangeably herein and refer to the placement of the compositions of the disclosure into a subject by a method or route which results in at least partial localization of the composition to a desired site. The compositions can be administered by any appropriate route which results in delivery to a desired location in the subject.

The compositions described herein may be administered with additional compositions to prolong stability and activity of the compositions, or in combination with other therapeutic drugs.

The terms "inhibit", "inhibiting", and "inhibition" refer to the slowing, halting, or reversing the growth or progression of a disease, infection, condition, or group of cells. The inhibition can be greater than about 20%, 40%, 60%, 80%, 90%, 95%, or 99%, for example, compared to the growth or progression that occurs in the absence of the treatment or contacting.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

This disclosure provides methods of making the compounds and compositions of the invention. The compounds and compositions can be prepared by any of the applicable techniques described herein, optionally in combination with standard techniques of organic synthesis. Many techniques such as etherification and esterification are well known in the art. However, many of these techniques are elaborated in Compendium of Organic Synthetic Methods (John Wiley & Sons, New York), Vol. 1, Ian T. Harrison and Shuyen Harrison, 1971; Vol. 2, Ian T. Harrison and Shuyen Harrison, 1974; Vol. 3, Louis S. Hegedus and Leroy Wade, 1977; Vol. 4, Leroy G. Wade, Jr., 1980; Vol. 5, Leroy G. Wade, Jr., 1984; and Vol. 6; as well as standard organic reference texts such as March's Advanced Organic Chemistry: Reactions, Mechanisms, and Structure, 5th Ed., by M. B. Smith and J. March (John Wiley & Sons, New York, 2001); Comprehensive Organic Synthesis. Selectivity, Strategy & Efficiency in Modern Organic Chemistry. In 9 Volumes, Barry M. Trost, Editor-in-Chief (Pergamon Press, New York, 1993 printing); Advanced Organic Chemistry, Part B: Reactions and Synthesis, Second Edition, Cary and Sundberg (1983); for heterocyclic synthesis see Hermanson, Greg T., Bioconjugate Techniques, Third Edition, Academic Press, 2013.

The formulas and compounds described herein can be modified using protecting groups. Suitable amino and carboxy protecting groups are known to those skilled in the art (see for example, Protecting Groups in Organic Synthesis, Second Edition, Greene, T. W., and Wutz, P. G. M., John Wiley & Sons, New York, and references cited therein; Philip J. Kocienski; Protecting Groups (Georg Thieme Verlag Stuttgart, New York, 1994), and references cited therein); and Comprehensive Organic Transformations, Larock, R. C., Second Edition, John Wiley & Sons, New York (1999), and referenced cited therein.

As used herein, the term "substituted" or "substituent" is intended to indicate that one or more (for example, 1-20 in various embodiments, 1-10 in other embodiments, 1, 2, 3, 4, or 5; in some embodiments 1, 2, or 3; and in other embodiments 1 or 2) hydrogens on the group indicated in the expression using "substituted" (or "substituent") is replaced with a selection from the indicated group(s), or with a suitable group known to those of skill in the art, provided that the indicated atom's normal valency is not exceeded, and that the substitution results in a stable compound. Suitable indicated groups include, e.g., alkyl, alkenyl, alkynyl, alkoxy, halo, haloalkyl, hydroxy, hydroxyalkyl, aryl, heteroaryl, heterocycle, cycloalkyl, alkanoyl, alkoxycarbonyl, amino, alkylamino, dialkylamino, trifluoromethylthio, difluoromethyl, acylamino, nitro, trifluoromethyl, trifluoromethoxy, carboxy, carboxyalkyl, keto, thioxo, alkylthio, alkylsulfinyl, alkylsulfonyl, and cyano. Additionally, non-limiting examples of substituents that can be bonded to a substituted carbon (or other) atom include F, Cl, Br, I, OR', OC(O)N(R')$_2$, CN, CF$_3$, OCF$_3$, R', O, S, C(O), S(O), methylenedioxy, ethylenedioxy, N(R')$_2$, SR', SOR', SO$_2$R', SO$_2$N(R')$_2$, SO$_3$R', C(O)R', C(O)C(O)R', C(O)CH$_2$C(O)R', C(S)R', C(O)OR', OC(O)R', C(O)N(R')$_2$, OC(O)N(R')$_2$, C(S)N(R')$_2$, (CH$_2$)$_{0-2}$NHC(O)R', N(R')N(R')C(O)R', N(R')N(R')C(O)OR', N(R')N(R')CON(R')$_2$, N(R')SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(COR')COR', N(OR')R', C(=NH)N(R')$_2$, C(O)N(OR')R', or C(=NOR')R' wherein R' can be hydrogen or a carbon-based moiety, and wherein the carbon-based moiety can itself be further substituted.

The term "halo" or "halide" refers to fluoro, chloro, bromo, or iodo. Similarly, the term "halogen" refers to fluorine, chlorine, bromine, and iodine.

The term "alkyl" refers to a branched or unbranched hydrocarbon having, for example, from 1-20 carbon atoms, and often 1-12, 1-10, 1-8, 1-6, or 1-4 carbon atoms; or for example, a range between 1-20 carbon atoms, such as 2-6, 3-6, 2-8, or 3-8 carbon atoms. As used herein, the term "alkyl" also encompasses a "cycloalkyl", defined below.

The term "cycloalkyl" refers to cyclic alkyl groups of, for example, from 3 to 10 carbon atoms having a single cyclic ring or multiple condensed rings. Cycloalkyl groups include, by way of example, single ring structures such as cyclopropyl, cyclobutyl, cyclopentyl, cyclooctyl, and the like, or multiple ring structures such as adamantyl, and the like. The cycloalkyl can be unsubstituted or substituted.

The term "heterocycloalkyl" refers to a saturated or partially saturated monocyclic, bicyclic, or polycyclic ring containing at least one heteroatom selected from nitrogen, sulfur, oxygen, preferably from 1 to 3 heteroatoms in at least one ring. Each ring is preferably from 3 to 10 membered, more preferably 4 to 7 membered.

The term "aryl" refers to an aromatic hydrocarbon group derived from the removal of at least one hydrogen atom from a single carbon atom of a parent aromatic ring system.

The term "heteroaryl" refers to a monocyclic, bicyclic, or tricyclic ring system containing one, two, or three aromatic rings and containing at least one nitrogen, oxygen, or sulfur atom in an aromatic ring. The heteroaryl can be unsubstituted or substituted, for example, with one or more, and in particular one to three, substituents, as described in the definition of "substituted".

Stereochemical definitions and conventions used herein generally follow S. P. Parker, Ed., McGraw-Hill *Dictionary of Chemical Terms* (1984) McGraw-Hill Book Company, New York; and Eliel, E. and Wilen, S., "Stereochemistry of Organic Compounds", John Wiley & Sons, Inc., New York, 1994. The compounds of the invention may contain asymmetric or chiral centers, and therefore exist in different stereoisomeric forms. It is intended that all stereoisomeric forms of the compounds of the invention, including but not limited to, diastereomers, enantiomers and atropisomers, as well as mixtures thereof, such as racemic mixtures, which form part of the present invention. Many organic compounds exist in optically active forms, i.e., they have the ability to rotate the plane of plane-polarized light. In describing an optically active compound, the prefixes D and L, or R and S. are used to denote the absolute configuration of the molecule about its chiral center(s). The prefixes d and l or (+) and (−) are employed to designate the sign of rotation of plane-polarized light by the compound, with (−) or l meaning that the compound is levorotatory. A compound prefixed with (+) or d is dextrorotatory. For a given chemical structure, these stereoisomers are identical except that they are mirror images of one another. A specific stereoisomer may also be referred to as an enantiomer, and a mixture of such isomers is often called an enantiomeric mixture. A 50:50 mixture of enantiomers is referred to as a racemic mixture or a racemate (defined below), which may occur where there has been no stereoselection or stereospecificity in a chemical reaction or process.

The terms "racemic mixture" and "racemate" refer to an equimolar mixture of two enantiomeric species, devoid of optical activity.

The term "enantiomerically enriched" ("ee") as used herein refers to mixtures that have one enantiomer present to a greater extent than another. Reactions that provide one enantiomer present to a greater extent than another would therefore be "enantioselective" (or demonstrate "enantioselectivity").

Embodiments of the Invention

This disclosure provides a compound of Formula I:

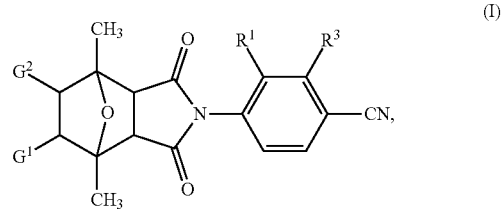

or a salt thereof;

wherein $G^1$ is $NHR^A$ or OH;

$G^2$ is H or OH;

$R^A$ is —C(=O)heteroaryl, —C(=O)($C_1$-$C_6$)alkyl, —S(=O)$_2$($C_1$-$C_6$)alkyl, or —C(=O)heterocycloalkyl, wherein $R^A$ is substituted or unsubstituted with substituents;

$R^1$ is H, halo, —($C_1$-$C_6$)alkyl; and $R^3$ is $CF_3$ or halo.

In various embodiments, $G^1$ is $NHR^A$. In other embodiments, $R^A$ is pyrrolopyridine, pyrazole, or indazole, and $R^A$ is unsubstituted. In some embodiments, $R^A$ is pyrazole or triazole, and $R^A$ is substituted. In some embodiments, $R^A$ is —C(=O)CH$_3$, —S(=O)$_2$CH$_2$CH$_3$,

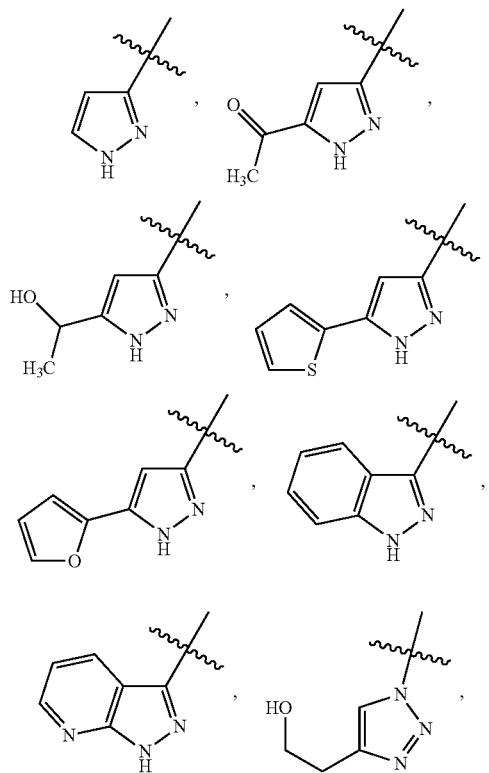

-continued

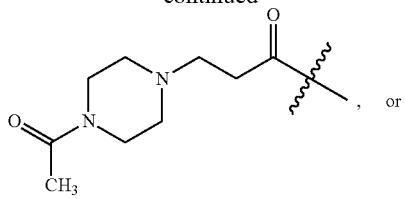, or

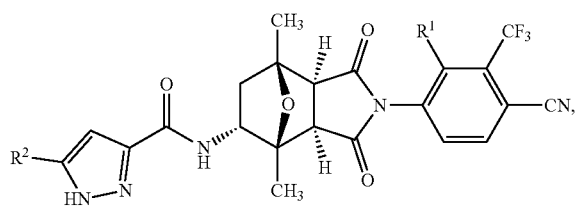.

In some embodiments, the compound is represented by Formula IA:

(IA)

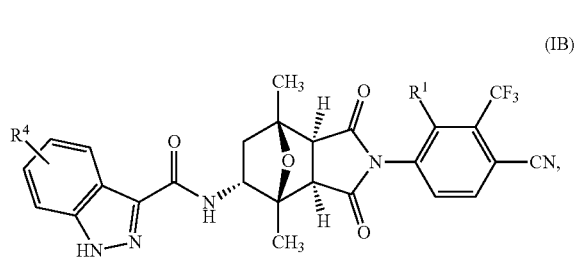

or
the enantiomer or a salt thereof;
wherein
R¹ is H, F, methyl, or ethyl; and
R² is H, —C(=O)CH₃, or —C(OH)CH₃.

In some other embodiments, the compound is represented by Formula IB:

(IB)

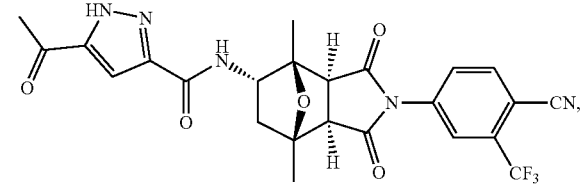

or
the enantiomer and/or a salt thereof;
wherein
X is CH or N;
R¹ is H, F, methyl, or ethyl; and
R⁴ is H, —C(=O)CH₃, or —C(OH)CH₃.

In other embodiments, the compound is EITM-1719 or EITM-1720:

(EITM-1719)

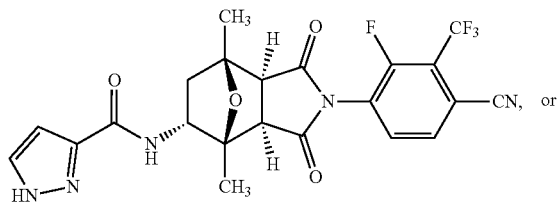, or (EITM-1720)

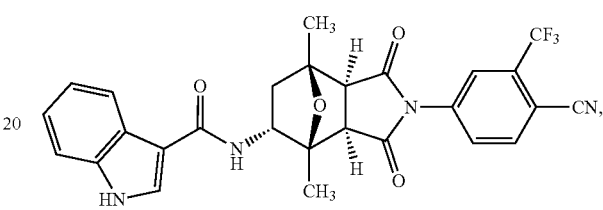, the enantiomer and/or salt thereof.

In some other embodiments, the compound is:

10, (R)-EITM-1702

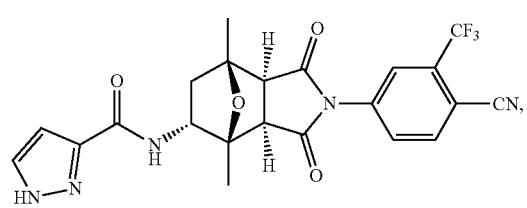

11, (S)-EITM-1702

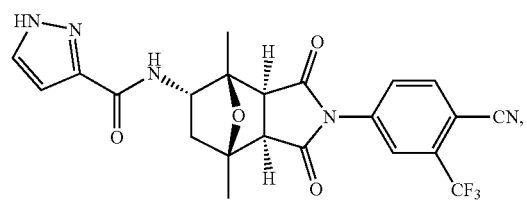

12, (R)-EITM-1703

(structure shown)

13, (S)-EITM-1703

(structure shown)

-continued
14, (R)-EITM-1704
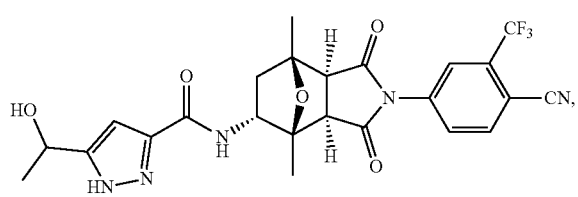
15, (S)-EITM-1704
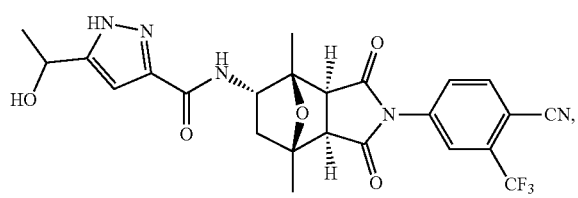
22, (R)-EITM-1707
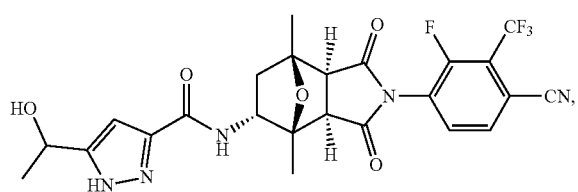
23, (S)-EITM-1707
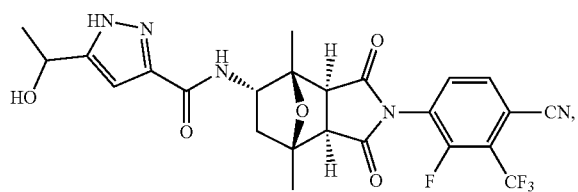
EITM-1706
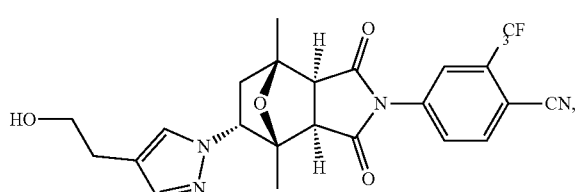
EITM-1709
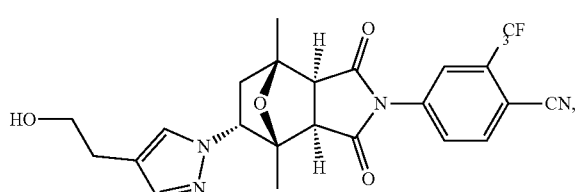
EITM-1710
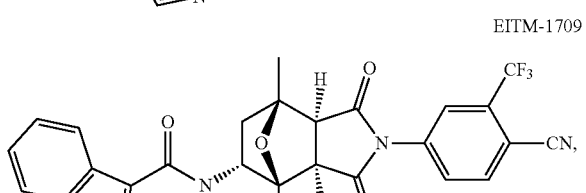
-continued
EITM-1711
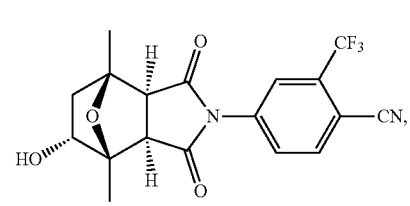
EITM-1712
EITM-1713
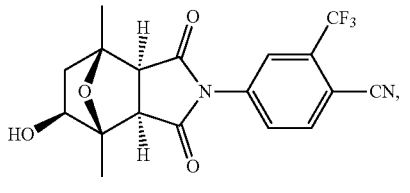
EITM-1714
EITM-1715-1
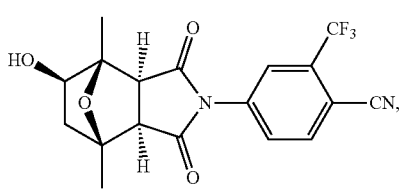
EITM-1715-2
EITM-1716
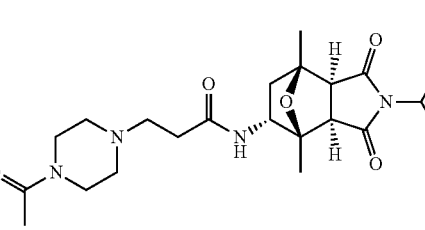

EITM-1717

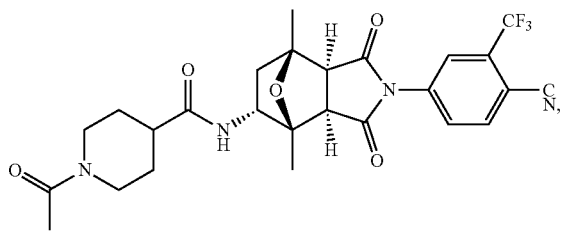

EITM-1718-1

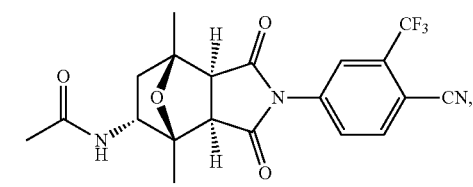

EITM-1718-2

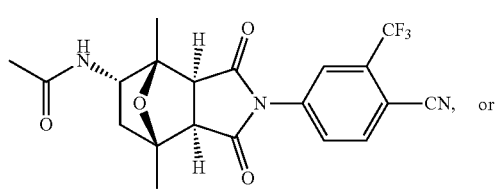

EITM-1705

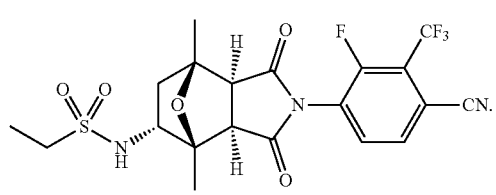

In some embodiments, the compound is the (S)-enantiomer. In some embodiments, the compound is the (R)-enantiomer. In other embodiments, the compound is dextrorotatory. In other embodiments, the compound is levorotatory.

In various embodiments, the compound is an antagonist of the androgen receptor. In various embodiments, the compound is an agonist of the androgen receptor. In various other embodiments, the compound is a full agonist of the androgen receptor. In some embodiments, the agonist is the enantiomer of the antagonist.

The compound formulas disclosed herein and/or methods disclosed herein exclude the compound BMS-641988:

(BMS-641988)

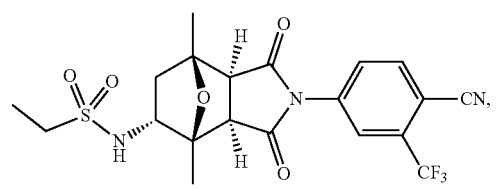

e.g., for Formula I when $G^2$ and $R^1$ is H, $R^3$ is $CF_3$, $G^1$ is $NHR^4$, and $R^4$ is $-S(=O)_2(C_1-C_6)$alkyl or $-S(=O)_2CH_2CH_3$.

Additionally, this disclosure provides a compound that is the (S)-enantiomer of BMS-641988, wherein the compound is:

9

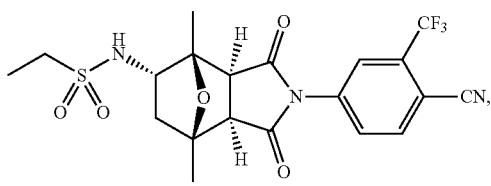

or the compound can also be

EITM-1708

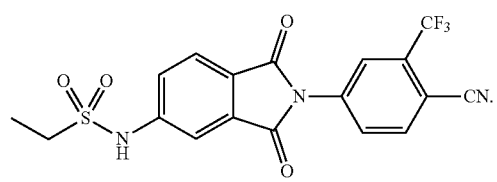 [SMILES: CCS(=O)(=O)Nc1ccc2c(c1)C(=O)N(c1ccc(C#N)c(C(F)(F)F)c1)C2=O]

Furthermore, this disclosure provides a method for treatment of cancer in a subject in need thereof by administering to the subject having cancer an effective amount of a compound disclosed herein, thereby treating the cancer.

In some embodiments, the cancer is prostate cancer or breast cancer. In some other embodiments, the cancer is prostate cancer and the prostate cancer is lethal castration-resistant prostate cancer. In some embodiments, an effective serum concentration of the compound is about 1 nM to about 2000 nM.

In other embodiments, an effective serum concentration of the compound is about 1 nM, about 10 nM, about 50 nM, about 100 nM, about 250 nM, about 500 nM, about 750 nM, about 1000 nM, about 1500 nM, about 2000 nM, about 2500 nM, about 3000 nM, about 3500 nM, about 4000 nM, about 4500 nM, about 5000 nM, about 7500 nM, about 10 µM, about 15 µM, about 20 µM, about 25 µM, about 30 µM, about 35 µM, about 40 µM, about 45 µM, about 50 µM, about 60 µM, about 70 µM, about 80 µM, about 90 µM, about 100 µM, or any serum concentration in between any two recited serum concentrations.

Furthermore, this disclosure provides a method for the treatment of an endocrine or hormonal disorder in a subject in need thereof by administering to the subject having an endocrine disorder an effective amount of a compound disclosed herein, thereby treating the endocrine disorder.

This disclosure also provides for use of a compound or composition disclosed herein for the treatment of a cancer, endocrine, hormonal, or another disorder in a subject in need thereof by administering to the subject having on or more said disorders an effective amount of a compound disclosed herein, thereby treating the disorder.

In various embodiments, administering an effective amount of the compound is by infusion, injection, oral administration, or a combination thereof.

This disclosure also provides a pharmaceutical composition comprising a compound disclosed herein and a pharmaceutically acceptable diluent or carrier.

Results and Discussion

Prostate cancer is the second most lethal cancer in men, with an estimated 29,000 deaths in the US alone for 2019. All stages of disease are dependent on androgen receptor (AR) pathway signaling. In castration-resistant prostate cancer (CRPC), patients generally initially respond to antiandrogens such as enzalutamide and apalutamide, but progression to terminal disease is inevitable. A number of resistance mechanisms have been identified, including somatic mutations of the AR ligand binding domain (AR-LBD), which reduce ligand-specificity and can even transform AR antagonists into agonists. Enzalutamide is additionally associated with neurotoxicity: fatigue and falls are reported frequently, and in up to 1% of patients, seizures necessitate discontinuation. There is an acute clinical need for novel antiandrogens with less susceptibility to resistance and improved safety.

AR agonists, including testosterone, bind the AR-LBD and induce conformational changes that enable helix 12 (H12) to "cap" the binding pocket, a perquisite for AR activation. In contrast, when AR antagonists bind the AR-LBD, H12 is prevented from closing. Molecular dynamics simulations suggest that steric modification of AR antagonists could improve therapeutic efficacy by more completely blocking H12 capping. This also suggests a strategy to mitigate anti-androgen resistance due to acquired mutations that enlarge the pocket.

Exploration of androgen receptor antagonists with an oxabicyclic core. The AR antagonist BMS-641988 has a bulky oxabicyclic succinimide core that that distinguishes it from current clinical antiandrogens. This core structure confers greater pharmacophore rigidity than bicalutamide, enzalutamide and darolutamide, recently approved for non-metastatic CRPC (ODM-201). BMS-641988 was a promising next-generation anti-AR lead compound that potently antagonized AR in vitro yet paradoxically promoted LNCaP proliferation. The drug failed in a phase I clinical trial due to low tumor response and toxicity.

In an exploratory medicinal chemistry campaign to develop a new antiandrogen for CRPC, we have designed and synthesized a series of nine novel AR antagonists (EITM-1702~EITM-1712), using the BMS-641988 scaffold as a point of departure. Several of these new drugs 1) antagonized AR in vitro with a median $EC_{50}$ of 1320 nM (range 328-3700 nM), with a ~25% assay coefficient of variation; 2) effectively inhibited LNCaP cell proliferation; and 3) were demonstrated not to produce the toxic metabolite (BMS-501949) primarily responsible for the clinical failure of BMS-641988. These novel compounds significantly address key weaknesses of BMS-641988 and thus hold promise for further preclinical testing.

Drug design. BMS-641988 is extensively metabolized in vivo to the active metabolite BMS-501949 via oxidation by CYP 3A4 and subsequent reduction by cytosolic reductase (Scheme 1). BMS-501949 readily crosses the blood-brain barrier (BBB) inhibiting $GABA_A$ receptors and likely triggered the grade 3 seizures that led to clinical failure of the drug. To prevent generation of BMS-501949 and associated toxic metabolites in our drug design, we performed metabolic predictions in silico using the Schrödinger P-450 Site of Metabolism (SOM) module. The results of our calculations suggested that a carboxamide would be less susceptible to CYP oxidation than the sulfonamide group in BMS-641988, prompting us to synthesize a series of novel amide analogues of this scaffold.

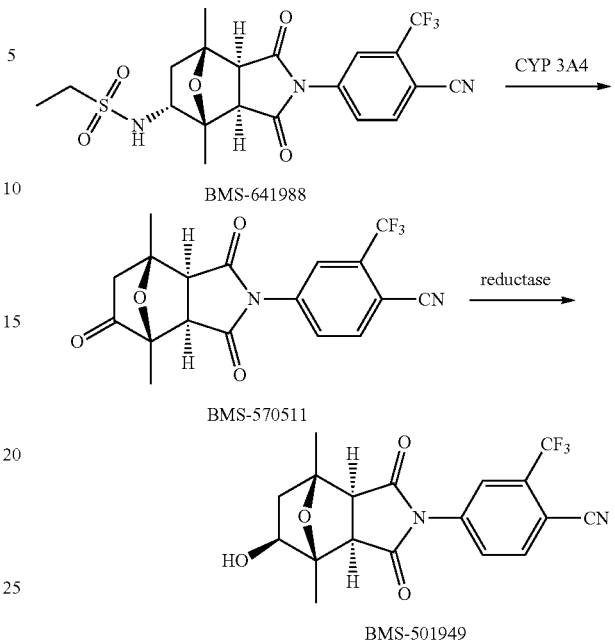

Scheme 1. Metabolism of BMS-641988

BMS-641988 is a C-5 (R)-stereoisomer and encompasses a previously uncharacterized (S)-stereoisomer. It has been postulated that endo substitution at C-5 or C-6 of the oxabicyclic ring would result in a direct interaction with H12, creating a classical AR antagonist conformation, similar to that predicted for bicalutamide. To optimize substituent position and size in the new analogues, we performed Schrödinger IFD docking of BMS-641988 and its previously undescribed (S)-enantiomer, (S)-BMS using the AR-LBD in complex with DHT (PDB: 1T7R). In preferred conformations, both compounds form hydrogen bonds with R752 and N705 of the AR-LBD, the same residues that are responsible for stable binding of the standard agonists DHT and R1881. However, our docking calculations showed that orientation of the ethyl sulfonamide substituent is very different towards H11 and H12 for the corresponding stereoisomers. In BMS-641988, the substituent points towards H11 and H12, whereas in (S)-BMS this is not the case. Using ICM-Pro, we calculated active site surface and ligand-protein contacts for the models constructed using Schrödinger IFD. (S)-BMS fits snugly into the binding site and produces contacts very similar to DHT, including interactions with L704, F764, N705, T877 and W741 (Table 1). On the other hand, BMS-641988 could not be accommodated inside the pocket, and produced stronger interactions with F876, F891 and M895, which are important for H12 stabilization (Table 1). Compared with its (S)-enantiomer, BMS-641988 induces a noticeable shift in F876 which confirms destabilization of the closed conformation of H12. These docking results suggested that BMS-641988 is an antagonist, however its (S)-isomer is not. It is therefore essential to completely remove potentially agonistic (S)-enantiomer prior to functional testing. Finally, the size of the carboxamide C-5 substituent is critical to its interaction with H11 and H12 and subsequent destabilization of the closed pocket conformation. Based on these results, we chose to use pyrazole, alkyl pyrazole, 5-(thiophenyl)pyrazole, 5-(furanyl)pyrazole, indazole as the C-5 carboxamide substituents for our new drug series. To extend the SAR, we also investigated the effect of F or Me substitutions at the ortho-position of the aniline ring.

TABLE 1

Contact area between ligands and AR residues.

| Residues | DHT | S-BMS | BMS-641988 |
|---|---|---|---|
| L704 | 36.2 | 35.2 | 40 |
| M745 | 27.7 | 26.5 | 28.3 |
| F764 | 27.1 | 25.8 | 30.3 |
| T877 | 25.1 | 26.0 | 25.2 |
| M742 | 23.2 | 32.0 | 18.5 |
| N705 | 22.7 | 28.1 | 25.2 |
| L873 | 20.5 | 20.3 | 24.7 |
| W741 | 18.9 | 22.2 | 8.2 |
| L707 | 16.7 | 15.7 | 16.6 |
| M780 | 15.6 | 15.1 | 26.4 |

Synthesis. Compounds were synthesized using the general route shown in Scheme 2. Diels-Alder cycloaddition of maleimide 2 to the MEM ester of 2,5-dimethyl-3-furoic acid yielded a racemate (3a and 3b), which was used in the following steps without separation. Catalytic hydrogenation led to the formation of the esters 4a and 4b. Treatment of 4 with 3 N HCl gave racemic mixture of acids 5a and 5b. Sequential Curtius rearrangement and subsequent TFA-promoted cleavage of the resulting Teoc-carbamate gave the racemic amines 7a and 7b. Coupling of amines 7 with the carboxylic acids 8 afforded the target amide-pharmacophores. In the original synthesis of BMS-641988, 4a and 4b were separated using semi-preparative chiral HPLC. Only the C-5 R stereoisomer (4a) was carried forward to produce the target compound (thus, the corresponding C-5 (S)-stereoisomer of BMS-641988 was not available). In our syntheses, 4 was not separated but instead was carried forward en route to the final target C-5 (R/S)-mixtures, which was then resolved to afford both individual enantiomers of the drugs.

Anilines 1 and carboxylic acids 8 were either obtained from commercial sources or synthesized by known procedures (see Examples). It is noteworthy that in the analogues containing a 2'-fluoro or 2'-methyl group, exposure to methanol should be avoided during purification to prevent ring opening of the pyrrolidinedione. Although the 3aR, 4R, 5R, 7R, 7aS enantiomers of the oxabicyclic scaffold consistently have negative specific rotations, the $[\alpha]^{24}_D$ of BMS-641988 has not been reported. Therefore, after confirming the absolute stereochemistry of BMS-641988 by x-ray crystallography, we determined its specific rotation to be $[\alpha]^{24}_D = -28.1°$ (c=0.5, MeOH). The specific rotation of the previously undescribed (S)-stereoisomer was measured to be $[\alpha]^{24}_D = +26.1°$ (c=0.5, MeOH) and its stereochemistry was also verified by x-ray crystallography.

Scheme 2. Synthesis of EITM-compounds.

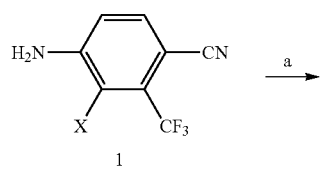

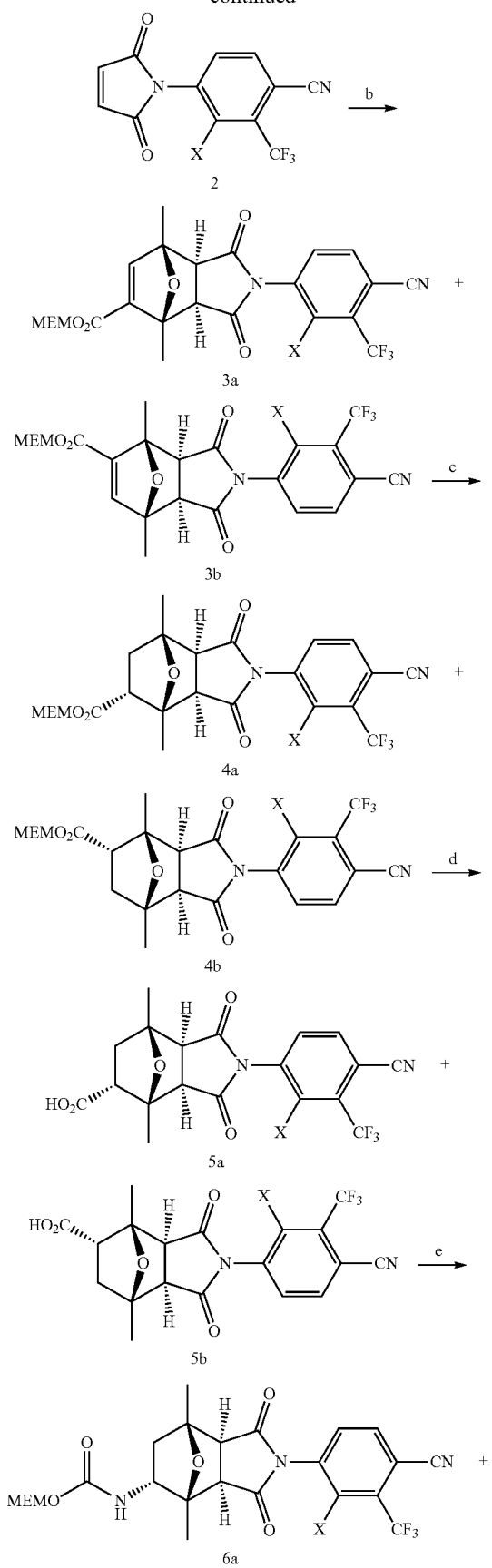

-continued

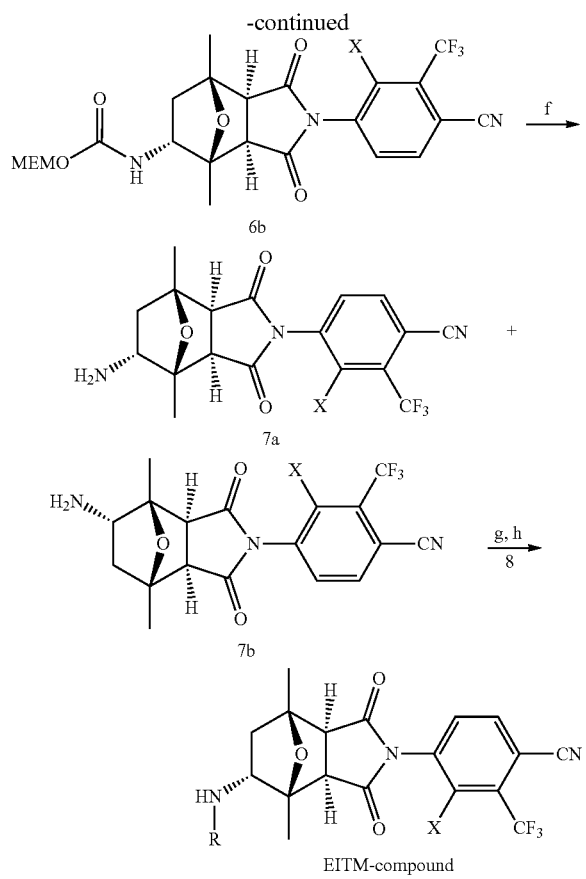

EITM-compound

Reagents and conditions: (a) maleic anhydride, glacial acetic acid, reflux overnight, 90%; (b) 2-MEM 2,5-dimethylfuran-2-carboxylate, 125° C., 1.5 h, then room temperature overnight, 25%; (c) H₂, Pd/C, EtOAc, 1 atm, overnight, 75%; (d) 3 N HCl, THF, room temperature, 16 h, 99%; (e) 2-trimethylsilylethanol, DPPA, Et₃N, 4 Å MS, 1,4-dioxane. 75° C., 53%; (f) TFA, CH₂Cl₂, room temperature, overnight; (h) chiral HPLC separation.

BMS-641988 is an agonist in LNCaP prostate cancer cells. A previous report identified BMS-641988 as an antagonist in LNCaP cells expressing AR T878A, a mutation that reduces ligand specificity frequently reported in prostate cancer patients. However, treatment with the drug paradoxically promoted LNCaP proliferation. We generated a LNCaP cell line stably expressing luciferase controlled by androgen response elements (ARE-luciferase). We performed luciferase experiments after 24 h treatment with 10 µM test drug with and without 1 nM R1881. Surprisingly, 10 µM BMS-641988 induced ARE-luciferase without addition of R1881 (FIG. 1). Increasing doses confirmed the drug is indeed a potent agonist of the T877A mutated AR, with an $ED_{50}$ of 94±22 nM (mean±S.E., n=2) vs 0.1 nM for R1881 (FIG. 1B, Table 2). This agonism may explain the limited efficacy of BMS-641988 in clinical studies.

SAR studies of EITM-compounds. We first tested amide derivatives EITM-1702, -1703, and -1704. In contrast to BMS-6431988, all three compounds displayed robust antagonistic activities without notable agonism (Table 2). Of the three, EITM-1702 had the highest potency (570 nM) and efficacy ($E_{max}$ 8%), supporting the selective ligand design derived from our modeling studies and demonstrating that this design eliminated the partial agonism of BMS-641988 while retaining robust anti-AR properties in prostate cancer cells.

Figure 2:
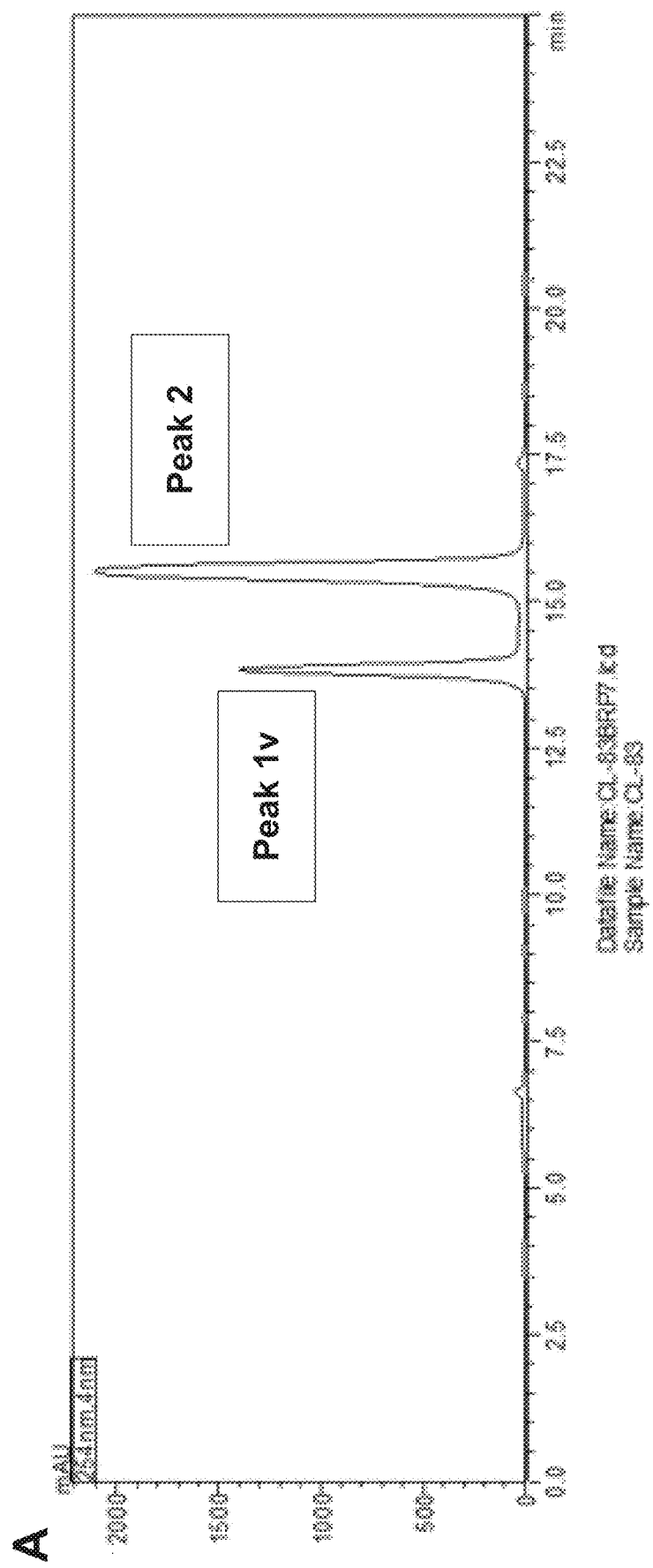
FIG. 2. Atropisomer separation of EITM-1712. Enantiopure EITM-1712 separates into two peaks (A) on reserve-phase HPLC (40%-60% acetonitrile in water). Samples from both peaks equilibrate after standing overnight in a solution of acetonitrile and water (B, C). Hartree-Fock 3-21G calculations in Spartan 14 (Wavefunction Inc.) show a 58 kJ/mol rotational energy barrier for (R)-EITM-1707, and an 86 kJ/mol—for EITM-1712 (D).
Figure 2:
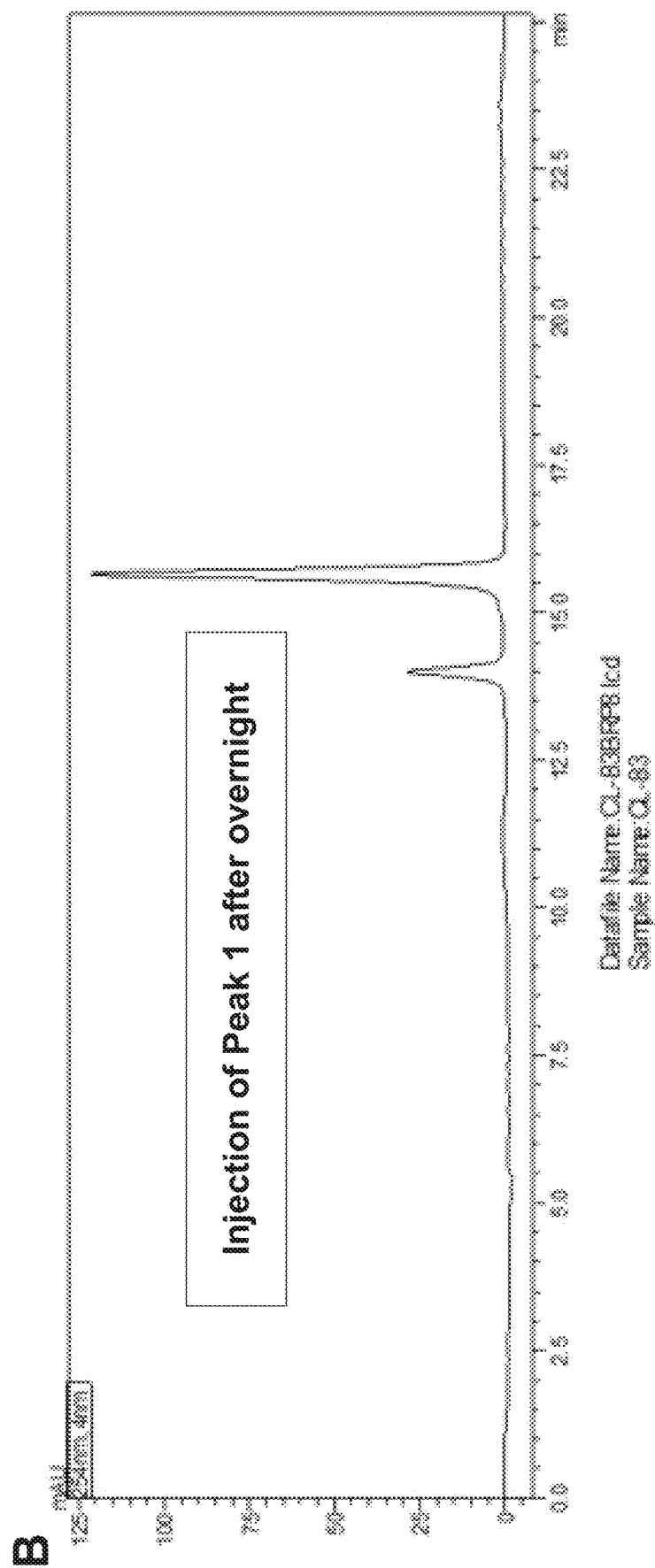
Figure 2:
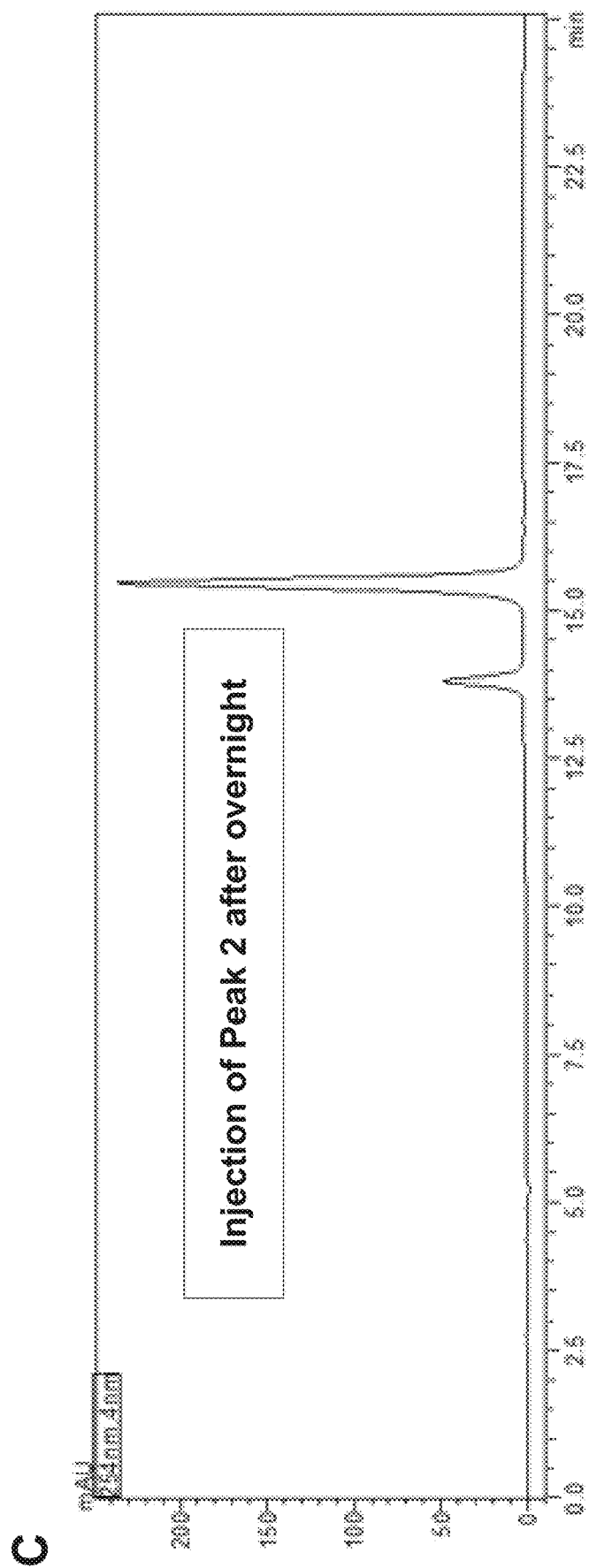
Figure 2:
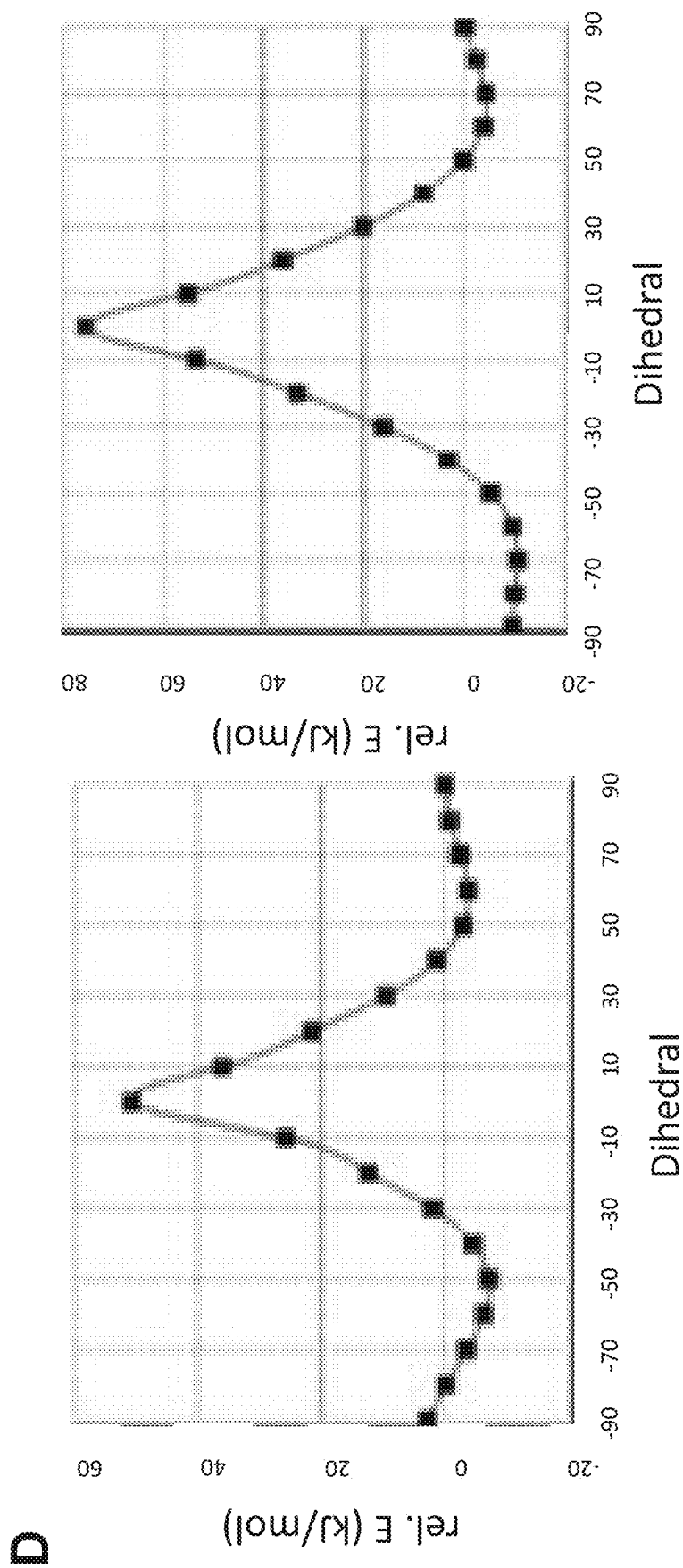

We employed a fragment approach for our SAR studies. First, to study the SAR at the 2'-position (ortho) on the aniline we compared EITM-1705, -1707 and -1712. Similar to BMS-641988, EITM-1705 displayed notable AR agonism in LNCaP cells in an ARE-luciferase assay (Table 2). This suggests that the C-5 substituent, but not the 2'-aniline substituent plays a crucial role in defining the antagonistic activity in this drug cohort. In contrast, EITM-1707 and EITM-1712 are pure antagonists: experiments run in the agonist mode failed to produce measurable $ED_{50}$ values for these compounds. EITM-1707's potency (940 nM) and efficacy ($E_{max}$ 13%) were comparable to EITM-1702, showing that 2'-fluoro-substitution does not impact activity. In comparison, methyl substitution in EITM-1712 led to significant loss in potency (2133 nM) and efficacy ($E_{max}$ 38%), possibly due to its existence as two atropisomers, only one of which effectively inhibits AR. Evidence to support the existence of these quasi-stable atropisomers is provided by the observation that after chiral HPLC separation, EITM-1712, unlike EITM-1707, displays two peaks on reversed-phase analytical HPLC (FIG. 2A). These species both re-equilibrated after standing overnight in a solution of acetonitrile and water (FIG. 2B-C).

Hartree-Fock 3-21G calculations in Spartan 14 (Wavefunction Inc.) estimated a 58 kJ/mol rotationalenergy barrier for EITM-1707 around the N—Ar bond in vacuum (FIG. 2D). Since separation of atropisomers requires as least a 93.3 kJ/mol rotational energy barrier at 300 K (half-life of at least 1000 s), this calculation confirmed the absence of stable atropisomers of EITM-1707. Similar calculations for EITM-1712 estimated an 86 kJ/mol rotational barrier around the N—Ar bond, that would not be enough for separation of corresponding atropisomers. The rotational barrier 87 kJ/mol for 2-Me-N-phenylmaleimide (structurally similar to EITM-1712) was measured by ¹H NMR, and accordingly the imide freely rotated around N—Ar single bond at room temperature. We can suggest that additional rotational barrier in case of EITM-1712 could be provided by the interaction of Me-group with solvent molecule, forming hydrogen bonding with oxygen in C—O—C bridge. To study the role of the oxabicyclic core, we tested EITM-1708 (Scheme 3).

Scheme 3. Synthesis of N-(2-(4-cyano-3-(trifluoromethyl)phenyl)-1,3-dioxoisoindolin-5-yl)ethanesulfonamide, EITM-1708.

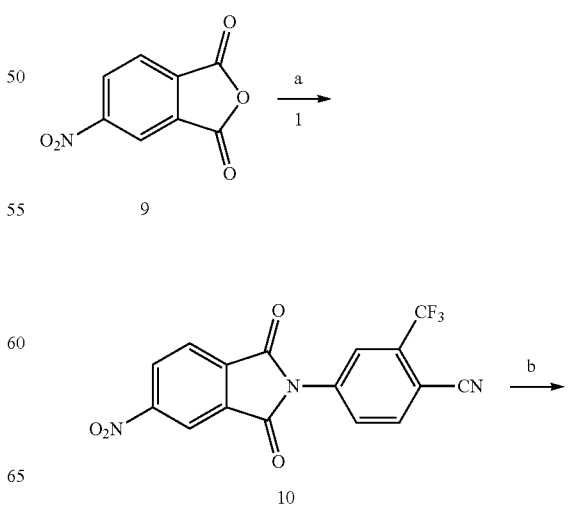

-continued

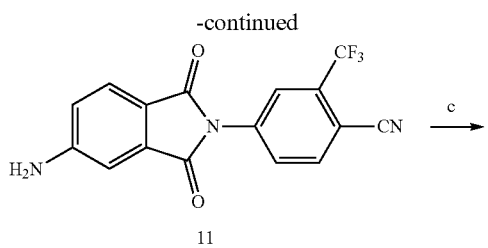

11

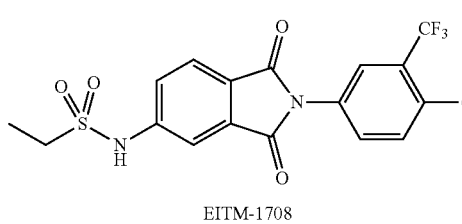

EITM-1708

Reagents and conditions:
(a) acetic acid, 130° C. to 140° C., 4.5 h;
(b) H₂, Pd/C, EtOAc, overnight, 39% over two steps;
(c) EtSO₂Cl, TEA, CH₂Cl₂, rt, overnight, 35%.

Scheme 4. Synthesis of 4-((3aR,4R,5R,7R,7aS)-5-(4-(2-hydroxyethyl)-1H-1,2,3-triazol-1-yl)-4,7-dimethyl-1,3-dioxooctahydro-2H-4,7-epoxyisoindol-2-yl)-2-(trifluoromethyl)benzonitrile, EITM-1706.

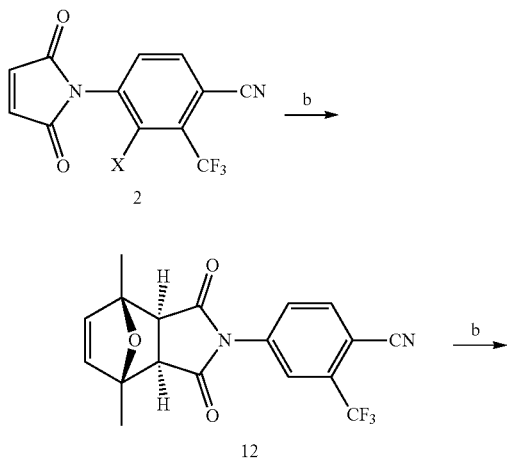

2

12

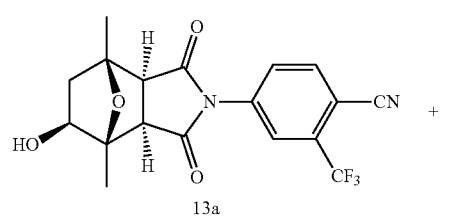

13a

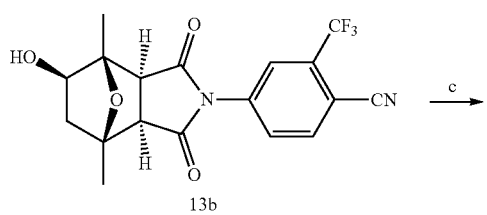

13b

-continued

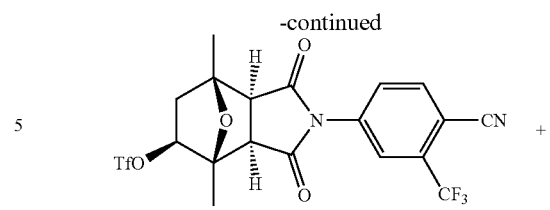

14a

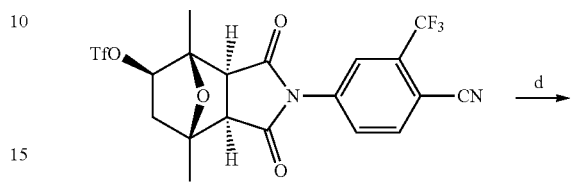

14b

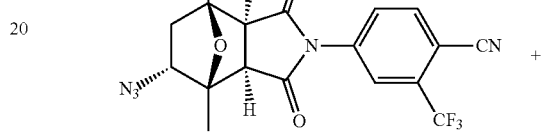

15a

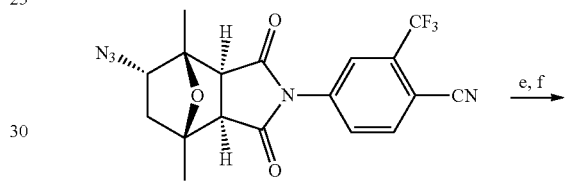

15b

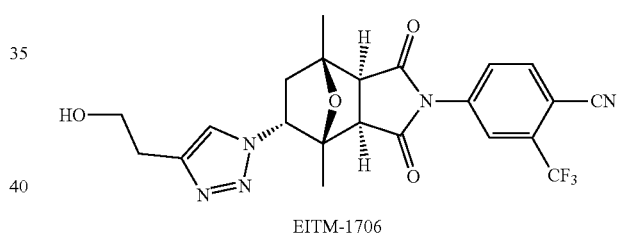

EITM-1706

Reagents and conditions: (a) 2,5-dimethylfuran, neat, 60° C., overnight, 75%; (b) BH₃/THF at 0° C., 30 min; then 0.5 M Na₂HPO₄/NaH₂PO₄ buffer until pH 7.2, 0° C.; then H₂O₂ for 30 min, 71%; (c) Tf₂O, pyridine, anhydrous DCM, 0° C., 1 h, 61%; (d) NaN₃, DMF, overnight, 79%; (e) 3-butynol, copper(II) sulfate pentahydrate, and sodium ascorbate, 1:1 tBuOH:water, 40° C., 2 d., 30%; (f) chiral HPLC separation.

EITM-1708 did not bind to AR in vitro (Table 2), demonstrating that the oxabicyclic core is essential for the binding of this family of compounds. To study the SAR at the C5 position of the oxabicyclic ring, we tested compounds EITM-1706, -1709, -1710, -1711, -1716, and -1717. First, we demonstrate that C5 amide or sulfonamide is critical to the structure, since EITM-1706 (Scheme 4) did not bind to AR (Table 2). Surprisingly, the AR-LBD appeared to accommodate EITM-1709, -1710 and -1711 despite their size (Table 2). On the other hand, EITM-1716, and -1717 did not bind AR, suggesting the flat structure of aromatic rings is crucial for binding (Table 2). In summary, several EITM-drugs antagonized AR in vitro with a median $EC_{50}$ of 1320 nM (range 328-3700 nM) (Table 2).

Our SAR studies imply that the dynamics of AR ligand interactions are inadequately described by the Helix 12 model and the understanding of AR at a molecular level requires more extensive studies.

TABLE 2

In vitro potency of EITM-17## measured in LNCaP cells via ARE-luciferase (n = 1, *n = 2).
NA = antagonist $ED_{50}$ values could not be obtained.

| Compound | X | R | $ED_{50}$ (nM) | $E_{max}$ (%) |
|---|---|---|---|---|
| Enzalutamide | — | — | 250 | 3 |
| BMS-641988* | H | (ethylsulfonyl group) | agonist | agonist |
| EITM-1702* | H | (pyrazole carboxamide) | 570 | 8 |
| EITM-1703 | H | (acetyl pyrazole carboxamide) | 1700 | 20 |
| EITM-1704 | H | (hydroxyethyl pyrazole carboxamide) | 3700 | 11 |
| EITM-1705 | F | (ethylsulfonamide) | agonist | agonist |
| EITM-1706 | H | (hydroxyethyl triazole) | No binding | No binding |
| EITM-1707 | F | (hydroxyethyl pyrazole carboxamide) | 940 | 13 |
| EITM-1708 | | (ethylsulfonamido isoindoline-1,3-dione with trifluoromethyl cyanophenyl) | No binding | No binding |

TABLE 2-continued
In vitro potency of EITM-17## measured in LNCaP cells via ARE-luciferase (n = 1, *n = 2).
NA = antagonist ED$_{50}$ values could not be obtained.
| Compound | X | R | ED$_{50}$ (nM) | E$_{max}$ (%) |
| --- | --- | --- | --- | --- |
| EITM-1709 | H | 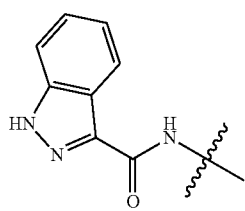 [SMILES: *NC(=O)c1n[nH]c2ccccc12] | 328 | 1 |
| EITM-1710 | H | 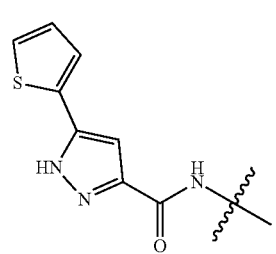 [SMILES: *NC(=O)c1cc(-c2cccs2)[nH]n1] | 2427 | 8 |
| EITM-1711 | H | 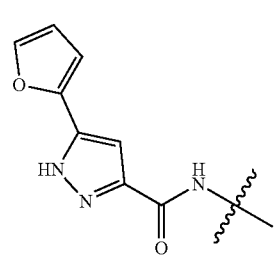 [SMILES: *NC(=O)c1cc(-c2ccco2)[nH]n1] | 535 | 1 |
| EITM-1712 | Me | 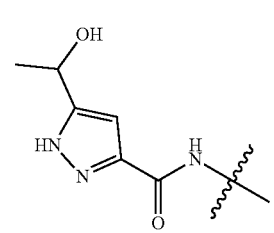 [SMILES: *NC(=O)c1cc(C(C)O)[nH]n1] | 2133 | 38 |
| EITM-1716 | H | 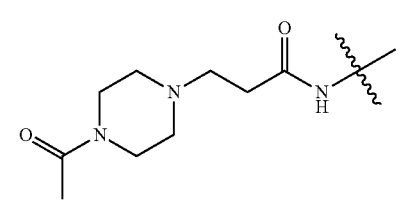 [SMILES: *NC(=O)CCN1CCN(C(C)=O)CC1] | No binding (IC$_{50}$ > 5 μM) | No binding |
| EITM-1717 | H | 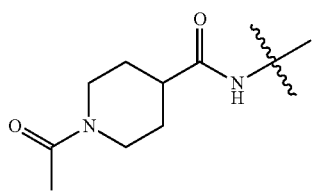 [SMILES: *NC(=O)C1CCN(C(C)=O)CC1] | No binding | No binding |

Figure 3:
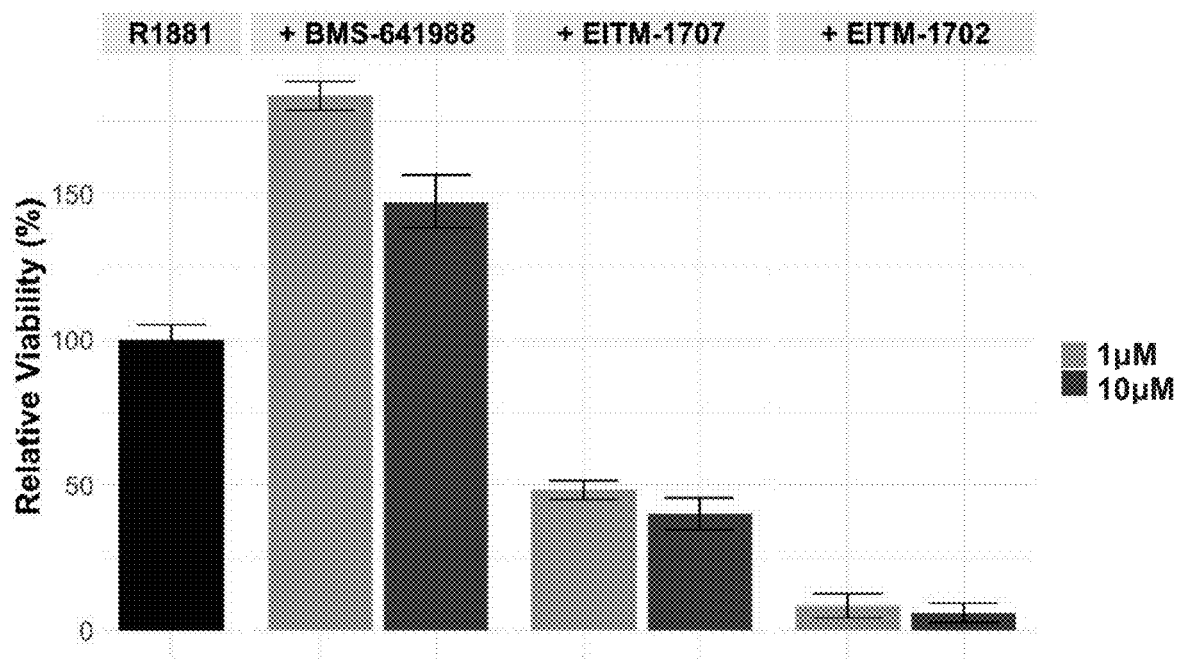
FIG. 3. LNCaP cell growth 5 days after treatment. Optimal cell growth under 60 pM R1181 treatment was normalized to 100% relative signal and no treatment control (NTC) to 0%. Drugs supplemented at either 1 μM or 10 μM.

EITM-1702 and EITM-1707 inhibit LNCaP proliferation in vitro. To evaluate EITM-1702 and -1707 as potential preclinical candidates, we treated LNCaP cells with 1 and 10 µM drug and 60 pM R1881 for 5 days and measured cell viability using CellTiter-Glo. As expected, BMS-641988 promoted proliferation. In contrast, we measured a significant decline in viable cells for the EITM drugs, with EITM-1702 almost phenocopying castrate conditions (FIG. 3). These data and Table 3 support the superior efficacy our compounds as promising leads.

TABLE 3

VCaP Viability Assay.

| Compound | $IC_{50}$ (µM) |
|---|---|
| (R)-1702 | 0.54 |
| (R)-1707 | 0.41 |
| (R)-1720 | 0.16 |
| Enzalutamide | 0.08 |

Figure 4:
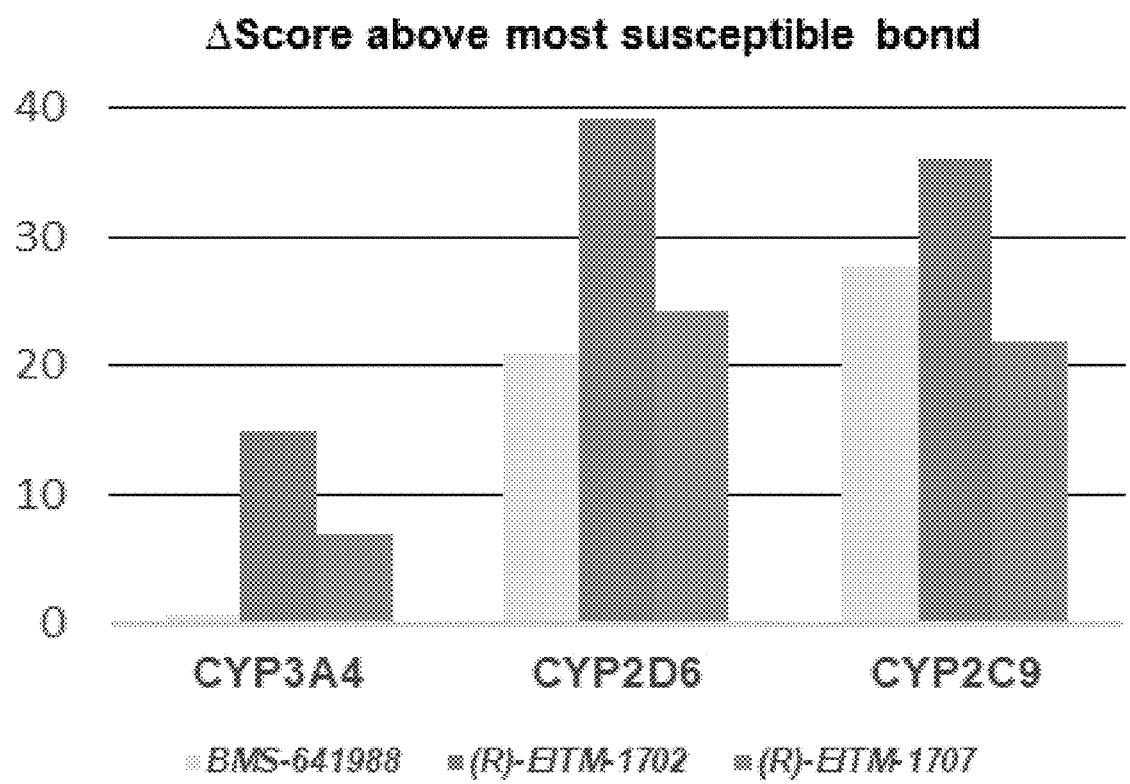
FIG. 4. Predictions of metabolism. Calculated C—N bond cleavage susceptibility to CYP enzymes: The C—N bonds in (R)-EITM-1702 and (R)-EITM-1707 are significantly less susceptible to cleavage by CYP enzymes, as manifested in the score difference (ΔScore) between the C—N bond and the most susceptible bond in the respective molecules.
Figure 5:
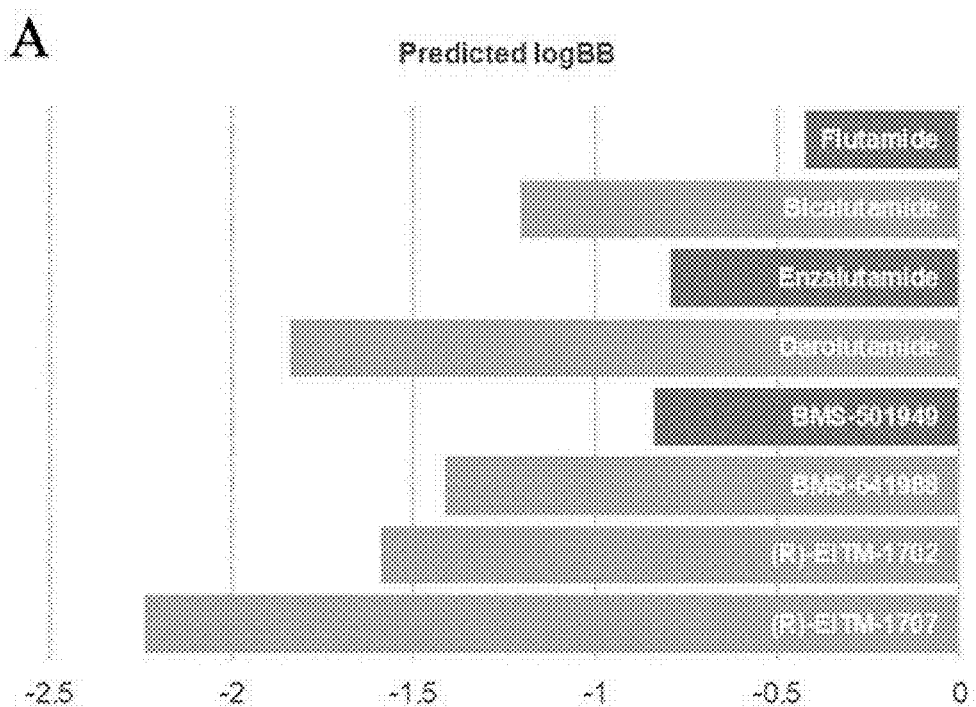
FIG. 5. Neurotoxicity potential of lead compounds. A) Calculated logBB of representative compounds. B) Extracted ion chromatograms of metabolites from liver microsome incubation. BMS-641988 is indicated as BMS standard in the third panel, and BMS-501949 as BMS toxic in the bottom panel. Rates of intrinsic clearance were established by measuring levels of intact compound after increasing incubation times using mass spectrometry.
Figure 5:
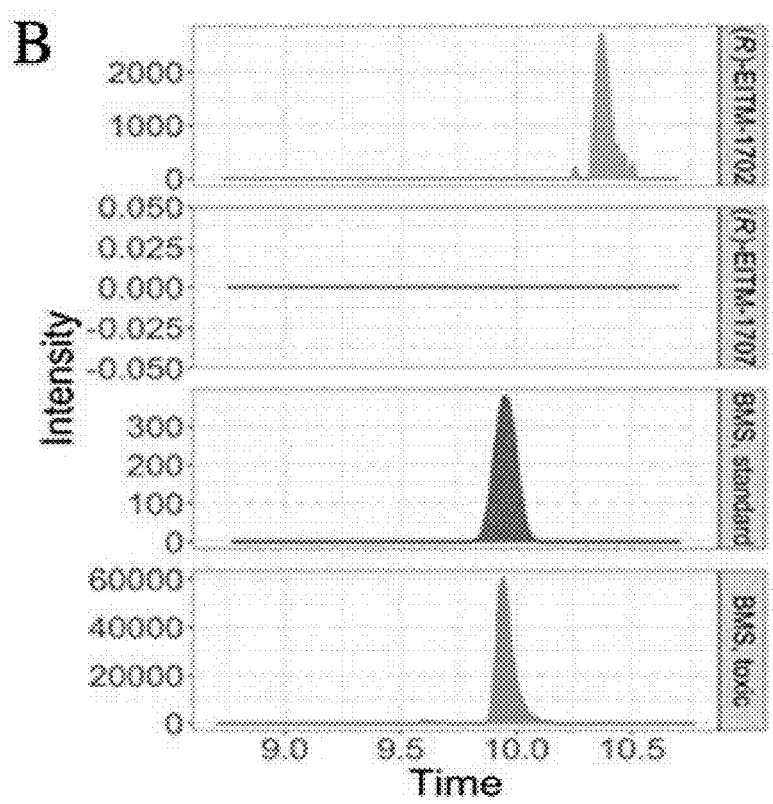

EITM-1702 and EITM-1707 exhibit favorable safety profiles. To estimate the safety profiles of our lead compounds, we predicted their BBB penetration relative to known androgen antagonists using the Schrodinger QikProp module. Setting logBB<−1 as a practical threshold, this provided good correlations with available in vivo data (FIG. 5A). For example, flutamide, enzalutamide and BMS-501949 were predicted to readily penetrate the BBB, whereas bicalutamide, darolutamide, BMS-641988, as well as our preclinical candidates all had logBB values <−1, suggestive of low BBB permeability. Furthermore, we calculated the metabolic susceptibility of our preclinical candidates using SMARTCyp, and found that our preclinical candidates are unlikely to be metabolized to BMS-501949 (FIG. 4). These calculations were confirmed by in vitro liver microsomes stability assays. Toxic metabolites (BMS-501949 for EITM-1702 and o-fluoro-BMS-501949 for EITM-1707) that accumulated in the BMS-641988 sample were not detected in EITM-1702 or EITM-1707, even after 8 h incubation (FIG. 5B, Table 4). Finally, the rates of intrinsic clearance were comparable across EITM-1702 (15.3 µl/min/mg), EITM-1707 (10.3 µl/min/mg), BMS-641988 (10.1 µl/min/mg). Taken together, these results suggest improved safety profiles of EITM-1702 and EITM-1707 compared to BMS-641988.

In summary, a heuristic medicinal chemistry campaign to develop a next generation antiandrogen for lethal CRPC, we synthesized a series of compounds derived from the molecular scaffold of BMS-641988, designed to avoid the problems of inadequate efficacy and metabolite toxicity of this drug which entered but failed a Phase I clinical trial. We have confirmed that BMS-641988 is a potent agonist in LNCaP cells, whereas our designed drugs are pure antagonists of LNCaP AR. Two of the preclinical candidates identified, EITM-1702 and -1707, have effective in vitro potencies ($ED_{50}$ of 570 nM and 940 nM respectively). Both computational calculations and microsomal experiments suggest that EITM-1702 and -1707 will have improved safety profiles over existing drugs. EITM-1702 and -1707 are promising candidate lead compounds suitable for further preclinical development as potentially more effective AR antagonists for treating CRPC.

Paradoxical Androgen Receptor Regulation by Small Molecule Enantiomers

Figure 6:
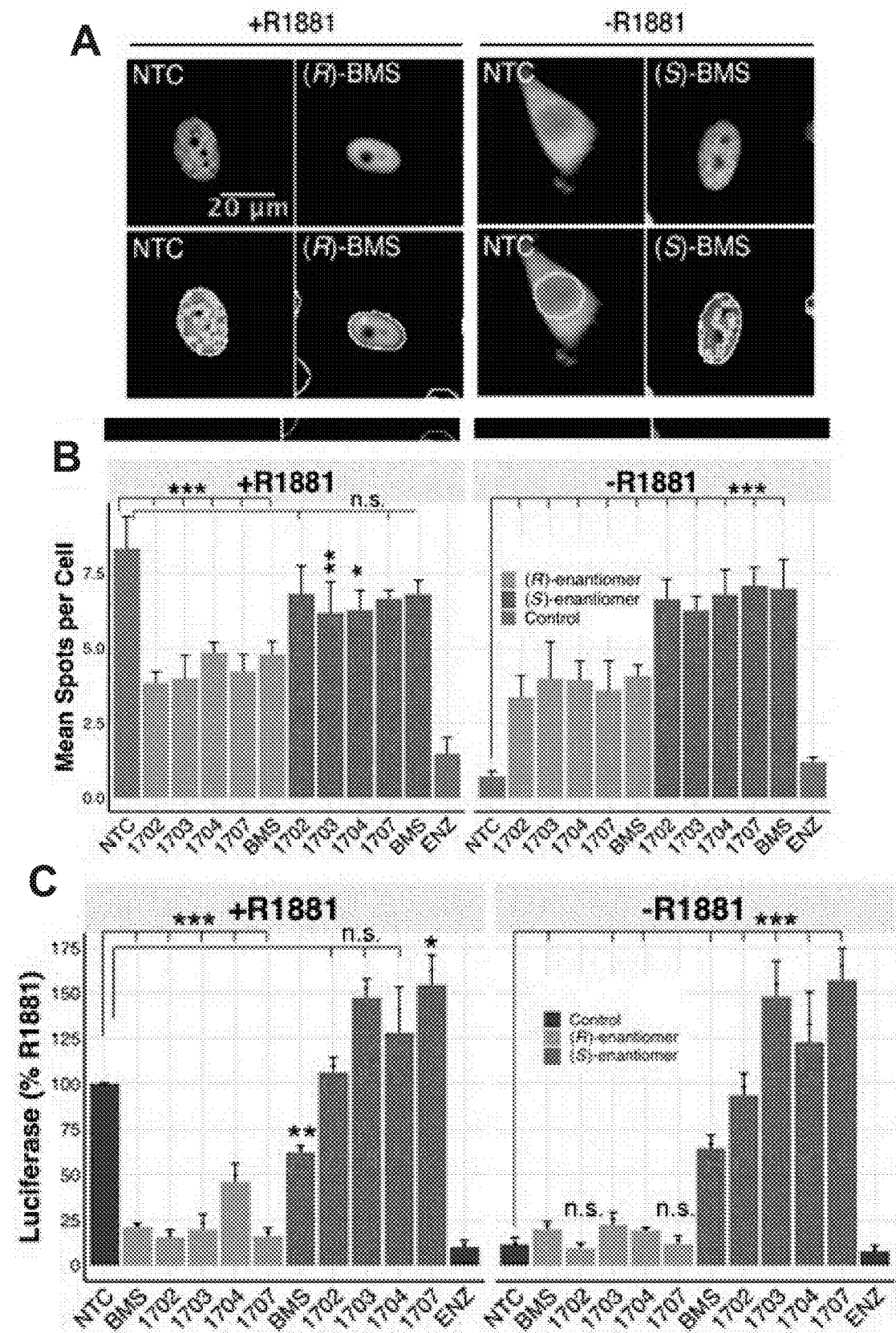
FIG. 6. Agonist/antagonist duality of enantiomers. (A) Confocal microscopy of PC3 GFP-AR cells treated with 10 μM purified enantiomers (180 min) and 1 nM R1881 (90 min). Representative cells are depicted. (B) Nuclear speckling quantification of EITM drug pairs. Data (n=3 encompassing 11,188 cells) are mean±SD (wide) and SE (narrow), linear model (two-sided) significance tests for difference from controls. (C) ARE-luciferase assays in cells treated with 10 μM drug+1 nM R1881. Data (n≥4) are mean±SD, linear model (two-sided), (EITM-drugs+R1881) vs. R1881, and (— R1881) vs. NTC. (D) Expression of 82 AR-regulated genes in VCaP cells treated with EITM-1707 enantiomers via qPCR Array. Gene expressions were projected along the expression change vector between NTC (0%) and DHT (100%). Data (n=3) are mean±SD, ANOVA with post hoc correction, vs. NTC (Left) and DHT (Right). (E) Proposed model of AR antagonist/agonist duality. Overlay of (S)-EITM-1703 docked onto AR-LBD in closed conformation, and (R)-EITM-1703 in open AR homology model. (F) ARE luciferase assays in cells expressing GFP-AR with point mutations to predicted binding sites and treated with 10 μM drug+1 nM R1881. Data (n≥3) are mean±SD (wide) and SE (narrow), linear model significance tests for difference (relative to NTC-R1881) from WT AR and the corresponding mutation (corrected for multiple comparisons). NTC=no treatment control, ENZ=enzalutamide, DHT=dihydrotestosterone, (R)-BMS=BMS-641988 and its (S)-isomer (S)-BMS. *P<0.05, P<0.01, *P<0.001, n.s., not significant. P values corrected for multiple comparisons at a familywise error rate of 0.05.
Figure 6:
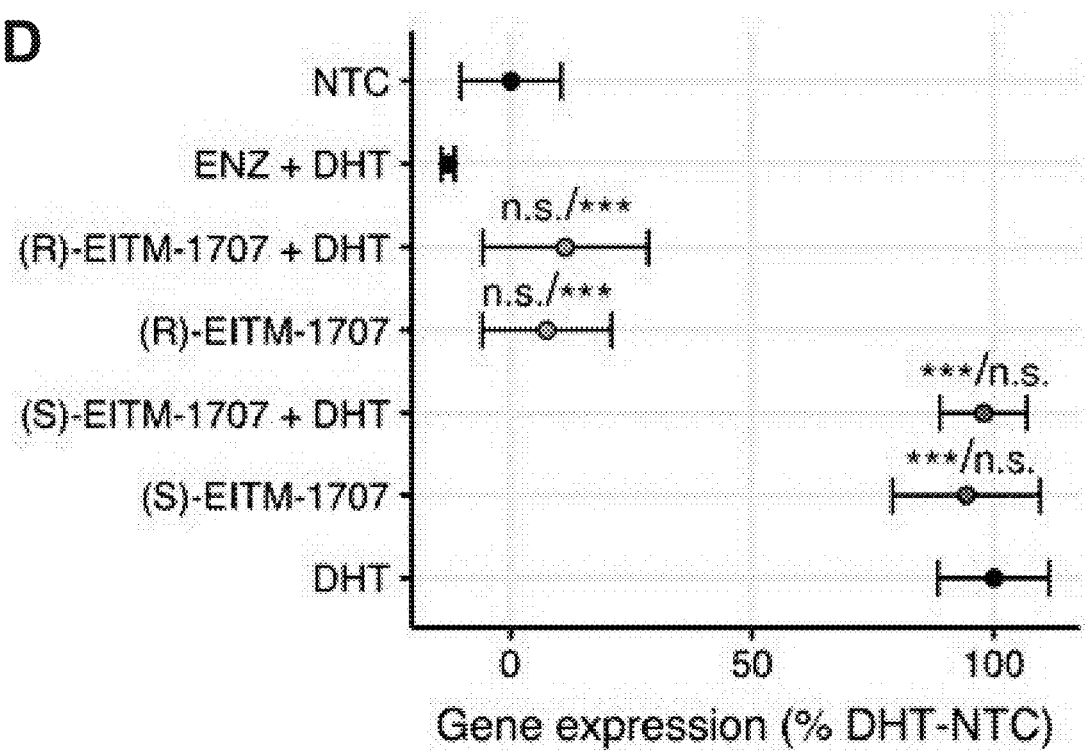
Figure 6:
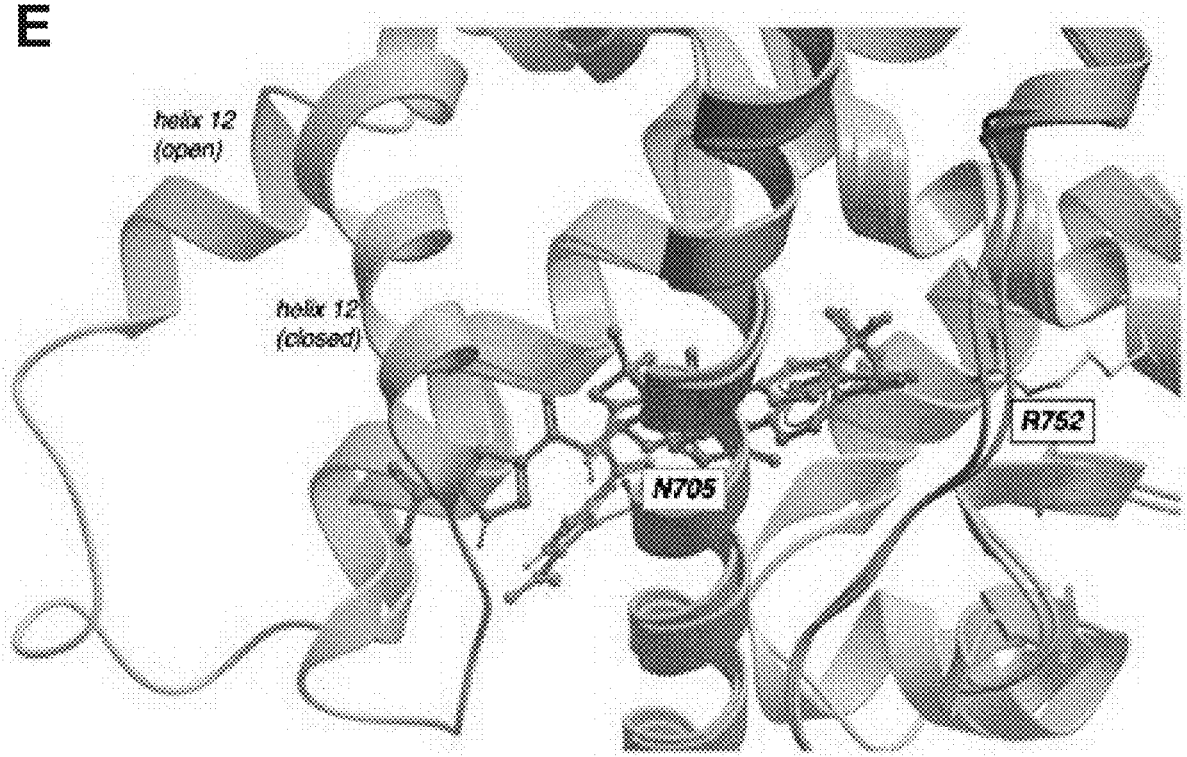
Figure 6:
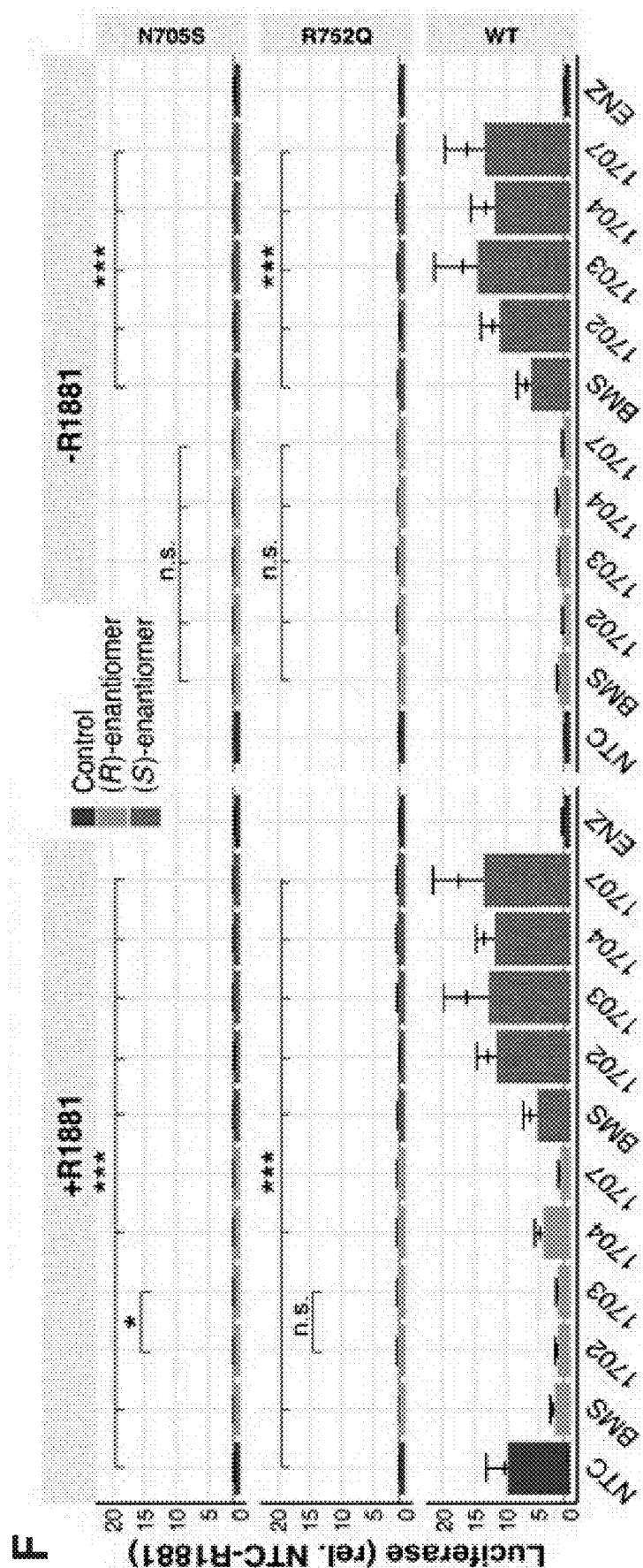

Antagonist/Agonist Duality of Chiral Molecules. Initial compound testing was performed with PC3 GFP-AR cells and confocal microscopy. First, we tested purified BMS enantiomers (FIG. 6A). As expected, (R)-BMS was an antagonist: treatment initiated nuclear translocation but inhibited R1881-induced hyperspeckling. Surprisingly, (S)-BMS alone caused substantial hyperspeckling, comparable to that of R1881. To explore the significance of this result, which appeared to contradict literature inferences (7, 10), we prepared a series "EITM-compounds" of cognate derivatives (shown below).

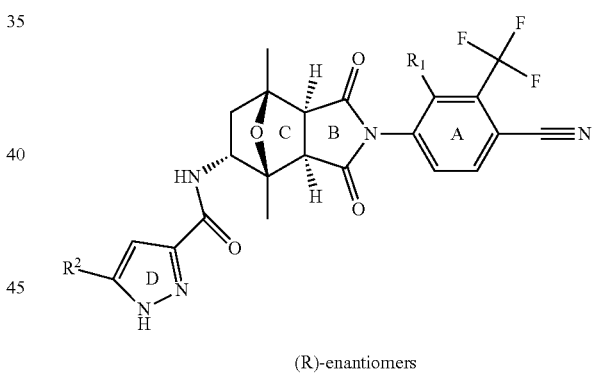

(R)-enantiomers

TABLE 4

Metabolism of representative compounds in liver microsomes.

| Compound | Chemical Formula (MW) | T½ (min) | Clint (ml/min/mg) | Metabolite | Metabolite type | Detected in LCMS |
|---|---|---|---|---|---|---|
| (R)-EITM-1702 | $C_{22}H_{18}F_3N_5O_4$ 473.13 | 56.66 | 15.3 | Unnamed $C_{22}H_{18}F_3N_5O_5$ | active (predicted) | yes |
|  |  |  |  | BMS-501949 $C_{18}H_{15}F_3N_2O_4$ | toxic (predicted) | no |
| (R)-EITM-1707 | $C_{24}H_{21}F_4N_5O_5$ 535.15 | 47.3 | 10.3 | Unnamed $C_{24}H_{19}F_4N_5O_5$ | active (predicted) | yes |
|  |  |  |  | BMS-501949 $C_{18}H_{14}F_4N_2O_4$ | toxic (predicted) | no |
| BMS-641988 | $C_{20}H_{20}F_3N_3O_5S$ 471.11 | 86.4 | 10.1 | BMS-570511 $C_{18}H_{13}F_3N_2O_4$ | active | yes |
|  |  |  |  | BMS-501949 $C_{18}H_{15}F_3N_2O_4$ | toxic | yes |

-continued

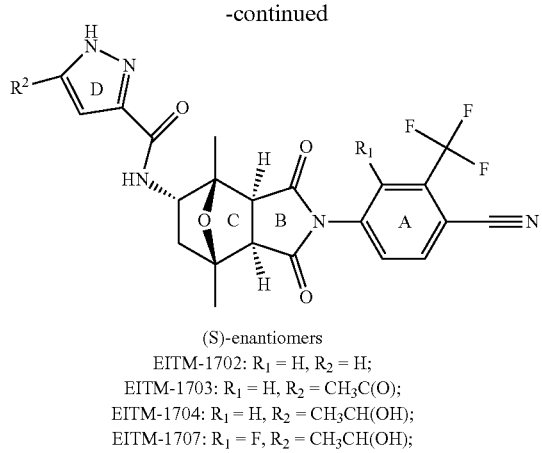

(S)-enantiomers
EITM-1702: $R_1$ = H, $R_2$ = H;
EITM-1703: $R_1$ = H, $R_2$ = $CH_3C(O)$;
EITM-1704: $R_1$ = H, $R_2$ = $CH_3CH(OH)$;
EITM-1707: $R_1$ = F, $R_2$ = $CH_3CH(OH)$;

Remarkably, their increased molecular size did not overcome paradoxical AR regulation. Nuclear spot quantification in >10,000 cells revealed all four (R)-enantiomers inhibited R1881-induced hyperspeckling, and their (S)-enantiomers induced it on their own (FIG. 6B). To test for corresponding transcriptional activation, we performed assays in cells expressing ARE-luciferase. (R)-enantiomers inhibited R1881-induced ARE-luciferase to 24% (18%, 34%) 95% CI vs. untreated R1881 control (no treatment control [NTC]+ R1881, 100%) (FIG. 6C). In contrast, their (S)-enantiomers activated ARE-luciferase to 110% (87%, 130%) 95% CI that of untreated control (NTC, 11%) (FIG. 6C). Next, we examined gene expression in VCaP cells, a hormone-responsive but independent model of CRPC highly expressing AR. A qPCR array assaying 82 AR target genes in response to the natural hormone dihydrotestosterone (DHT) confirmed that (R)-EITM-1707 down-regulated AR-dependent gene expression, closely resembling androgen starvation. Its (S)-enantiomer rescued the castration phenotype, mimicking DHT (FIG. 6D). These experiments demonstrate enantiomer-dependent antagonist/agonist duality across these C-5 stereoisomers, pointing to an unknown mechanism of AR regulation that involves a switch from antagonism to agonism.

Model of AR-Enantiomer Duality. To explore the unexpected agonist properties of the (S)-enantiomers, we performed induced fit docking with the AR-LBD (PDB: 1E3G) (11) and (S)-EITM-1703. In the resulting model (rmsd=0.28 Å), substituents do not clash with H12, but rather promote a closed conformation, which explains the observed agonism (FIG. 6E). Next, we sought to model the antagonist action of (R)-EITM-1703. Due to the absence of crystal structures of antagonist bound AR in open conformation, we built a three-dimensional (3D) homology model based on that of the progesterone receptor (2OVM) (12) (FIG. 6E). Now, ring D obstructs H12, preventing closure. An overlay of the two models in FIG. 6E shows the strikingly different compound orientations within the pocket. In both cases, hydrogen bonds are formed with R752 and N705, the same residues that bind DHT (13) and R1881 (11). We confirmed these critical binding sites in cells expressing point mutations that significantly reduced agonist functionality of both R1881 and (S)-enantiomers in our ARE luciferase assay (FIG. 6F). Our AR model provides a rationale for the paradoxical agonism of the (S)-enantiomers, highlighting the importance of a specific, rigid spatial orientation of the ligand within the AR-LBD to ensure that antagonist function is not subverted to agonism. Future studies will systematically examine mutations within H12 that contribute to its steric interactions with the ligands.

Figure 7:
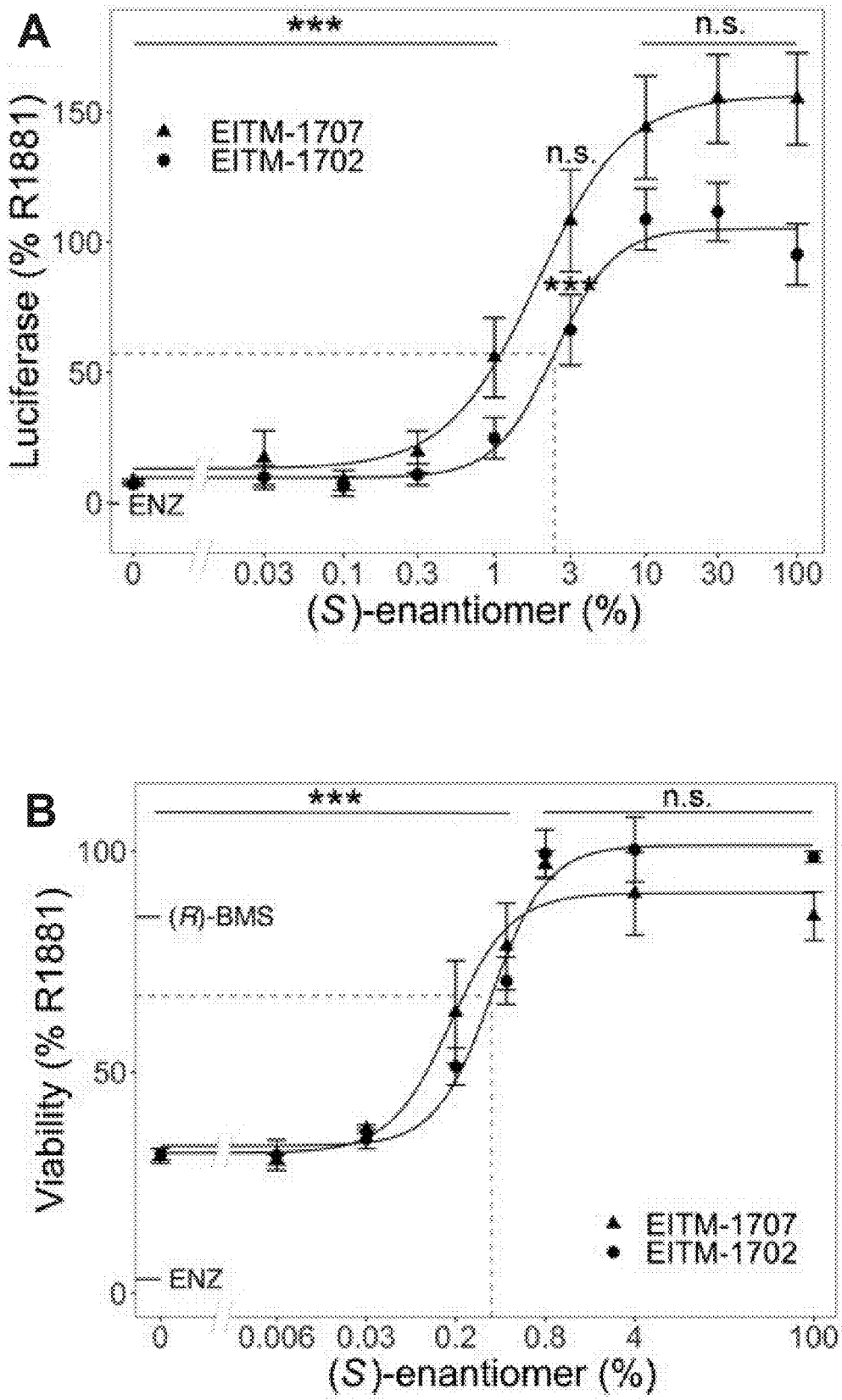
FIG. 7. Role of enantiomer duality in in vitro drug testing. (A and B) Assays in cells treated with 10 μM drug with increasing fractions of (S)-enantiomer+1 nM R1881. (A) ARE-luciferase was measured after 24 h and (B) VCaP cell viability after 6 d of treatment using CellTiter-Glo. Data (n=3) are mean±SD, one-sided Wilcoxon test for decrease from R1881 across both drugs. Dashed lines represent relative $EC_{50}$ for EITM-1702. Zero % data points were not used to fit the curves. (C and D) Pairwise $EC_{50}$ values computed from (C) competition binding curves obtained via fluorescence polarization and (D) ARE-luciferase dose-response curves run in antagonist mode (1 nM R1881) with (R)-drugs and in agonist mode (-R1881) with their respective (S)-isomers. Data (n≥3) are mean±SD, two-sided Welch t test, P<0.01, *P<0.001, n.s., not significant. NTC=no treatment control, ENZ=enzalutamide.
Figure 7:
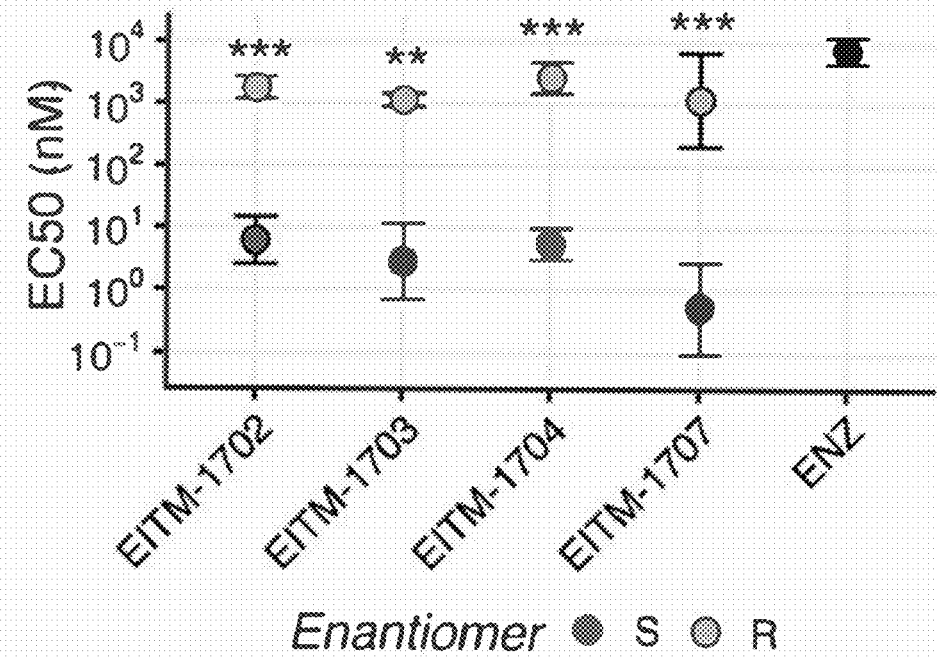
Figure 7:
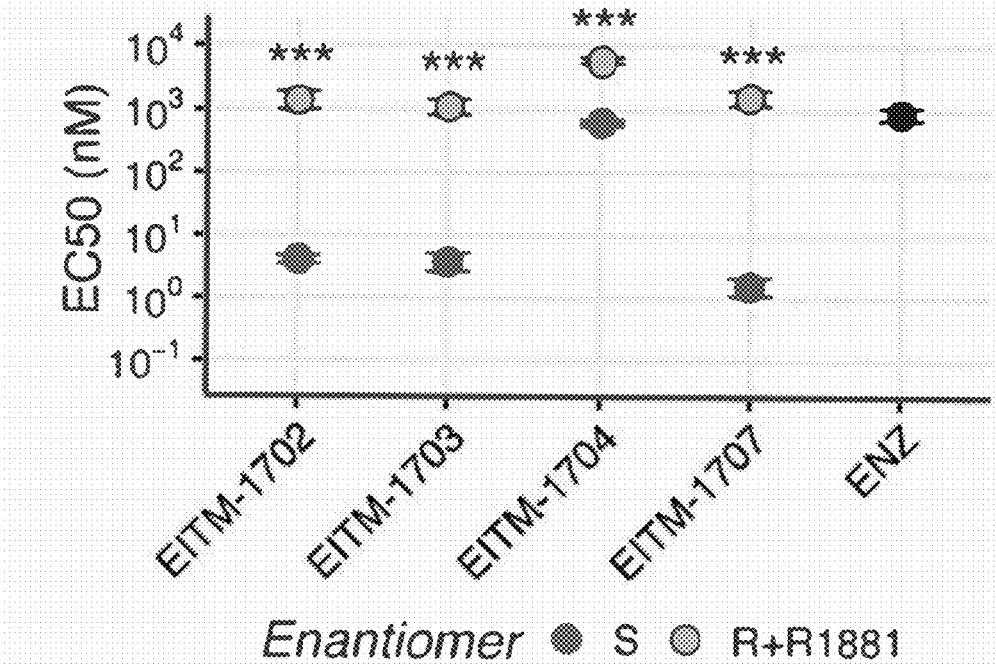

Role of Enantiomer Duality in Drug Discovery. This new AR duality provoked the question whether agonistic enantiomer contamination could interfere with assays commonly used to identify new antiandrogens. To measure the impact of impurities after resolution, we spiked highly purified (R)-drugs with their (S)-isomers and treated cells with 10 µM of the mixtures. For both EITM-1702 and EITM-1707, ARE-luciferase signals rapidly increased with increasing levels of contamination (FIG. 7A). For (S)-EITM-1702, 2.5% contamination (2.1%, 2.9%) 95% CI halved the drug effect, and 9% (6.0%, 12.0%) 95% CI canceled out its antagonist effect entirely (FIG. 7A). The contamination effect was even more detrimental on cell viability measured via CellTiter-Glo. After 6-d treatment, pure (R)-EITM-1702 and (R)-EITM-1707 visibly suppressed R1881-induced growth, whereas BMS-641988 did not (FIG. 7B). Strikingly, as little as 0.3% (S)-enantiomer halved EITM-1702 drug effect (0.2%, 0.4%) 95% CI, and 2.2% rescued the proliferation phenotype (0.7%, 3.7%) 95% CI (FIG. 7B). Furthermore, agonist $EC_{50}$ values obtained by fluorescence polarization and ARE-luciferase were consistently lower than their respective antagonist counterparts, suggestive of higher affinity (FIG. 7C) and potency (FIG. 7D). These experiments reveal the critical importance of enantiopurity in this drug class, even during early discovery when antagonist "hits" could be otherwise missed or even misidentified as agonists.

Pharmaceutical Formulations

The compounds described herein can be used to prepare therapeutic pharmaceutical compositions, for example, by combining the compounds with a pharmaceutically acceptable diluent, excipient, or carrier. The compounds may be added to a carrier in the form of a salt or solvate. For example, in cases where compounds are sufficiently basic or acidic to form stable nontoxic acid or base salts, administration of the compounds as salts may be appropriate. Examples of pharmaceutically acceptable salts are organic acid addition salts formed with acids that form a physiologically acceptable anion, for example, tosylate, methanesulfonate, acetate, citrate, malonate, tartrate, succinate, benzoate, ascorbate, α-ketoglutarate, and β-glycerophosphate. Suitable inorganic salts may also be formed, including hydrochloride, halide, sulfate, nitrate, bicarbonate, and carbonate salts.

Pharmaceutically acceptable salts may be obtained using standard procedures well known in the art, for example by reacting a sufficiently basic compound such as an amine with a suitable acid to provide a physiologically acceptable ionic compound. Alkali metal (for example, sodium, potassium or lithium) or alkaline earth metal (for example, calcium) salts of carboxylic acids can also be prepared by analogous methods.

The compounds of the formulas described herein can be formulated as pharmaceutical compositions and administered to a mammalian host, such as a human patient, in a variety of forms. The forms can be specifically adapted to a chosen route of administration, e.g., oral or parenteral administration, by intravenous, intramuscular, topical or subcutaneous routes.

The compounds described herein may be systemically administered in combination with a pharmaceutically acceptable vehicle, such as an inert diluent or an assimilable edible carrier. For oral administration, compounds can be enclosed in hard- or soft-shell gelatin capsules, compressed into tablets, or incorporated directly into the food of a patient's diet.

Compounds may also be combined with one or more excipients and used in the form of ingestible tablets, buccal tablets, troches, capsules, elixirs, suspensions, syrups, wafers, and the like. Such compositions and preparations typically contain at least 0.1% of active compound. The percentage of the compositions and preparations can vary and may conveniently be from about 0.5% to about 60%, about 1% to about 25%, or about 2% to about 10%, of the weight of a given unit dosage form. The amount of active compound in such therapeutically useful compositions can be such that an effective dosage level can be obtained.

The tablets, troches, pills, capsules, and the like may also contain one or more of the following: binders such as gum tragacanth, acacia, corn starch or gelatin; excipients such as dicalcium phosphate; a disintegrating agent such as corn starch, potato starch, alginic acid and the like; and a lubricant such as magnesium stearate. A sweetening agent such as sucrose, fructose, lactose or aspartame; or a flavoring agent such as peppermint, oil of wintergreen, or cherry flavoring, may be added. When the unit dosage form is a capsule, it may contain, in addition to materials of the above type, a liquid carrier, such as a vegetable oil or a polyethylene glycol. Various other materials may be present as coatings or to otherwise modify the physical form of the solid unit dosage form. For instance, tablets, pills, or capsules may be coated with gelatin, wax, shellac or sugar and the like. A syrup or elixir may contain the active compound, sucrose or fructose as a sweetening agent, methyl and propyl parabens as preservatives, a dye and flavoring such as cherry or orange flavor. Any material used in preparing any unit dosage form should be pharmaceutically acceptable and substantially non-toxic in the amounts employed. In addition, the active compound may be incorporated into sustained-release preparations and devices.

The active compound may be administered intravenously or intraperitoneally by infusion or injection. Solutions of the active compound or its salts can be prepared in water, optionally mixed with a nontoxic surfactant. Dispersions can be prepared in glycerol, liquid polyethylene glycols, triacetin, or mixtures thereof, or in a pharmaceutically acceptable oil. Under ordinary conditions of storage and use, preparations may contain a preservative to prevent the growth of microorganisms.

Pharmaceutical dosage forms suitable for injection or infusion can include sterile aqueous solutions, dispersions, or sterile powders comprising the active ingredient adapted for the extemporaneous preparation of sterile injectable or infusible solutions or dispersions, optionally encapsulated in liposomes. The ultimate dosage form should be sterile, fluid and stable under the conditions of manufacture and storage. The liquid carrier or vehicle can be a solvent or liquid dispersion medium comprising, for example, water, ethanol, a polyol (for example, glycerol, propylene glycol, liquid polyethylene glycols, and the like), vegetable oils, nontoxic glyceryl esters, and suitable mixtures thereof. The proper fluidity can be maintained, for example, by the formation of liposomes, by the maintenance of the required particle size in the case of dispersions, or by the use of surfactants. The prevention of the action of microorganisms can be brought about by various antibacterial and/or antifungal agents, for example, parabens, chlorobutanol, phenol, sorbic acid, thimerosal, and the like. In many cases, it will be preferable to include isotonic agents, for example, sugars, buffers, or sodium chloride. Prolonged absorption of the injectable compositions can be brought about by agents delaying absorption, for example, aluminum monostearate and/or gelatin.

Sterile injectable solutions can be prepared by incorporating the active compound in the required amount in the appropriate solvent with various other ingredients enumerated above, as required, optionally followed by filter sterilization. In the case of sterile powders for the preparation of sterile injectable solutions, methods of preparation can include vacuum drying and freeze-drying techniques, which yield a powder of the active ingredient plus any additional desired ingredient present in the solution.

For topical administration, compounds may be applied in pure form, e.g., when they are liquids. However, it will generally be desirable to administer the active agent to the skin as a composition or formulation, for example, in combination with a dermatologically acceptable carrier, which may be a solid, a liquid, a gel, or the like.

Useful solid carriers include finely divided solids such as talc, clay, microcrystalline cellulose, silica, alumina, and the like. Useful liquid carriers include water, dimethyl sulfoxide (DMSO), alcohols, glycols, or water-alcohol/glycol blends, in which a compound can be dissolved or dispersed at effective levels, optionally with the aid of non-toxic surfactants. Adjuvants such as fragrances and additional antimicrobial agents can be added to optimize the properties for a given use. The resultant liquid compositions can be applied from absorbent pads, used to impregnate bandages and other dressings, or sprayed onto the affected area using a pump-type or aerosol sprayer.

Thickeners such as synthetic polymers, fatty acids, fatty acid salts and esters, fatty alcohols, modified celluloses, or modified mineral materials can also be employed with liquid carriers to form spreadable pastes, gels, ointments, soaps, and the like, for application directly to the skin of the user.

Examples of dermatological compositions for delivering active agents to the skin are known to the art; for example, see U.S. Pat. No. 4,992,478 (Geria), U.S. Pat. No. 4,820,508 (Wortzman), U.S. Pat. No. 4,608,392 (Jacquet et al.), and U.S. Pat. No. 4,559,157 (Smith et al.). Such dermatological compositions can be used in combinations with the compounds described herein where an ingredient of such compositions can optionally be replaced by a compound described herein, or a compound described herein can be added to the composition.

Useful dosages of the compounds described herein can be determined by comparing their in vitro activity, and in vivo activity in animal models. Methods for the extrapolation of effective dosages in mice, and other animals, to humans are known to the art; for example, see U.S. Pat. No. 4,938,949 (Borch et al.). The amount of a compound, or an active salt or derivative thereof, required for use in treatment will vary not only with the particular compound or salt selected but also with the route of administration, the nature of the condition being treated, and the age and condition of the patient, and will be ultimately at the discretion of an attendant physician or clinician.

In general, however, a suitable dose will be in the range of from about 0.5 to about 100 mg/kg, e.g., from about 10 to about 75 mg/kg of body weight per day, such as 3 to about 50 mg per kilogram body weight of the recipient per day, preferably in the range of 6 to 90 mg/kg/day, most preferably in the range of 15 to 60 mg/kg/day.

The compound is conveniently formulated in unit dosage form; for example, containing 5 to 1000 mg, conveniently 10 to 750 mg, most conveniently, 50 to 500 mg of active ingredient per unit dosage form. In one embodiment, the invention provides a composition comprising a compound of the invention formulated in such a unit dosage form.

The compound can be conveniently administered in a unit dosage form, for example, containing 5 to 1000 mg/m², conveniently 10 to 750 mg/m², most conveniently, 50 to 500 mg/m² of active ingredient per unit dosage form. The desired dose may conveniently be presented in a single dose or as divided doses administered at appropriate intervals, for example, as two, three, four or more sub-doses per day. The sub-dose itself may be further divided, e.g., into a number of discrete loosely spaced administrations.

The desired dose may conveniently be presented in a single dose or as divided doses administered at appropriate intervals, for example, as two, three, four or more sub-doses per day. The sub-dose itself may be further divided, e.g., into a number of discrete loosely spaced administrations; such as multiple inhalations from an insufflator or by application of a plurality of drops into the eye.

The compounds described herein can be effective anti-cancer agents and have higher potency and/or reduced toxicity as compared to BMS-641988. Preferably, compounds of the invention are more potent and less toxic than BMS-641988, and/or avoid a potential site of metabolism encountered with BMS-641988, i.e., have a different metabolic profile than BMS-641988.

The invention provides therapeutic methods of treating cancer in a mammal, which involve administering to a mammal having cancer an effective amount of a compound or composition described herein. A mammal includes a primate, human, rodent, canine, feline, bovine, ovine, equine, swine, caprine, bovine and the like. Cancer refers to any various type of malignant neoplasm, for example, colon cancer, breast cancer, prostate cancer, melanoma and leukemia, and in general is characterized by an undesirable cellular proliferation, e.g., unregulated growth, lack of differentiation, local tissue invasion, and metastasis.

The ability of a compound of the invention to treat cancer may be determined by using assays well known to the art. For example, the design of treatment protocols, toxicity evaluation, data analysis, quantification of tumor cell kill, and the biological significance of the use of transplantable tumor screens are known.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1. Materials and General Methods

Unless otherwise noted, all reagents and solvents were commercially available and used as received. The progress of all reactions was monitored on precoated silica gel plates (with fluorescence indicator UV254) using ethyl acetate/hexane or dichloromethane/methanol as solvent systems. Column chromatography was performed with Teledyne Isco Combiflash with the solvent mixtures specified in the corresponding experiment. NMR spectra were recorded on either a Varian 400, 500 or 600 at room temperature. Data is reported as follows: chemical shift (ppm, δ relative to residual solvent peak for $^1$H and $^{13}$C), multiplicity (s=singlet, d=doublet, t=triplet, q=quartet, m=multiplet, and br=broad), coupling constant (Hz), and integration. $^{19}$F NMR spectra were recorded with proton decoupling. Optical rotation was determined by a Jasco P2000 polarimeter. Specific rotations $[\alpha]^D{}_{20}$ are given in deg cm³ g⁻¹ dm⁻¹. Low-resolution mass spectrometry (LRMS) analysis was performed using on Advion Expression. Chiral HPLC separation was performed on Shimadzu Prominence: column, Chiralcel OD-H (5 μm, 250 mm×4.6 mm) or ProntoSIL AX QN (5 μm, 150 mm×8.0 mm) or ProntoSIL Chiral AX QD-1 (5 μm, 150 mm×4.0 mm); eluents hexane/isopropanol or acetonitrile with detection at 254 nm; column temperature of 20° C. All final compounds have a purity of >95% confirmed by HPLC. All final compounds were further purified by reverse phase HPLC with the same instrument on Phenomenex Luna C18 column with 50% acetonitrile in water.

General Synthetic Methods. Anilines 1 were either purchased or prepared according to known procedures (Scheme 5,6). Carboxylic acids 8 were either purchased or prepared according to known procedures (Scheme 7). Amine intermediates (7a and 7b) and azide intermediates (15a and 15b) were prepared according to known procedures (Scheme 8).

Scheme 5. Synthesis of 4-amino-3-methyl-2-(trifluoromethyl)benzonitrile.

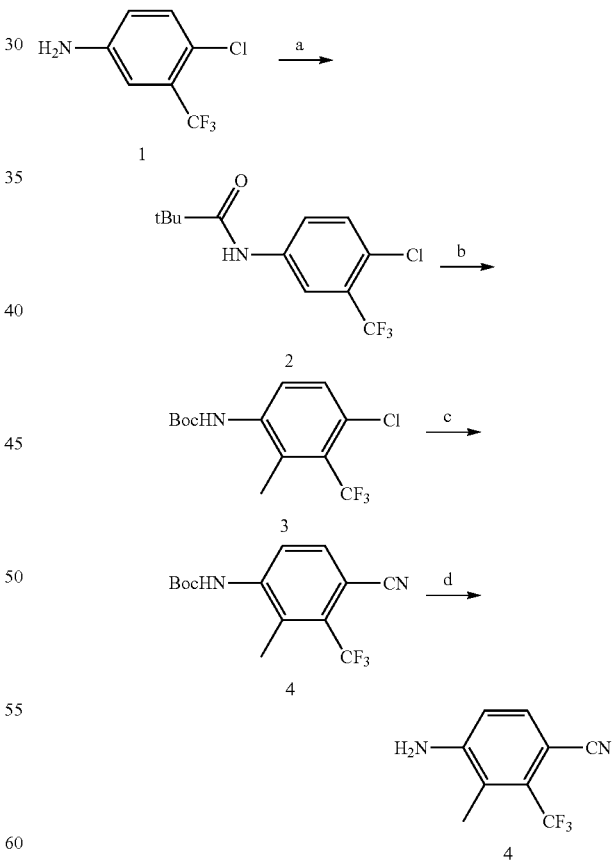

Reagents and conditions:
(a) PivCl, Et₃N, dry THF, 90%
(b) nBuLi, MeI, dry THF, 10%;
(c) CuCN, NMP, 32%;
(d) HCl, EtOH, 95%.

Scheme 6. Synthesis of 4-amino-3-methyl-2-(trifluoromethyl) benzonitrile.
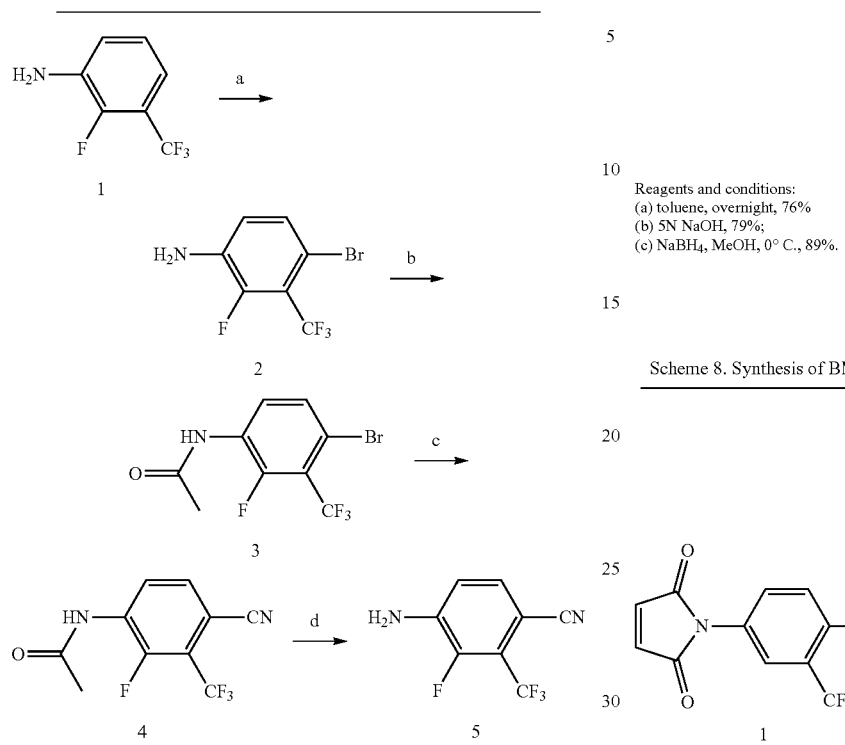
Reagents and conditions:
(a) NBS, DMF, 86%;
(b) Ac₂O; 96%;
(c) CuCN, DMF, 64%;
(d) HCl, EtOH, 90%.
Reagents and conditions:
(a) toluene, overnight, 76%
(b) 5N NaOH, 79%;
(c) NaBH₄, MeOH, 0° C., 89%.
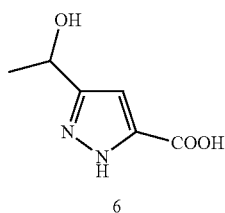
Scheme 8. Synthesis of BMS-641988 and its (S)-enantiomer 9 (S-BMS).
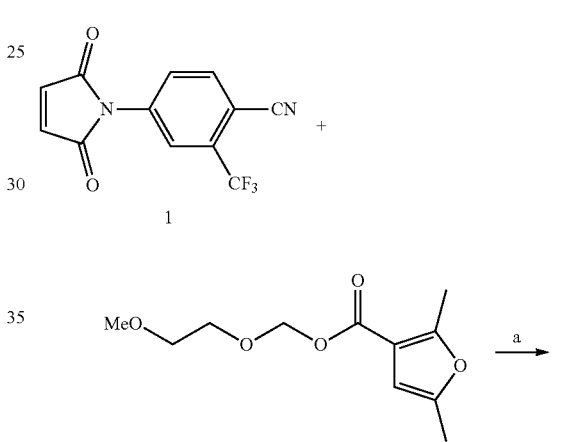
Scheme 7. Synthesis of 3-acetyl-1H-pyrazole-5-carboxylic acid and 3-(1-hydroxyethyl)-1H-pyrazole-5-carboxylic acid.
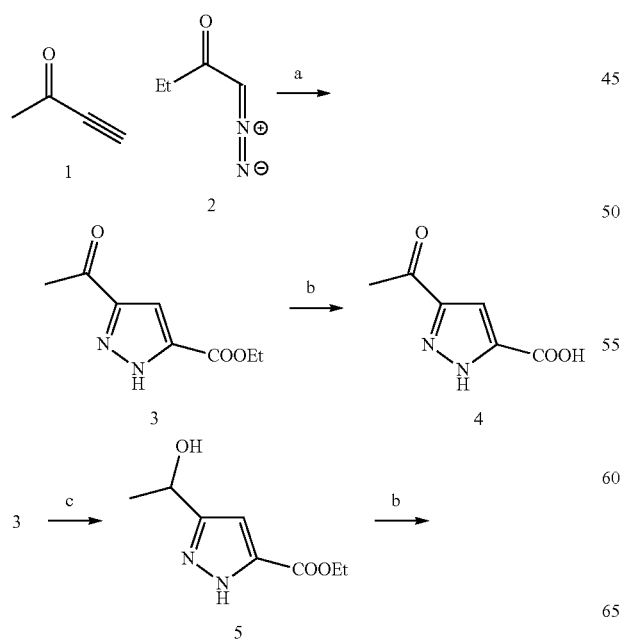
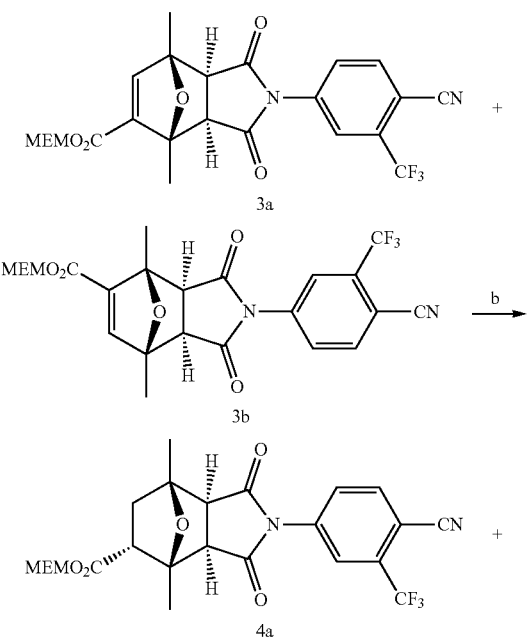

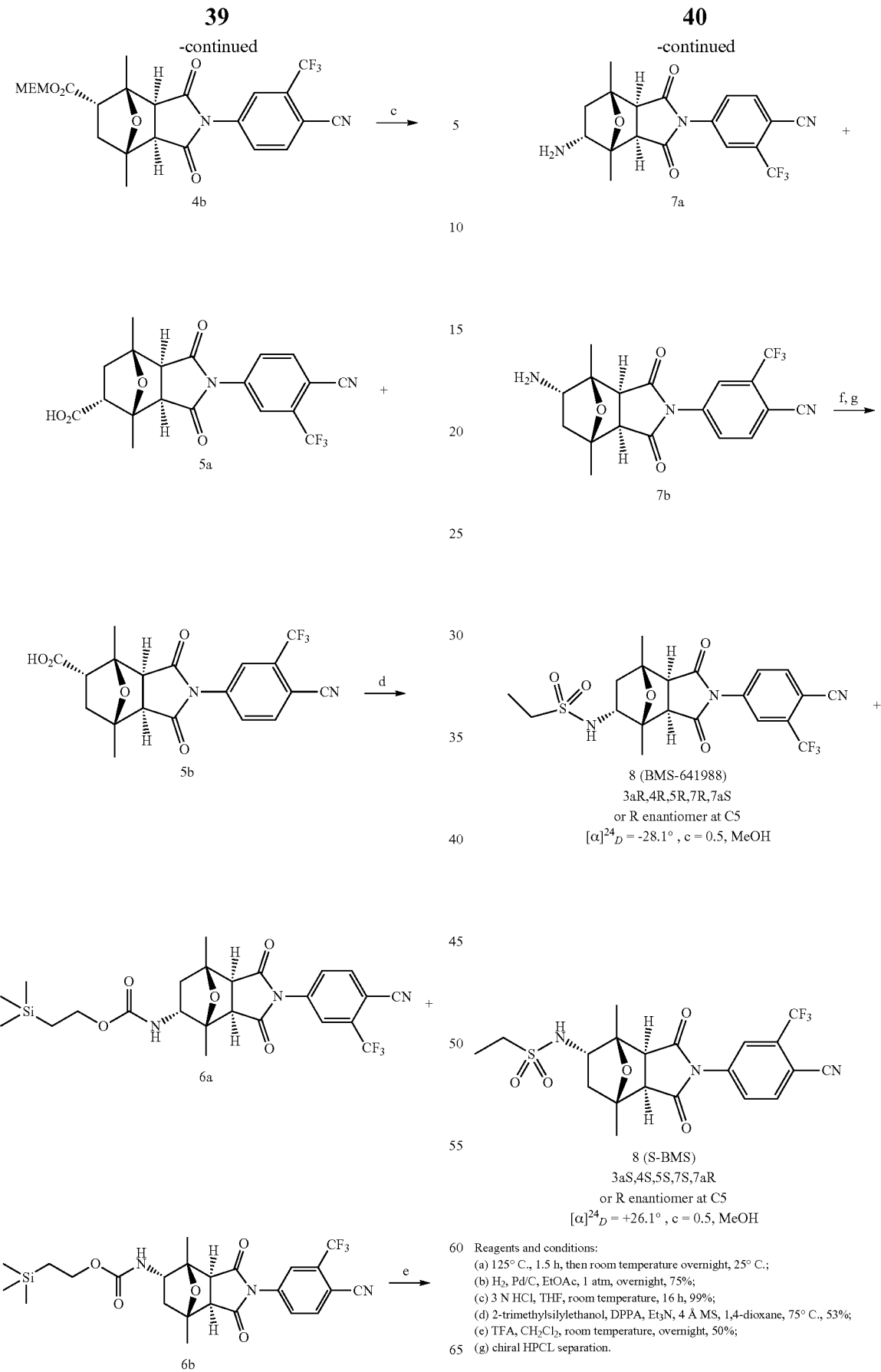
Reagents and conditions:
(a) 125° C., 1.5 h, then room temperature overnight, 25° C.;
(b) H₂, Pd/C, EtOAc, 1 atm, overnight, 75%;
(c) 3 N HCl, THF, room temperature, 16 h, 99%;
(d) 2-trimethylsilylethanol, DPPA, Et₃N, 4 Å MS, 1,4-dioxane, 75° C., 53%;
(e) TFA, CH₂Cl₂, room temperature, overnight, 50%;
(g) chiral HPCL separation.

Scheme 9. Synthesis of (R)-EITM-1702, (R)-EITM-1703, (R)-EITM-1704 and their respective (S)-enantiomers.
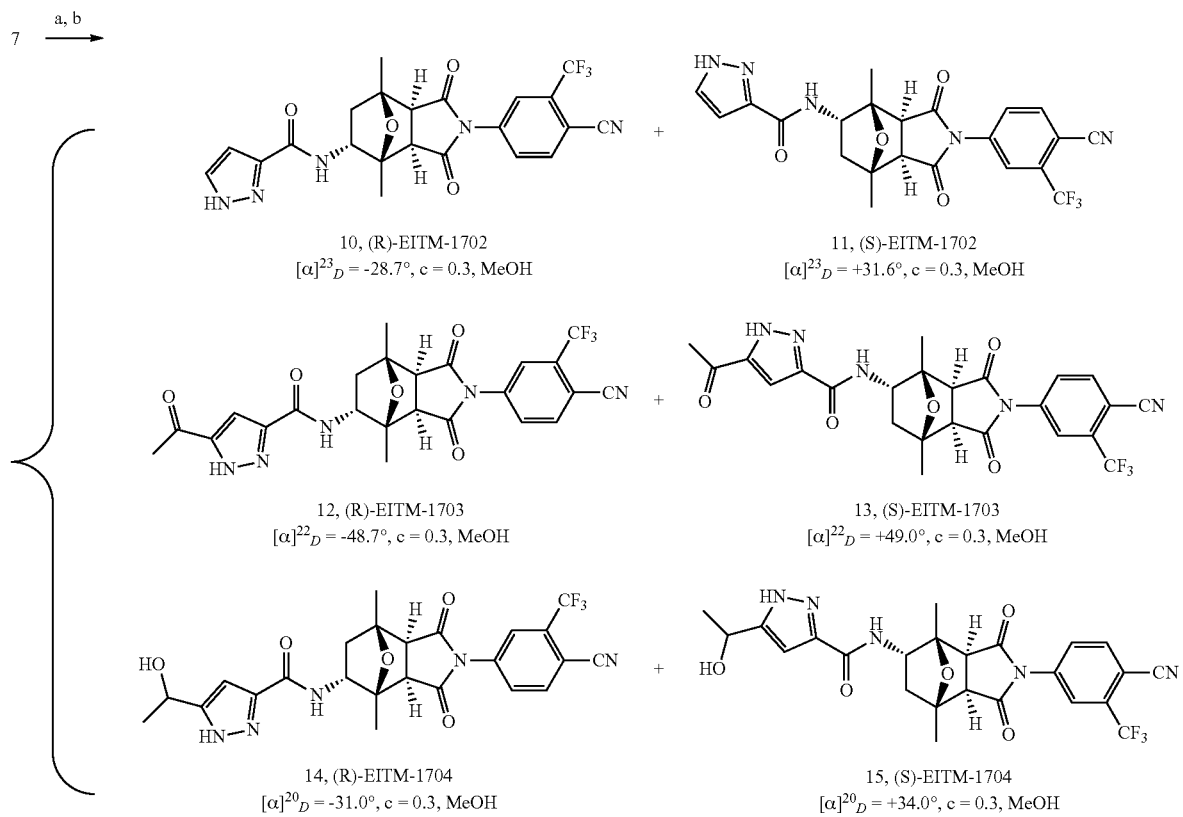
Reagents and conditions:
(a) substituted carboxylic acids, HATU, DIPEA, DMF, room temperature, overnight, 56-72%;
(b) chiral HPLC separation.
Scheme 10.
Synthesis of (R)-EITM-1707 and its enantiomer (S)-EITM-1707.
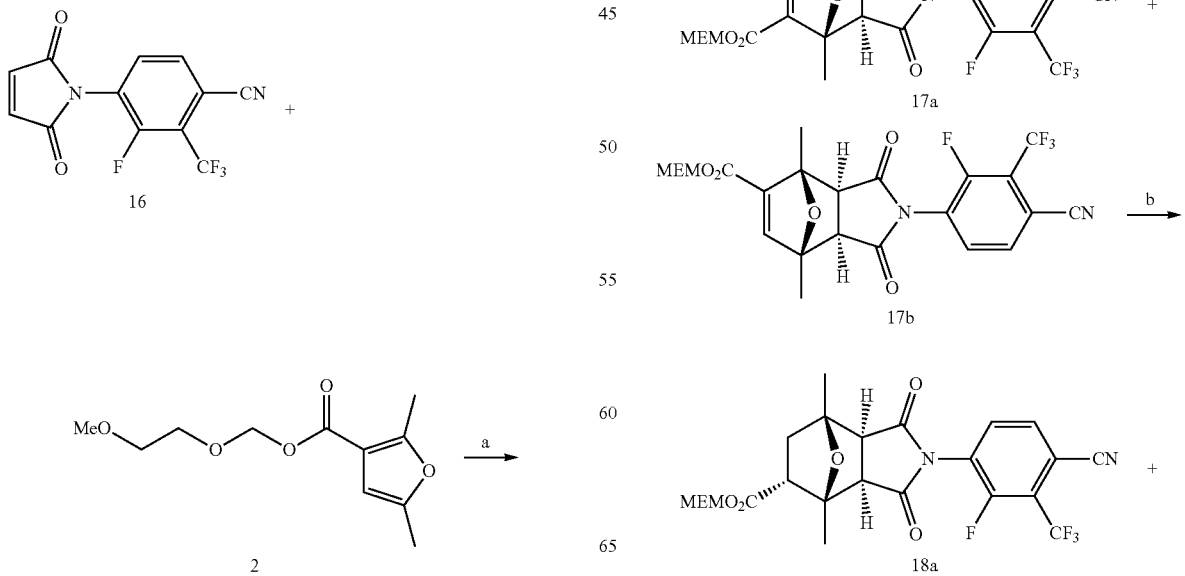

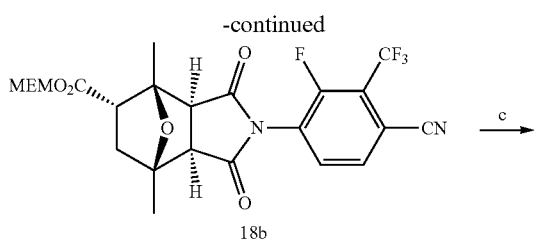

18b

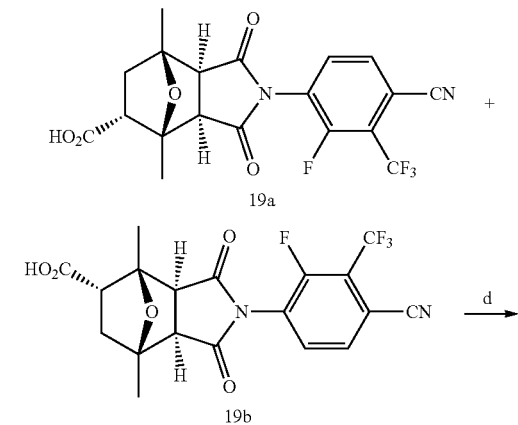

19a

19b

20a

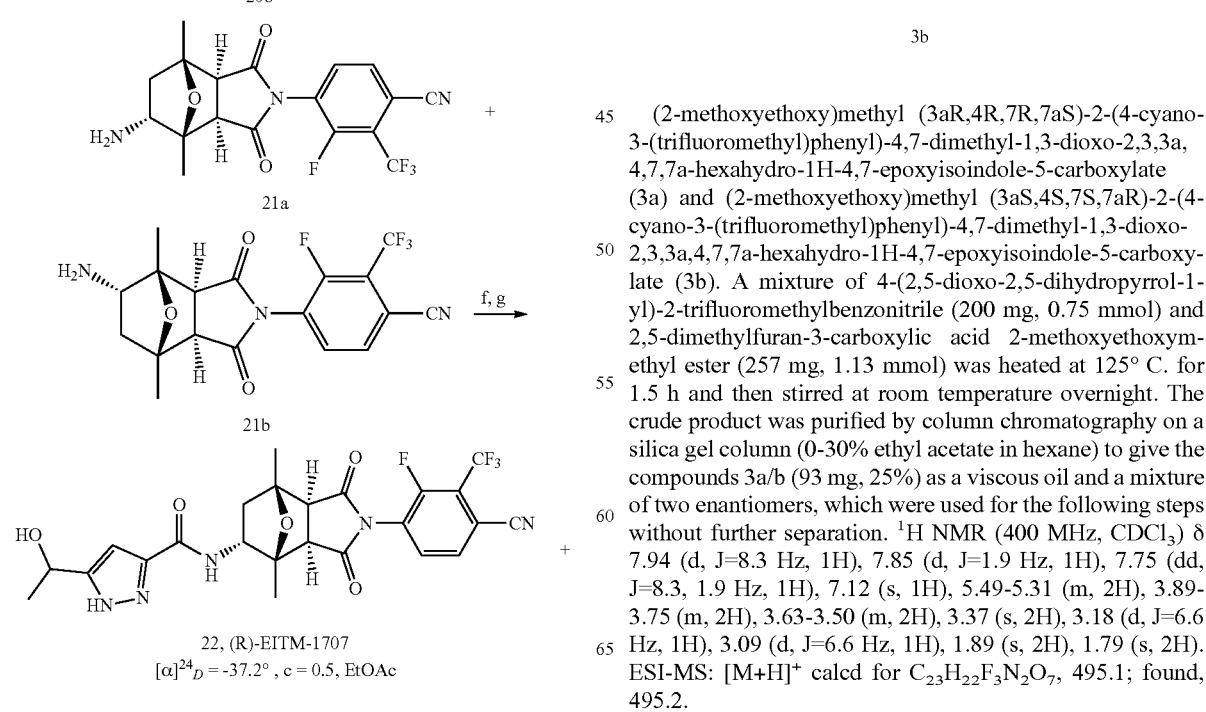

20b

21a

21b 22, (R)-EITM-1707
[α]$^{24}$$_D$ = −37.2°, c = 0.5, EtOAc

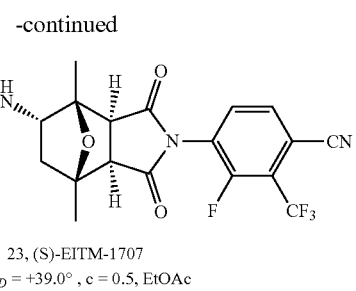

23, (S)-EITM-1707
[α]$^{24}$$_D$ = +39.0°, c = 0.5, EtOAc

Reagents and conditions:
(a) 125° C., 1.5 h, then room temperature overnight, 61%;
(b) H$_2$, Pd/C, EtOAc, 1 atm, overnight, 90%;
(c) 3 N HCl, THF, room temperature, 16 h, 91%;
(d) 2-trimethylsilylethanol, DPPA, Et$_3$N, 4 Å MS, 1,4-dioxane, 75° C., 79%;
(e) TFA, CH$_2$Cl$_2$, room temperature, 2 h, 88%;
(f) 5-(1-hydroxyethyl)-1-H-pyrazole-3-carboxylic acid, HATU, DIPEA, DMF, room temperature overnight, 66%;
(g) chiral HPLC separation.

Example 2. Synthesis of Compounds

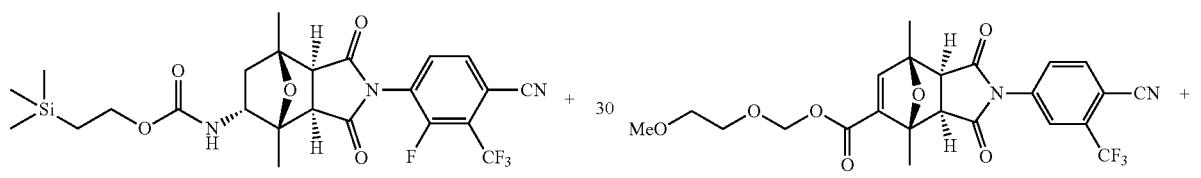

3a

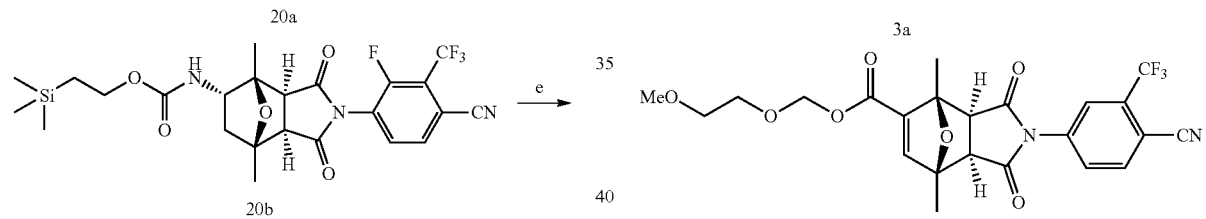

3b (2-methoxyethoxy)methyl (3aR,4R,7R,7aS)-2-(4-cyano-3-(trifluoromethyl)phenyl)-4,7-dimethyl-1,3-dioxo-2,3,3a,4,7,7a-hexahydro-1H-4,7-epoxyisoindole-5-carboxylate (3a) and (2-methoxyethoxy)methyl (3aS,4S,7S,7aR)-2-(4-cyano-3-(trifluoromethyl)phenyl)-4,7-dimethyl-1,3-dioxo-2,3,3a,4,7,7a-hexahydro-1H-4,7-epoxyisoindole-5-carboxylate (3b). A mixture of 4-(2,5-dioxo-2,5-dihydropyrrol-1-yl)-2-trifluoromethylbenzonitrile (200 mg, 0.75 mmol) and 2,5-dimethylfuran-3-carboxylic acid 2-methoxyethoxymethyl ester (257 mg, 1.13 mmol) was heated at 125° C. for 1.5 h and then stirred at room temperature overnight. The crude product was purified by column chromatography on a silica gel column (0-30% ethyl acetate in hexane) to give the compounds 3a/b (93 mg, 25%) as a viscous oil and a mixture of two enantiomers, which were used for the following steps without further separation. $^1$H NMR (400 MHz, CDCl$_3$) δ 7.94 (d, J=8.3 Hz, 1H), 7.85 (d, J=1.9 Hz, 1H), 7.75 (dd, J=8.3, 1.9 Hz, 1H), 7.12 (s, 1H), 5.49-5.31 (m, 2H), 3.89-3.75 (m, 2H), 3.63-3.50 (m, 2H), 3.37 (s, 2H), 3.18 (d, J=6.6 Hz, 1H), 3.09 (d, J=6.6 Hz, 1H), 1.89 (s, 2H), 1.79 (s, 2H). ESI-MS: [M+H]$^+$ calcd for C$_{23}$H$_{22}$F$_3$N$_2$O$_7$, 495.1; found, 495.2.

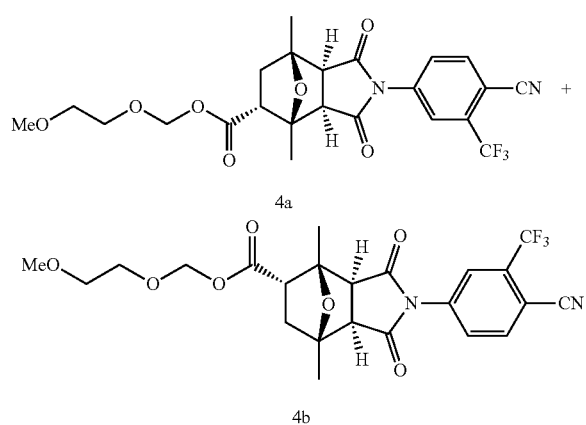

4a

4b (2-methoxyethoxy)methyl (3aR,4R,5R,7R,7aS)-2-(4-cyano-3-(trifluoromethyl)phenyl)-4,7-dimethyl-1,3-dioxooctahydro-1H-4,7-epoxyisoindole-5-carboxylate (4a) and (2-methoxyethoxy)methyl (3aS,4S,5S,7S,7aR)-2-(4-cyano-3-(trifluoromethyl)phenyl)-4,7-dimethyl-1,3-dioxooctahydro-1H-4,7-epoxyisoindole-5-carboxylate (4b). A solution of 3a/b (93 mg, 0.188 mmol) in ethyl acetate (2 mL) was mixed with 10% Pd/C (10 mg) and stirred under H$_2$ atmosphere (balloon) at room temperature overnight. The mixture was filtered through a pad of celite and the filtrate was concentrated under reduced pressure. The crude product was purified by silica gel flash chromatography (30% EtOAc in hexane) to afford the product 4a/b (70 mg, 75%) as a white solid. $^1$H NMR (400 MHz, CDCl$_3$) δ 7.94 (d, J=8.3 Hz, 1H), 7.87-7.81 (m, 1H), 7.73 (dd, J=8.1, 1.8 Hz, 1H), 5.46 (d, J=6.2 Hz, 1H), 5.34 (d, J=6.1 Hz, 1H), 3.90-3.79 (m, 2H), 3.57 (t, J=4.6 Hz, 2H), 3.38 (s, 3H), 3.33 (d, J=7.2 Hz, 1H), 3.19 (d, J=7.3 Hz, 1H), 3.04 (dd, J=11.7, 4.9 Hz, 1H), 2.29 (dd, J=12.8, 4.9 Hz, 1H), 2.05 (t, J=12.5 Hz, 2H), 1.78 (s, 3H), 1.64 (s, 3H). ESI-MS: [M+Na]$^+$ calcd for C$_{23}$H$_{23}$F$_3$N$_2$NaO$_7$, 519.1; found, 519.3.

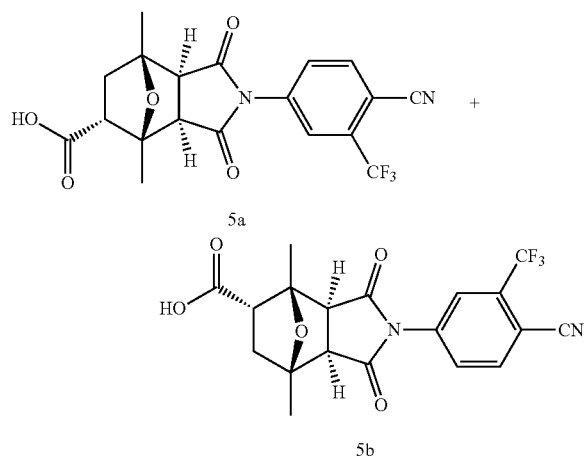

5a

5b (3aR,4R,5R,7R,7aS)-2-(4-cyano-3-(trifluoromethyl)phenyl)-4,7-dimethyl-1,3-dioxooctahydro-1H-4,7-epoxyisoindole-5-carboxylic acid (5a) and (3aS,4S,5S,7S,7aR)-2-(4-cyano-3-(trifluoromethyl)phenyl)-4,7-dimethyl-1,3-dioxooctahydro-1H-4,7-epoxyisoindole-5-carboxylic acid (5b). A solution of 4a (0.55 g, 1.11 mmol) in THF (4 mL) was mixed with a solution of 3N hydrochloric acid (2.8 mL) and stirred at room temperature overnight. The reaction mixture was diluted with water and the aqueous layer extracted with ethyl acetate. The combined organics were dried over Na$_2$SO$_4$, filtered and concentrated to give the product 5a/b (0.45 g, 99%) as a white foam. $^1$H NMR (400 MHz, MeOD) δ 8.13 (d, J=8.7 Hz, 1H), 7.93 (d, J=2.0 Hz, 1H), 7.83 (dd, J=8.6, 2.2 Hz, 1H), 3.41 (d, J=7.2 Hz, 1H), 3.25 (d, J=7.2 Hz, 1H), 3.02 (dd, J=11.7, 5.1 Hz, 1H), 2.26 (dd, J=12.7, 5.1 Hz, 1H), 2.02 (t, J=12.3 Hz, 1H), 1.71 (s, 3H), 1.57 (s, 3H). ESI-MS: [M−H]$^-$ calcd for C$_{19}$H$_{14}$F$_3$N$_2$O$_5$, 407.1; found, 407.1.

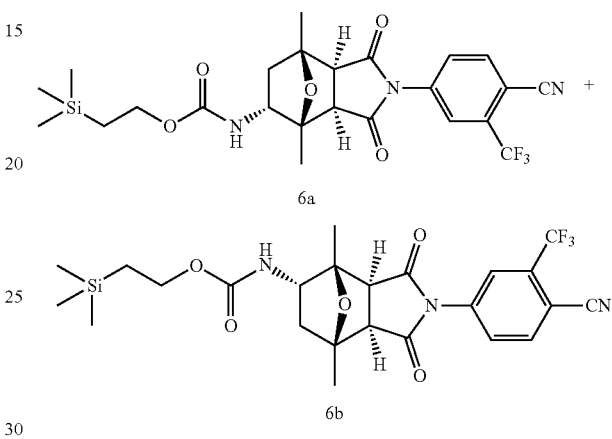

6a

6b 2-(trimethylsilyl)ethyl ((3aR,4R,5R,7R,7aS)-2-(4-cyano-3-(trifluoromethyl)phenyl)-4,7-dimethyl-1,3-dioxooctahydro-1H-4,7-epoxyisoindol-5-yl)carbamate (6a) and 2-(trimethylsilyl)ethyl ((3aS,4S,5S,7S,7aR)-2-(4-cyano-3-(trifluoromethyl)phenyl)-4,7-dimethyl-1,3-dioxooctahydro-1H-4,7-epoxyisoindol-5-yl)carbamate (6b). A solution of 5a/b (228 mg, 0.558 mmol), triethylamine (0.1 mL, 0.69 mmol), powdered 4 Å molecular sieves (228 mg) in dioxane (3 mL) was mixed with diphenyl phosphoryl azide (189 mg, 0.148 mmol) and stirred at 50° C. for 1.5 h before the temperature was raised to 75° C. and 2-(trimethylsilyl)ethanol (337 mg, 2.85 mmol) was added. After heating at 75° C. for an additional 1.5 h, the reaction mixture was cooled, filtered and concentrated. The residue was purified by silica gel chromatography (30% ethyl acetate in hexane) to give the product 6a/b (154 mg, 53%) as a colorless oil. $^1$H NMR (400 MHz, CDCl$_3$) δ 7.93 (d, J=8.4 Hz, 1H), 7.87-7.83 (m, 1H), 7.74 (dd, J=8.4, 2.1 Hz, 1H), 4.17 (t, J=10.1 Hz, 2H), 4.07-401 (m, 1H), 3.47 (brs, 1H), 3.13 (d, J=7.2 Hz, 1H), 2.32 (t, J=12.4 Hz, 1H), 1.60 (s, 6H), 1.54 (dd, J=13.2, 5.0 Hz, 1H), 0.99 (t, J=8.6 Hz), 0.04 (s, 9H). ESI-MS: [M+Na]$^+$ calcd for C$_{24}$H$_{28}$F$_3$N$_3$O$_5$SiNa, 546.2; found, 546.3.

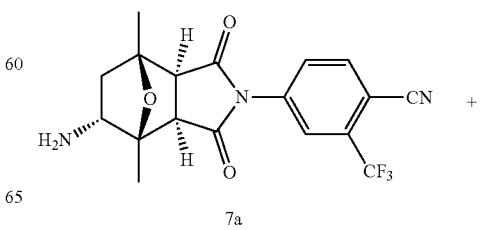

7a

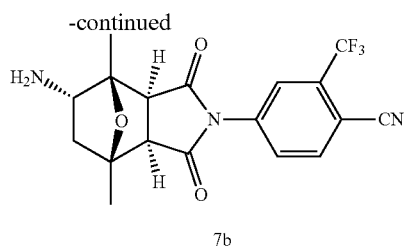

7b 4-((3aR,4R,5R,7R,7aS)-5-amino-4,7-dimethyl-1,3-dioxooctahydro-2H-4,7-epoxyisoindol-2-yl)-2-(trifluoromethyl)benzonitrile (7a) and 4-(3aS,4S,5S,7S,7aR)-5-amino-4,7-dimethyl-1,3-dioxooctahydro-2H-4,7-epoxyisoindol-2-yl)-2-(trifluoromethyl)benzonitrile (7b). The carbamate 6a/b solution (110 mg, 0.21 mmol) in $CH_2Cl_2$ (3 mL) was mixed with trifluoroacetic acid (0.55 mL) and stirred at room temperature for 2 h. After this time, the reaction was rendered basic by the addition of saturated aqueous sodium bicarbonate. The organic phase was washed with brine, dried over sodium sulfate, filtered and concentrated to afford the product 7a/b (80 mg, quantitative) as a white foam. $^1$H NMR (400 MHz, $CDCl_3$): δ 7.93 (d, J=8.3 Hz, 1H), 7.89-7.85 (m, 1H), 7.76 (dd, J=8.3, 2.0 Hz, 1H), 3.94 (d, J=7.3 Hz, 1H), 3.40 (dd, J=10.7, 4.7 Hz, 1H), 3.07 (dd, J=7.4, 1.7 Hz, 1H), 2.19 (dd, J=12.6, 10.7 Hz, 1H), 1.60 (s, 4H), 1.53 (d, J=0.8 Hz, 4H), 1.34-1.29 (m, 1H). ESI-MS: [M−H]$^-$ calcd for $C_{18}H_{15}F_3N_3O_3$, 378.1; found, 378.0.

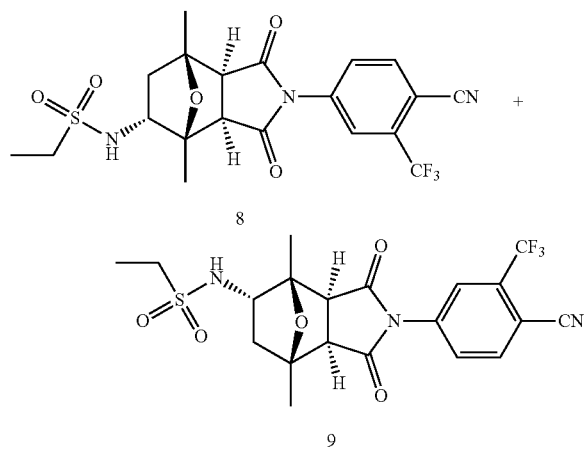

N-((3aR,4R,5R,7R,7aS)-2-(4-cyano-3-(trifluoromethyl)phenyl)-4,7-dimethyl-1,3-dioxooctahydro-1H-4,7-epoxyisoindol-5-yl)ethanesulfonamide (8) and N-((3aS,4S,5S,7S,7aR)-2-(4-cyano-3-(trifluoromethyl)phenyl)-4,7-dimethyl-1,3-dioxooctahydro-1H-4,7-epoxyisoindol-5-yl)ethanesulfonamide (9). A solution of 7a/b (80 mg, 0.21 mmol) in anhydrous $CH_2Cl_2$ (3 mL) was mixed with triethylamine (0.12 mL, 0.84 mmol) and ethanesulfonyl chloride (54 mg, 0.42 mmol) at 0° C. and stirred at room temperature overnight. The reaction mixture was then diluted with $CH_2Cl_2$ and washed with brine, dried over sodium sulfate, filtered and concentrated. The residue was purified by column chromatography (30-50% ethyl acetate in hexane) to give the racemic product 8/9 (50 mg, 50%) as a white solid. Further separation of the two enantiomers was achieved by chiral HPLC using a Chiralcel OD-H column (250×4.6 mm, 5 μm) eluting with 50% isopropanol in hexane at 1 mL/min and 254 nm detection. Compound 8 had a retention time of 8.4 min, while its enantiomer 9 had a retention time of 12.9 min.

8: $[α]^{24}_D$=−28.1° (c=0.5, MeOH). $^1$H NMR (600 MHz, $CDCl_3$) δ 7.93 (d, J=8.3 Hz, 1H), 7.85 (s, 1H), 7.74 (d, J=8.4 Hz, 1H), 5.64 (d, J=8.4 Hz, 1H), 3.75-3.61 (m, 1H), 3.51 (d, J=7.3 Hz, 1H), 3.17 (d, J=7.2 Hz, 1H), 3.15-3.04 (m, 2H), 2.37 (t, J=12.2 Hz, 1H), 1.65 (dd, J=13.2, 4.8 Hz, 1H), 1.63 (s, 3H), 1.60 (s, 3H), 1.41 (t, J=7.4 Hz, 3H). $^{13}$C NMR (151 MHz, $CDCl_3$) δ 173.95, 173.31, 135.79, 135.37, 133.76 (q, J=33.5 Hz), 129.57, 124.44, 121.79 (q, J=274.5 Hz), 114.78, 109.57, 87.14, 85.59, 60.49, 53.34, 47.84, 47.55, 44.97, 18.28, 16.35, 8.32. $^{19}$F NMR (564 MHz, $CDCl_3$): δ−62.1. HRMS: [M+H]$^+$ calcd for $C_{20}H_{21}N_3O_5SF_3$, 472.1154; found, 472.1158.

9: $[α]^{24}_D$=+26.1° (c=0.5, MeOH). $^1$H NMR (600 MHz, $CDCl_3$) δ 7.93 (d, J=8.3 Hz, 1H), 7.85 (d, J=1.8 Hz, 1H), 7.74 (dd, J=8.3, 1.9 Hz, 1H), 5.62 (d, J=8.4 Hz, 1H), 3.70-3.66 (m, 1H), 3.51 (d, J=7.3 Hz, 1H), 3.16 (d, J=7.3 Hz, 1H), 3.14-3.06 (m, 2H), 2.37 (t, J=13.0 Hz, 1H), 1.65 (dd, J=13.1, 4.8 Hz, 1H), 1.63 (s, 3H), 1.60 (s, 3H), 1.41 (t, J=7.4 Hz, 3H). $^{13}$C NMR (151 MHz, $CDCl_3$) δ 173.95, 173.30, 135.78, 135.37, 133.76 (q, J=33.5 Hz), 129.56, 124.44, 121.79 (q, J=274.3 Hz), 114.78, 109.58, 87.14, 85.59, 60.50, 53.34, 47.84, 47.56, 44.98, 18.28, 16.36, 8.32. $^{19}$F NMR (564 MHz, $CDCl_3$): δ−62.1. HRMS: [M+H]$^+$ calcd for $C_{20}H_{21}N_3O_5SF_3$, 472.1154; found, 472.1148.

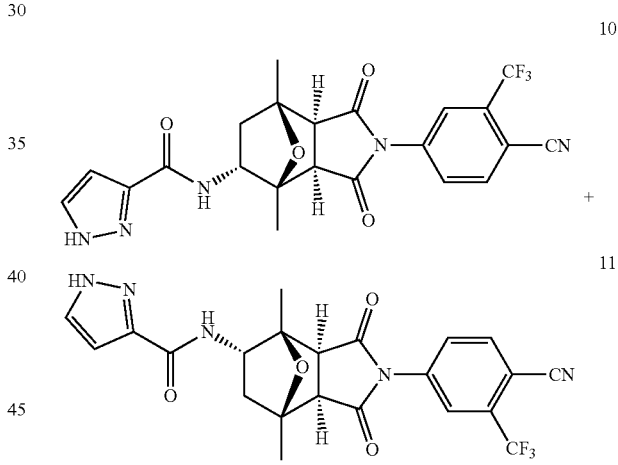

N-((3aR,4R,5R,7R,7aS)-2-(4-cyano-3-(trifluoromethyl)phenyl)-4,7-dimethyl-1,3-dioxooctahydro-1H-4,7-epoxyisoindol-5-yl)-1H-pyrazole-3-carboxamide (10) and N-((3aS,4S,5S,7S,7aR)-2-(4-cyano-3-(trifluoromethyl)phenyl)-4,7-dimethyl-1,3-dioxooctahydro-1H-4,7-epoxyisoindol-5-yl)-1H-pyrazole-3-carboxamide (11). A mixture of the amine 7 (50 mg, 0.13 mmol), 1H-Pyrazole-3-carboxylic acid (24 mg, 0.21 mmol), DIEA (0.073 mL, 0.42 mmol), and HATU (80 mg, 0.21 mmol) in DMF (1 mL) was stirred at room temperature overnight. The volatiles were removed under reduced pressure and the residue was partitioned between ethyl acetate and water. The organic layer was washed with brine, dried over $Na_2SO_4$, filtered and concentrated. The residue was first purified by flash column chromatography (0-5% MeOH in DCM) to give the product 10/11 (35 mg, 56%) as a white solid. Further separation of the two enantiomers was achieved by chiral HPLC using a Chiralcel OD-H column (250×4.6 mm, 5 μm) eluting with 50% isopropanol in hexane at 1 mL/min and 254 nm detection. Compound 10 had a retention time of 5.0 min, while its enantiomer 11 had a retention time of 6.7 min.

10: [α]$^{23}_D$=−28.7° (c=0.3, MeOH). $^1$H NMR (600 MHz, MeOD) δ 8.13 (d, J=8.3 Hz, 1H), 7.95 (d, J=2.0 Hz, 1H), 7.85 (dd, J=8.7, 2.0 Hz, 1H), 7.73 (s, 1H), 6.80 (s, 1H), 4.49 (dd, J=11.8, 5.1 Hz, 1H), 3.57 (d, J=7.3 Hz, 1H), 3.39 (d, J=7.2 Hz, 1H), 2.38-2.25 (m, 1H), 1.87 (dd, J=13.0, 5.1 Hz, 1H), 1.59 (s, 3H), 1.57 (s, 3H). $^{13}$C NMR (151 MHz, MeOD) δ 176.40, 175.80, 165.20, 147.44, 138.01, 137.05, 134.10 (q, J=32.9 Hz), 131.80, 131.15, 125.94, 123.62 (q, J=274.5 Hz), 115.94, 110.22, 106.64, 89.32, 86.94, 57.94, 55.10, 49.97, 43.74, 18.64, 17.74. $^{19}$F NMR (564 MHz, MeOD): δ−63.6. HRMS: [M+H]$^+$ calcd for $C_{22}H_{19}N_5O_4F_3$, 474.1389; found, 474.1374.

11: [α]$^{23}_D$=+31.6° (c=0.3, MeOH). $^1$H NMR (600 MHz, MeOD) δ 8.13 (d, J=8.3 Hz, 1H), 7.95 (d, J=1.9 Hz, 1H), 7.85 (dd, J=8.3, 1.9 Hz, 1H), 7.73 (s, 1H), 6.80 (s, 1H), 4.49 (dd, J=11.8, 5.1 Hz, 1H), 3.57 (d, J=7.2 Hz, 1H), 3.39 (d, J=7.3 Hz, 1H), 2.38-2.24 (m, 1H), 1.87 (dd, J=13.0, 5.1 Hz, 1H), 1.59 (s, 3H), 1.57 (s, 3H). $^{13}$C NMR (151 MHz, MeOD) δ 176.40, 175.80, 165.23, 147.41, 138.00, 137.05, 134.10 (q, J=33.1 Hz), 131.80, 131.15, 125.94, 123.62 (q, J=273.0 Hz), 115.94, 110.23, 106.65, 89.32, 86.94, 57.94, 55.09, 49.97, 43.74, 18.64, 17.74. $^{19}$F NMR (564 MHz, MeOD): δ−63.6. HRMS: [M+H]$^+$ calcd for $C_{22}H_{19}N_5O_4F_3$, 474.1389; found, 474.1368.

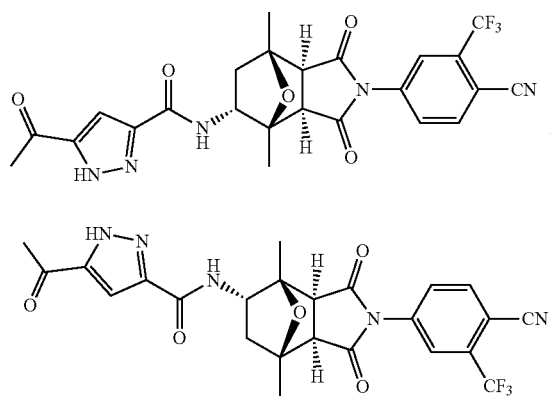

5-acetyl-N-((3aR,4R,5R,7R,7aS)-2-(4-cyano-3-(trifluoromethyl)phenyl)-4,7-dimethyl-1,3-dioxooctahydro-1H-4,7-epoxyisoindol-5-yl)-1H-pyrazole-3-carboxamide (12) and 5-acetyl-N-((3aS,4S,5S,7S,7aR)-2-(4-cyano-3-(trifluoromethyl)phenyl)-4,7-dimethyl-1,3-dioxooctahydro-1H-4,7-epoxyisoindol-5-yl)-1H-pyrazole-3-carboxamide (13). This compound was prepared as described for 10. Obtained from 7 (50 mg, 0.13 mmol) as a white solid, yield 66% (45 mg). Separation of the two enantiomers was achieved by chiral HPLC using a ProntoSIL Chiral AX QN-1 column (150×8.0 mm, 5 μm) eluting with 50% isopropanol in hexane at 3 mL/min and 254 nm detection. Compound 12 had a retention time of 40.4 min, while its enantiomer 13 had a retention time of 16.3 min.

12: [α]$^{22}_D$=−48.7° (c=0.3, MeOH). $^1$H NMR (600 MHz, CDCl$_3$) δ 11.39 (s, 1H), 7.94 (d, J=8.3 Hz, 1H), 7.84 (d, J=2.1 Hz, 1H), 7.73 (dd, J=8.3, 2.1 Hz, 1H), 7.35 (s, 1H), 6.99 (d, J=8.1 Hz, 1H), 4.54-4.50 (m, 1H), 3.52 (d, J=7.2 Hz, 1H), 3.30 (d, J=7.2 Hz, 1H), 2.58 (s, 3H), 2.42 (dd, J=13.3, 11.7 Hz, 1H), 1.76 (dd, J=13.3, 5.0 Hz, 1H), 1.69 (s, 3H), 1.66 (s, 3H). $^{13}$C NMR (151 MHz, CDCl$_3$) δ 174.23, 173.47, 161.01, 135.75, 135.40, 133.84 (q, J=33.3 Hz), 124.38, 121.78 (q, J=274.2 Hz), 114.74, 109.67, 88.31, 85.78, 56.82, 53.67, 48.30, 43.95, 27.03, 18.31, 17.05. $^{19}$F NMR (564 MHz, CDCl$_3$): δ−62.07. ESI-MS: [M+Na]$^+$ calcd for $C_{24}H_{20}N_5O_5F_3Na$, 538.1; found, 538.3.

13: [α]$^{22}_D$=+49.0° (c=0.3, MeOH). $^1$H NMR (600 MHz, CDCl$_3$) δ 7.94 (d, J=8.4 Hz, 1H), 7.84 (d, J=2.0 Hz, 1H), 7.73 (dd, J=8.4, 2.1 Hz, 1H), 7.35 (s, 1H), 6.99 (d, J=8.0 Hz, 1H), 4.54-4.50 (m, 1H), 3.52 (d, J=7.2 Hz, 1H), 3.29 (d, J=7.3 Hz, 1H), 2.58 (s, 3H), 2.42 (dd, J=13.3, 11.7 Hz, 1H), 1.76 (dd, J=13.3, 5.0 Hz, 1H), 1.69 (s, 3H), 1.66 (s, 3H). $^{13}$C NMR (151 MHz, CDCl$_3$) δ 174.22, 173.46, 161.02, 135.76, 135.40, 133.84 (q, J=33.5 Hz), 124.38, 121.79 (q, J=274.5 Hz), 114.74, 109.67, 88.31, 85.77, 56.82, 53.68, 48.30, 43.98, 27.02, 18.31, 17.05. $^{19}$F NMR (564 MHz, CDCl$_3$): δ−62.08. ESI-MS: [2M+Na]$^+$ calcd for $C_{48}H_{40}N_{10}O_{10}F_6$, 1053.3; found, 1052.9.

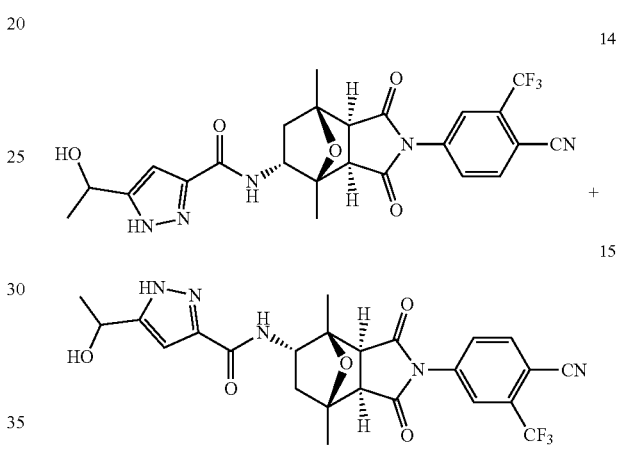

N-((3aR,4R,5R,7R,7aS)-2-(4-cyano-3-(trifluoromethyl)phenyl)-4,7-dimethyl-1,3-dioxooctahydro-1H-4,7-epoxyisoindol-5-yl)-5-(1-hydroxyethyl)-1H-pyrazole-3-carboxamide (14) and N-((3aS,4S,5S,7S,7aR)-2-(4-cyano-3-(trifluoromethyl)phenyl)-4,7-dimethyl-1,3-dioxooctahydro-1H-4,7-epoxyisoindol-5-yl)-5-(1-hydroxyethyl)-1H-pyrazole-3-carboxamide (15). This compound was prepared as described for 10. Obtained from 7 (30 mg, 0.079 mmol) as a white solid, yield 64% (26 mg). Separation of the two enantiomers was achieved by chiral HPLC using a ProntoSIL Chiral AX QN-1 column (150×8.0 mm, 5 μm) eluting with 50% isopropanol in hexane at 3 mL/min and 254 nm detection. Compound 14 had a retention time of 36.7 min, while its enantiomer 15 had a retention time of 14.9 min.

14: [α]$^{20}_D$=−31.0° (c=0.3, MeOH). $^1$H NMR (600 MHz, MeOD) δ 8.13 (d, J=8.3 Hz, 1H), 7.95 (d, J=1.9 Hz, 1H), 7.85 (dd, J=8.3, 2.0 Hz, 1H), 6.69 (s, 1H), 4.94 (q, J=6.2 Hz, 1H), 4.47 (dd, J=11.7, 5.1 Hz, 1H), 3.56 (d, J=7.2 Hz, 1H), 3.38 (d, J=7.3 Hz, 1H), 2.32-2.25 (m, 1H), 1.85 (dd, J=13.0, 5.1 Hz, 1H), 1.59 (s, 3H), 1.56 (s, 3H), 1.52 (d, J=6.8 Hz, 3H). $^{13}$C NMR (151 MHz, MeOD) δ 176.39, 175.79, 138.01, 137.06, 134.10 (q, J=33.2 Hz), 131.81, 125.94, 123.62 (q, J=273.2 Hz), 110.22, 103.35, 89.31, 86.94, 57.94, 55.10, 49.96, 43.75, 37.60, 23.73, 18.64, 17.73. $^{19}$F NMR (564 MHz, MeOD): δ−63.61. ESI-MS: [M+Na]$^+$ calcd for $C_{24}H_{22}N_5O_5F_3Na$, 540.1; found, 540.3.

15: [α]$^{20}_D$=+34.0° (c=0.3, MeOH). $^1$H NMR (600 MHz, MeOD) δ 8.13 (d, J=8.3 Hz, 1H), 7.95 (d, J=2.0 Hz, 1H), 7.85 (dd, J=8.3, 2.0 Hz, 1H), 6.66 (s, 1H), 4.94 (q, J=6.8 Hz, 1H), 4.47 (dd, J=11.8, 5.1 Hz, 1H), 3.56 (d, J=7.2 Hz, 1H), 3.38 (d, J=7.2 Hz, 1H), 2.33-2.24 (m, 1H), 1.85 (dd, J=13.0, 5.1 Hz, 1H), 1.59 (s, 3H), 1.56 (s, 3H), 1.52 (d, J=6.6 Hz, 3H). $^{13}$C NMR (151 MHz, MeOD) δ 176.39, 175.79, 138.01, 137.06, 134.10 (q, J=33.0 Hz), 131.81, 125.94, 123.62 (q, J=273.2 Hz), 115.94, 110.23, 103.35, 89.31, 86.94, 57.94, 55.10, 49.96, 43.76, 37.60, 23.73, 18.64, 17.73. $^{19}$F NMR (564 MHz, MeOD): δ−63.61. ESI-MS: [M+Na]$^+$ calcd for $C_{24}H_{22}N_5O_5F_3Na$, 540.1; found, 540.3.

N-((3aR,4R,5R,7R,7aS)-2-(4-cyano-2-fluoro-3-(trifluoromethyl)phenyl)-4,7-dimethyl-1,3-dioxooctahydro-1H-4,7-epoxyisoindol-5-yl)ethanesulfonamide (EITM-1705). EITM-1705 was prepared form amine 7 in a similar manner to that described for BMS-641988. Racemic mixture obtained from 7 (20 mg, 0.050 mmol) as a white solid, yield 49% (12 mg). Separation of the two enantiomers was achieved by chiral HPLC using a ProntoSIL Chiral AX QN-1 column (150×8.0 mm, 5 μm) eluting with 50% isopropanol in hexane at 3 mL/min and 254 nm detection. EITM-1705 had a retention time of 8.5 min. [α]$^{20}_D$=−30.0° (c=0.2, EtOAc). $^1$H NMR (600 MHz, CDCl$_3$) δ 7.75 (d, J=8.3 Hz, 1H), 7.64 (s, 1H), 5.03 (s, 1H), 3.73-3.70 (m, 1H), 3.53 (s, 1H), 3.17 (s, 1H), 3.11 (q, J=7.4 Hz, 2H), 2.40 (t, J=12.3 Hz, 1H), 1.65-1.62 (m, 1H), 1.63 (s, 3H), 1.60 (s, 3H), 1.42 (t, J=7.3 Hz, 3H). $^{13}$C NMR (151 MHz, CDCl$_3$) δ 172.84, 172.23, 130.75, 125.64, 120.78 (q, J=277.1 Hz), 114.11, 87.12, 85.54, 60.49, 53.97, 48.32, 45.17, 18.23, 16.36, 8.37. $^{19}$F NMR (564 MHz, CDCl$_3$): δ−57.77, −112.61. ESI-MS: [M+Na]$^+$ calcd for $C_{20}H_{19}N_4O_5SF_4$, 512.1; found, 512.3.

4-((3aR,4R,5R,7R,7aS)-5-(4-(2-hydroxyethyl)-1H-1,2,3-triazol-1-yl)-4,7-dimethyl-1,3-dioxooctahydro-2H-4,7-epoxyisoindol-2-yl)-2-(trifluoromethyl)benzonitrile (EITM-1706). EITM-1706 was prepared as described in Scheme 4. A mixture of the azide intermediate (36 mg, 0.09 mmol), 3-butynol (9.5 mg, 0.135 mmol), copper (II) sulfate pentahydrate (6.7 mg, 0.027 mmol), and sodium ascorbate (10.7 mg, 0.054 mmol) in 1:1 tert-butanol:water (1 mL) was stirred at 40° C. for 2 days. The volatiles were removed under reduced pressure and the residue was partitioned between ethyl acetate and water. The organic layer was washed with brine, dried over Na$_2$SO$_4$, filtered and concentrated. The residue was purified by flash column chromatography (0-10% MeOH in DCM) to give the racemic product as a white solid (6.4 mg, 30%). Further separation of the two enantiomers was achieved by chiral HPLC using a Chiralcel OD-H column (250×4.6 mm, 5 μm) eluting with 50% isopropanol in hexane at 1 mL/min and 254 nm detection. EITM-1706 had a retention time of 14.5 min. [α]$^{23}_D$=−5.3° (c=0.15, MeOH). $^1$H NMR (600 MHz, CDCl$_3$) δ 7.95 (d, J=8.1 Hz, 1H), 7.84 (s, 1H), 7.73 (d, J=8.3 Hz, 1H), 7.51 (s, 1H), 4.68 (m, 1H), 4.01 (q, J=6.0 Hz, 2H), 3.53 (d, J=7.3 Hz, 1H), 3.12 (d, J=7.3 Hz, 1H), 3.03-2.99 (m, 2H), 2.97 (dd, J=13.4, 4.7 Hz, 1H), 2.49 (t, J=12.5 Hz, 1H), 2.28 (t, J=5.8 Hz, 1H), 1.74 (s, 3H), 1.70 (s, 3H). $^{13}$C NMR (151 MHz, CDCl$_3$) δ 173.77, 173.31, 135.69, 135.39, 134.03, 133.70, 129.49, 124.39 (q, J=4.8 Hz), 123.13, 120.41, 114.72, 109.71, 87.08, 86.56, 67.66, 61.42, 53.12, 48.61, 42.31, 28.61, 18.29, 16.71. $^{19}$F NMR (564 MHz, CDCl$_3$): δ−62.07. ESI-MS: [2M+Na]$^+$ calcd for $C_{44}H_{40}N_{10}O_8F_6Na$, 973.2832; found, 973.1.

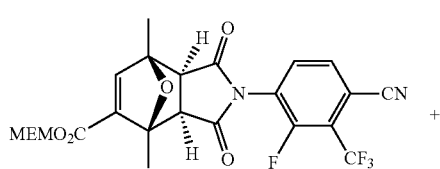

17a

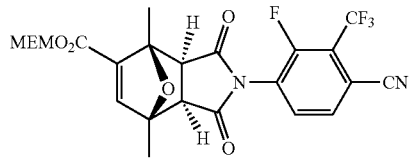

17b (2-methoxyethoxy)methyl (3aR,4R,7R,7aS)-2-(4-cyano-2-fluoro-3-(trifluoromethyl)phenyl)-4,7-dimethyl-1,3-dioxo-2,3,3a,4,7,7a-hexahydro-1H-4,7-epoxyisoindole-5-carboxylate (17a) and (2-methoxyethoxy)methyl (3aS,4S,7S,7aR)-2-(4-cyano-2-fluoro-3-(trifluoromethyl)phenyl)-4,7-dimethyl-1,3-dioxo-2,3,3a,4,7,7a-hexahydro-1H-4,7-epoxyisoindole-5-carboxylate (17b). This compound was prepared as described for 3. Obtained from compound 16 (100 mg, 0.35 mmol) as a viscous oil, yield 61% (110 mg). $^1$H NMR (600 MHz, CDCl$_3$) δ 7.75 (d, J=8.3 Hz, 1H), 7.66 (s, 1H), 7.12 (s, 1H), 5.47-5.41 (m, 2H), 3.86-3.80 (m, 2H), 3.58-3.56 (m, 2H), 3.39 (s, 3H), 3.22 (s, 1H), 3.12 (s, 1H), 1.90 (s, 3H), 1.79 (s, 3H). $^{13}$C NMR (151 MHz, CDCl$_3$) δ 170.93, 170.87, 161.72, 149.68, 144.68, 135.12, 133.19, 130.74, 125.48, 122.05, 120.78 (q, J=276.5 Hz), 114.11, 112.26, 90.03, 88.58, 87.66, 71.45, 69.99, 59.12, 53.12, 52.74, 15.37, 15.06. $^{19}$F NMR (564 MHz, CDCl$_3$) δ−57.77, −112.58. ESI-MS: [M+Na]$^+$ calcd for $C_{23}H_{20}F_4N_2NaO_7$, 535.1; found, 535.1.

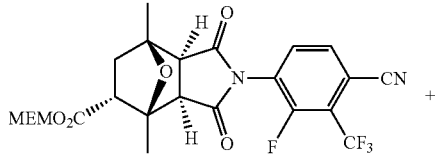

18a

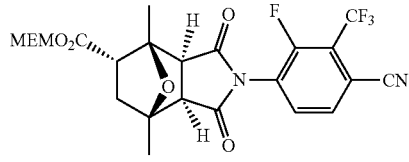

18b (2-methoxyethoxy)methyl (3aR,4R,5R,7R,7aS)-2-(4-cyano-2-fluoro-3-(trifluoromethyl)phenyl)-4,7-dimethyl-1,3-dioxooctahydro-1H-4,7-epoxyisoindole-5-carboxylate (18a) and (2-methoxyethoxy)methyl (3aS,4S,5S,7S,7aR)-2-(4-cyano-2-fluoro-3-(trifluoromethyl)phenyl)-4,7-dimethyl-1,3-dioxooctahydro-1H-4,7-epoxyisoindole-5-carboxylate (18b). This compound was prepared as described for 4. Obtained from 17 (0.72 g, 1.41 mmol) as a white solid, yield 90% (0.65 g). $^1$H NMR (600 MHz, CDCl$_3$) δ 7.73 (d, J=8.3 Hz, 1H), 7.60 (s, 1H), 5.45 (d, J=6.2 Hz, 1H), 5.33 (d, J=6.2 Hz, 1H), 3.88-3.79 (m, 2H), 3.56 (t, J=4.5 Hz, 2H), 3.37 (s, 4H), 3.22 (s, 1H), 3.04 (dd, J=11.7, 4.9 Hz, 1H), 2.27 (dd, J=12.8, 5.0 Hz, 1H), 2.05 (t, J=12.4 Hz, 1H), 1.76 (s, 3H), 1.62 (s, 3H). $^{13}$C NMR (151 MHz, CDCl$_3$) δ 172.81, 172.63, 171.26, 133.01, 130.70, 125.75, 121.96, 120.78 (q, J=275.8 Hz), 114.12, 112.05, 90.02, 86.87, 86.22, 59.06, 54.20, 53.67, 50.50, 41.34, 17.98, 17.96. $^{19}$F NMR (564 MHz, CDCl$_3$) δ−57.78, −112.62. ESI-MS: [M+Na]$^+$ calcd for $C_{23}H_{22}F_4N_2NaO_7$, 537.1; found, 537.3.

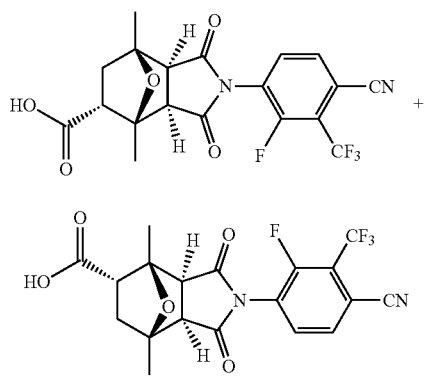

19a

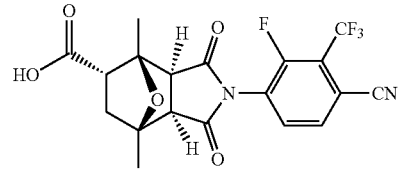

19b

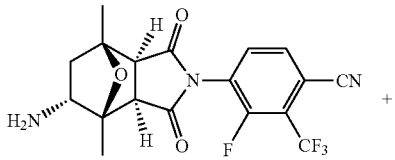

21a

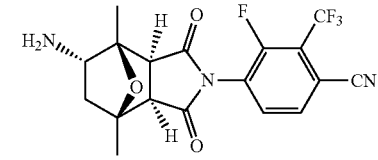

21b (3aR,4R,5R,7R,7aS)-2-(4-cyano-2-fluoro-3-(trifluoromethyl)phenyl)-4,7-dimethyl-1,3-dioxooctahydro-1H-4,7-epoxyisoindole-5-carboxylic acid (19a) and (3aS,4S,5S,7S,7aR)-2-(4-cyano-2-fluoro-3-(trifluoromethyl)phenyl)-4,7-dimethyl-1,3-dioxooctahydro-1H-4,7-epoxyisoindole-5-carboxylic acid (19b). This compound was prepared as described for 5. Obtained from 18 (0.65 g, 1.26 mmol) as a white foam, yield 91% (0.49 g). $^1$H NMR (400 MHz, MeOD) δ 7.98-7.95 (m, 1H), 7.86 (s, 1H), 3.44 (s, 1H), 3.28 (s, 1H), 3.02 (dd, J=11.8, 5.1 Hz, 1H), 2.25 (dd, J=12.7, 5.2 Hz, 1H), 2.04 (d, J=12.4 Hz, 1H), 1.69 (s, 3H), 1.56 (s, 3H). $^{19}$F NMR (470 MHz, MeOD) δ−59.51, −116.28. ESI-MS: [M−H]$^−$ calcd for $C_{19}H_{13}F_4N_2O_5$, 425.1; found, 425.1.

4-((3aR,4R,5R,7R,7aS)-5-amino-4,7-dimethyl-1,3-dioxooctahydro-2H-4,7-epoxyisoindol-2-yl)-3-fluoro-2-(trifluoromethyl)benzonitrile (21a) and 4-((3aS,4S,5S,7S,7aR)-5-amino-4,7-dimethyl-1,3-dioxooctahydro-2H-4,7-epoxyisoindol-2-yl)-3-fluoro-2-(trifluoromethyl)benzonitrile (21b). This compound was prepared as described for 7. Obtained from 20 (218 mg, 0.40 mmol) as a white foam, yield 88% (141 mg). $^1$H NMR (600 MHz, MeOD) δ 7.86 (d, J=8.7 Hz, 1H), 7.77 (s, 1H), 3.61 (s, 1H), 3.17-3.10 (m, 2H), 2.06 (dd, J=12.7, 11.1 Hz, 1H), 1.41 (s, 3H), 1.39 (s, 3H), 1.34 (dd, J=12.8, 5.0 Hz, 1H). $^{13}$C NMR (151 MHz, MeOD) δ 176.29, 175.11, 157.03, 155.26, 135.51, 132.63, 127.66, 122.63 (q, J=274.5 Hz), 115.38, 112.68, 89.45, 86.38, 61.10, 55.90, 49.85, 47.23, 18.71, 16.68. $^{19}$F NMR (564 MHz, MeOD) δ−59.24, −116.13. ESI-MS: [M−H]$^−$ calcd for $C_{18}H_{14}F_4N_3O_3$, 396.1; found, 396.2.

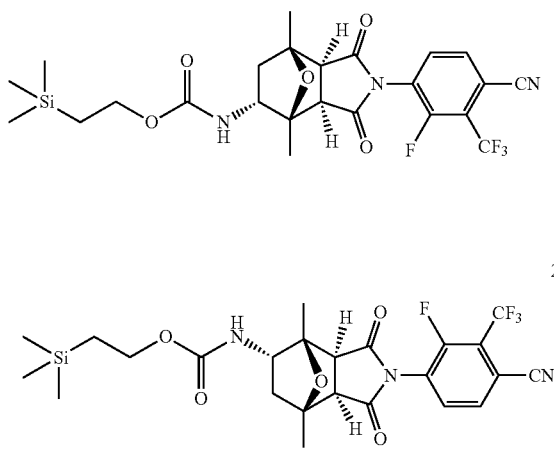

20a

20b

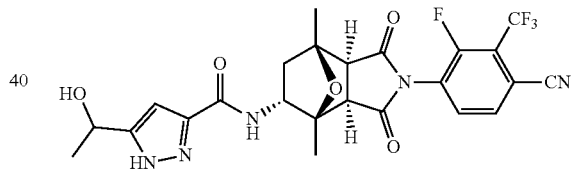

22

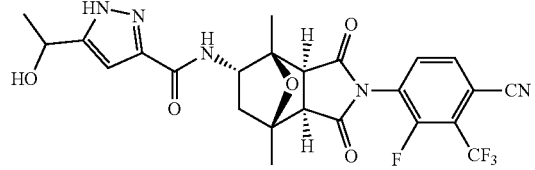

23

2-(trimethylsilyl)ethyl ((3aR,4R,5R,7R,7aS)-2-(4-cyano-2-fluoro (trifluoromethyl)phenyl)-4,7-dimethyl-1,3-dioxooctahydro-1H-4,7-epoxyisoindol-5-yl)carbamate (20a) and 2-(trimethylsilyl)ethyl ((3aS,4S,5S,7S,7aR)-2-(4-cyano-2-fluoro-3-(trifluoromethyl)phenyl)-4,7-dimethyl-1, 3-dioxooctahydro-1H-4,7-epoxyisoindol-5-yl)carbamate (20b). This compound was prepared as described for 6. Obtained from 19 (300 mg, 0.70 mmol) as a white foam, yield 79% (300 mg). $^1$H NMR (400 MHz, CDCl$_3$) δ 7.68 (d, J=8.3 Hz, 1H), 7.54 (s, 1H), 4.15 (s, 2H), 3.94 (s, 1H), 3.37 (s, 1H), 3.06 (s, 1H), 2.16 (s, 1H), 1.50-1.44 (m, 7H), 0.98-0.95 (m, 2H), 0.00 (s, 9H). ESI-MS: [M+Na]$^+$ calcd for $C_{24}H_{27}F_4N_3O_5SiNa$, 564.2; found, 564.2.

N-((3aR,4R,5R,7R,7aS)-2-(4-cyano-2-fluoro-3-(trifluoromethyl)phenyl)-4,7-dimethyl-1,3-dioxooctahydro-1H-4, 7-epoxyisoindol-5-yl)-5-(1-hydroxyethyl)-1H-pyrazole carboxamide (22) and N-((3aS,4S,5S,7S,7aR)-2-(4-cyano-2-fluoro (trifluoromethyl)phenyl)-4,7-dimethyl-1,3-dioxooctahydro-1H-4,7-epoxyisoindol-5-yl)-5-(1-hydroxyethyl)-1H-pyrazole-3-carboxamide (23). This compound was prepared as described for 10. Obtained from 21 (20 mg, 0.05 mmol) as a white solid, yield 26% (7 mg). Separation of the two enantiomers was achieved by using chiral HPLC with a ProntoSIL Chiral AX QN-1 column (150×8.0 mm, 5 μm) and isocratic elution with 50% isopropanol in hexane. Separation of the two enantiomers was achieved by chiral HPLC using a ProntoSIL Chiral AX QN-1 column (150×8.0 mm, 5 μm) eluting with 50% isopropanol in hexane at 3 mL/min and 254 nm detection. Compound 22 had a retention time of 20.1 min, while its enantiomer 23 had a retention time of 8.7 min.

22: $[\alpha]^{20}{}_D$=−37.2° (c=0.5, EtOAc). $^1$H NMR (600 MHz, Acetonitrile-d$_3$) δ 11.43 (s, 1H), 7.89 (d, J=8.4 Hz, 1H), 7.78 (s, 1H), 7.39 (d, J=7.4 Hz, 1H), 6.58 (s, 1H), 4.91 (q, J=6.6 Hz, 1H), 4.44-4.39 (m, 1H), 3.64 (s, 1H), 3.45 (s, 1H), 3.39 (s, 1H), 2.26-2.22 (m, 1H), 1.82 (dd, J=13.1, 5.2 Hz, 1H), 1.52 (s, 3H), 1.50 (s, 3H), 1.46 (d, J=6.6 Hz, 3H). $^{13}$C NMR (151 MHz, Acetonitrile-d$_3$) δ 175.10, 174.60, 134.80, 132.58, 122.35 (q, J=273.8 Hz), 115.56, 112.44, 102.77, 88.73, 86.27, 62.84, 57.48, 55.26, 50.15, 43.39, 23.83, 18.62, 17.72. $^{19}$F NMR (564 MHz, Acetonitrile-d$_3$) δ−58.62. ESI-MS: [M−H]$^−$ calcd for C$_{24}$H$_{20}$N$_5$O$_5$F$_4$, 534.1; found, 534.2.

23: $[\alpha]^{20}{}_D$=+39.0° (c=0.5, EtOAc). $^1$H NMR (600 MHz, Acetonitrile-d$_3$) δ 11.37 (s, 1H), 7.89 (d, J=8.4 Hz, 1H), 7.78 (s, 1H), 7.35 (d, J=8.2 Hz, 1H), 6.58 (s, 1H), 4.91 (q, J=6.6 Hz, 1H), 4.44-4.39 (m, 1H), 3.56 (s, 1H), 3.45 (s, 1H), 3.39 (s, 1H), 2.27-2.22 (m, 1H), 1.82 (dd, J=13.1, 5.2 Hz, 1H), 1.52 (s, 3H), 1.50 (s, 3H), 1.46 (d, J=6.1 Hz, 3H). $^{13}$C NMR (151 MHz, Acetonitrile-d$_3$) δ 175.10, 174.60, 134.95, 132.60, 122.35 (q, J=274.4 Hz), 115.57, 112.45, 102.76, 88.78, 86.30, 63.11, 57.55, 55.30, 50.19, 43.47, 23.87, 18.64, 17.74. $^{19}$F NMR (564 MHz, Acetonitrile-d$_3$) δ−58.63. ESI-MS: [M−H]$^−$ calcd for C$_{24}$H$_{20}$N$_5$O$_5$F$_4$, 534.1; found, 534.2.

N-(2-(4-cyano-3-(trifluoromethyl)phenyl)-1,3-dioxoisoindolin-5-yl)ethanesulfonamide (EITM-1708). Step 1: A solution of 5-nitroisobenzofuran-1,3-dione (300 mg, 1.55 mmol) and 4-amino-2-(trifluoromethyl)benzonitrile (289 mg, 1.55 mmol) in 5 mL of acetic acid was heated at 130° C. to 140° C. for 4.5 h. After completion of the reaction, the solvent was removed under reduced pressure to give the crude product 4-(5-nitro-1,3-dioxoisoindolin-2-yl)-2-(trifluoromethyl)benzonitrile (10). To the residue of crude product, 10% Pd/C (184 mg) and ethyl acetate (15 mL) were added, the reaction mixture was stirred under an atmosphere of H$_2$ at room temperature overnight. The mixture was then filtered through a celite pad and concentrated. The residue was purified by column chromatography (50% ethyl acetate in hexane) to give 4-(5-amino-1,3-dioxoisoindolin-2-yl)-2-(trifluoromethyl)benzonitrile 11 (200 mg, 39%) as a yellowish solid. Step 2: To a solution of amine intermediate 11 (20 mg, 0.06 mmol) in anhydrous DCM (1 mL) was added triethylamine (0.034 mL, 0.24 mmol) and ethanesulfonyl chloride (16 mg, 0.12 mmol) at 0° C. The reaction mixture was stirred at rt overnight. The reaction mixture was then diluted with DCM and washed with brine, dried over sodium sulfate, filtered and concentrated. The residue was purified by column chromatography (5% MeOH in DCM) to give EITM-1708 (9 mg, 35%) as a white solid. $^1$H NMR (600 MHz, DMSO-d$_6$) δ 10.81 (s, 1H), 8.37 (d, J=8.3 Hz, 1H), 8.17 (d, J=2.0 Hz, 1H), 8.03 (dd, J=8.3, 2.0 Hz, 1H), 7.99 (d, J=8.2 Hz, 1H), 7.72 (d, J=2.0 Hz, 1H), 7.65 (dd, J=8.3, 2.0 Hz, 1H), 3.34-3.29 (m, 2H), 1.23 (t, J=7.3 Hz, 3H). $^{19}$F NMR (564 MHz, DMSO-d$_6$) δ−60.95. ESI-MS: [M−H]$^−$ calcd for C$_{18}$H$_{11}$N$_3$O$_4$F$_3$S, 422.0; found, 422.0.

N-((3aR,4R,5R,7R,7 aS)-2-(4-cyano-3-(trifluoromethyl)phenyl)-4,7-dimethyl-1,3-dioxooctahydro-1H-4,7-epoxyisoindol-5-yl)-1H-indazole-3-carboxamide (EITM-1709). EITM-1709 was prepared form amine 7 in a similar manner to that described for EITM-1702. Racemic mixture obtained from 7 (20 mg, 0.053 mmol) as a white solid, yield 72% (20 mg). Separation of the two enantiomers was achieved by chiral HPLC using a ProntoSIL Chiral AX QN-1 column (150×8.0 mm, 5 μm) eluting with 50% isopropanol in hexane at 3 mL/min and 254 nm detection. EITM-1709 had a retention time of 16.8 min. $[\alpha]^{20}{}_D$=−5.5° (c=0.2, MeOH). $^1$H NMR (600 MHz, CDCl$_3$) δ 10.26 (s, 1H), 8.38 (d, J=8.2 Hz, 1H), 7.94 (d, J=8.4 Hz, 1H), 7.85 (d, J=2.0 Hz, 1H), 7.74 (dd, J=8.3, 2.0 Hz, 1H), 7.54 (dt, J=8.5, 0.9 Hz, 1H), 7.49-7.46 (m, 1H), 7.35-7.33 (m, 1H), 7.10 (d, J=8.0 Hz, 1H), 4.59-4.55 (m, 1H), 3.58 (d, J=7.2 Hz, 1H), 3.28 (d, J=7.2 Hz, 1H), 2.46 (dd, J=13.4, 11.6 Hz, 1H), 1.79 (dd, J=13.3, 5.0 Hz, 1H), 1.74 (s, 3H), 1.68 (s, 3H). $^{13}$C NMR (151 MHz, CDCl$_3$) δ 174.24, 173.48, 162.69, 141.38, 138.91, 135.80, 135.38, 133.85 (q, J=33.3 Hz), 129.49, 127.86, 124.38, 123.41, 122.49, 121.82, 121.80 (q, J=274.8 Hz), 114.76, 109.81, 109.64, 88.43, 85.77, 77.21, 77.00, 76.79, 56.72, 53.74, 48.34, 44.27, 18.34, 17.13. $^{19}$F NMR (564 MHz, CDCl$_3$): δ−62.08. ESI-MS: [M+Na]$^+$ calcd for C$_{26}$H$_{20}$N$_5$O$_4$F$_3$Na, 546.1; found, 546.1.

N-((3aR,4R,5R,7R,7aS)-2-(4-cyano-3-(trifluoromethyl)phenyl)-4,7-dimethyl-1,3-dioxooctahydro-1H-4,7-epoxyisoindol-5-yl)-5-(thiophen-2-yl)-1H-pyrazole-3-carboxamide (EITM-1710). EITM-1710 was prepared form amine 7 in a similar manner to that described for EITM-1702. Racemic mixture obtained from 7 (25 mg, 0.066 mmol) as a white solid, yield 68% (25 mg). Separation of the two enantiomers was achieved by chiral HPLC using a ProntoSIL Chiral AX QN-1 column (150×8.0 mm, 5 μm) eluting with 50% isopropanol in hexane at 3 mL/min and 254 nm detection. EITM-1710 had a retention time of 18.6 min. $[\alpha]^{20}{}_D$=−58.0° (c=0.5, MeOH). $^1$H NMR (600 MHz, CDCl$_3$) δ 7.92 (d, J=8.4 Hz, 1H), 7.82 (d, J=2.0 Hz, 1H), 7.71 (dd, J=8.3, 2.1 Hz, 1H), 7.37 (dd, J=5.1, 1.2 Hz, 1H), 7.30 (dd, J=3.6, 1.2 Hz, 1H), 7.10 (dd, J=5.1, 3.6 Hz, 1H), 7.01 (d, J=8.0 Hz, 1H), 6.96 (s, 1H), 4.56-4.52 (m, 1H), 3.54 (d, J=7.2 Hz, 1H), 3.28 (d, J=7.3 Hz, 1H), 2.41 (dd, J=13.3, 11.6 Hz, 1H), 1.78 (dd, J=13.3, 5.0 Hz, 1H), 1.70 (s, 3H), 1.65 (s, 3H). $^{13}$C NMR (151 MHz, CDCl$_3$) δ 174.30, 173.50, 161.70, 135.79, 135.37, 133.80 (q, J=33.7 Hz), 129.50, 128.11, 126.41, 125.28, 124.38, 121.79 (q, J=274.8 Hz), 114.78, 109.55, 103.78, 88.34, 85.77, 56.81, 53.65, 48.32, 43.96, 18.33, 17.10. $^{19}$F NMR (564 MHz, CDCl$_3$): δ−62.04. ESI-MS: [M+Na]$^+$ calcd for C$_{26}$H$_{20}$N$_5$O$_4$SF$_3$Na, 578.1; found, 578.0.

N-((3aR,4R,5R,7R,7 aS)-2-(4-cyano-3-(trifluoromethyl)phenyl)-4,7-dimethyl-1,3-dioxooctahydro-1H-4,7-epoxyisoindol-5-yl)-5-(furan-2-yl)-1H-pyrazole-3-carboxamide (EITM-1711). EITM-1711 was prepared form amine 7 in a similar manner to that described for EITM-1702. Racemic mixture obtained from 7 (25 mg, 0.066 mmol) as a white solid, yield 72% (20 mg). Separation of the two enantiomers was achieved by chiral HPLC using a ProntoSIL Chiral AX QN-1 column (150×8.0 mm, 5 μm) eluting with 50% isopropanol in hexane at 3 mL/min and 254 nm detection. EITM-1711 had a retention time of 16.1 min. $[\alpha]^{20}{}_D$=−56.0° (c=0.3, MeOH). $^1$H NMR (600 MHz, CDCl$_3$) δ 7.93 (d, J=8.4 Hz, 1H), 7.83 (d, J=2.0 Hz, 1H), 7.72 (dd, J=8.3, 2.0 Hz, 1H), 7.49 (dd, J=1.8, 0.7 Hz, 1H), 6.97 (brs, 2H), 6.68 (dd, J=3.4, 0.7 Hz, 1H), 6.53 (dd, J=3.4, 1.8 Hz, 1H), 4.54-4.50 (m, 1H), 3.54 (d, J=7.3 Hz, 1H), 3.30 (d, J=7.3 Hz, 1H), 2.42 (dd, J=13.3, 11.6 Hz, 1H), 1.77 (dd, J=13.2, 5.0 Hz, 1H), 1.70 (s, 3H), 1.66 (s, 3H). $^{13}$C NMR (151 MHz, CDCl$_3$) δ 174.28, 173.53, 161.69, 142.89, 135.79, 135.37, 133.83 (q, J=33.3 Hz), 129.50, 124.38, 121.80 (q, J=274.5 Hz), 114.76, 111.98, 109.61, 108.08, 102.22, 88.39, 85.77, 56.81, 53.67, 48.32, 44.04, 18.33, 17.06. $^{19}$F NMR (564 MHz, CDCl$_3$) δ−62.07. ESI-MS: [M+Na]$^+$ calcd for C$_{26}$H$_{20}$N$_5$O$_5$F$_3$Na, 562.1; found, 562.2.

N-((3aR,4R,5R,7R,7aS)-2-(4-cyano-2-methyl-3-(trifluoromethyl)phenyl)-4,7-dimethyl-1,3-dioxooctahydro-1H-4,7-epoxyisoindol-5-yl)-5-(1-hydroxyethyl)-1H-pyrazole-3-carboxamide (EITM-1712). EITM-1712 was prepared form amine 7 in a similar manner to that described for EITM-1702. Racemic mixture obtained from 7 (40 mg, 0.10 mmol) as a white solid, yield 56% (30 mg). Separation of the two enantiomers was achieved by chiral HPLC using a Pronto-SIL Chiral AX QD-1 (5 μm, 150×4.0 mm) eluting with 100% acetonitrile at 1 mL/min and 254 nm detection. EITM-1712 had a retention time of 4.5 min. $[\alpha]^{23}_D$=−28.0° (c=0.3, MeOH). $^1$H NMR (600 MHz, CD$_3$CN) δ 7.92 (d, J=8.8 Hz, 1H), 7.61 (d, J=8.3 Hz, 1H), 7.44 (d, J=9.1 Hz, 1H), 6.60 (s, 1H), 4.94 (q, J=6.6 Hz, 1H), 4.49-4.42 (m, 1H), 3.47 (d, J=7.1 Hz, 1H), 3.40 (d, J=7.0 Hz, 1H), 2.29 (q, J=2.2 Hz, 3H), 2.26 (d, J=12.3 Hz, 1H), 1.89-1.84 (m, 1H), 1.55 (s, 3H), 1.52 (s, 3H), 1.49 (d, J=6.5 Hz, 3H). $^{13}$C NMR (151 MHz, CD$_3$CN) δ 176.15, 175.68, 138.95, 134.86, 133.69, 116.99, 102.77, 88.79, 86.40, 57.57, 55.23, 50.26, 43.48, 23.80, 18.78, 17.84, 15.39. $^{19}$F NMR (564 MHz, CD$_3$CN) δ−57.6. APCI-MS: [M+H]$^+$ calcd for C$_{25}$H$_{25}$N$_5$O$_5$F$_3$, 532.2; found, 532.1.

3-(4-acetylpiperazin-1-yl)-N-((3aR,4R,5R,7R,7aS)-2-(4-cyano-3-(trifluoromethyl)phenyl)-4,7-dimethyl-1,3-dioxooctahydro-1H-4,7-epoxyisoindol-5-yl)propenamide (EITM-1716). EITM-1716 was prepared form amine 7 in a similar manner to that described for EITM-1702. Racemic mixture obtained from 7 (19 mg, 0.05 mmol) as a white solid, yield 14% (1.9 mg). $[\alpha]^{23}_D$=−10.0° (c=0.1, MeCN). Separation of the two enantiomers was achieved by chiral HPLC using a Chiralcel OD-H column (250×4.6 mm, 5 μm) eluting with 60%-90% isopropanol in hexane at 1 mL/min and 254 nm detection. EITM-1716 had a retention time of 11.5 min. $^1$H NMR (600 MHz, CD$_3$CN) δ 8.10 (d, J=8.3 Hz, 1H), 7.88 (s, 1H), 7.81 (dd, J=8.3, 2.0 Hz, 1H), 7.68 (broad, 1H), 4.26-4.22 (m, 1H), 3.55-3.50 (m, 2H), 3.48 (t, J=6, 2H), 3.41 (dd, J=7.2, 1.7 Hz, 1H), 3.24 (d, J=7.2 Hz, 1H), 2.78-2.55 (m, 2H), 2.55-2.42 (m, 3H), 2.41-2.27 (m, 3H), 2.22 (t, J=13.1 Hz, 1H), 2.00 (s, 3H), 1.59 (dd, J=13.1, 5.3 Hz, 1H), 1.54 (s, 3H), 1.49 (s, 3H). $^{13}$C NMR (151 MHz, CD3cn) δ 175.11, 174.41, 172.02, 168.57, 136.63, 136.06, 132.64, 132.37, 130.38, 124.63 (q, J=5.1 Hz), 115.11, 108.91, 87.60, 85.24, 56.32, 54.00, 53.78, 52.72, 52.23, 48.53, 45.98, 43.25, 41.07, 32.79, 20.53, 17.65, 16.63. $^{19}$F NMR (564 MHz, CD$_3$CN): δ−62.64. ESI-MS: [M+H]$^+$ calcd for C$_{27}$H$_{31}$N$_5$O$_5$F$_3$, 562.2277; found, 561.4.

1-acetyl-N-((3aR,4R,5R,7R,7aS)-2-(4-cyano-3-(trifluoromethyl)phenyl)-4,7-dimethyl-1,3-dioxooctahydro-1H-4,7-epoxyisoindol-5-yl)piperidine-4-carboxamide (EITM-1717). EITM-1717 was prepared form amine 7 in a similar manner to that described for EITM-1702. Racemic mixture obtained from 7 (19 mg, 0.05 mmol) as a white solid, yield 36% (4.9 mg). Separation of the two enantiomers was achieved by chiral HPLC using a Chiralcel OD-H column (250×4.6 mm, 5 μm) eluting with 40%-90% isopropanol in hexane at 1 mL/min and 254 nm detection. EITM-1717 had a retention time of 13.0 min. $[\alpha]^{23}_D$=−8.0° (c=0.2, MeCN). $^1$H NMR (600 MHz, CDCl$_3$) δ 7.95 (d, J=8.4 Hz, 1H), 7.86 (s, 1H), 7.74 (d, J=8.0 Hz, 1H), 5.81 (dd, J=22.3, 7.2 Hz, 1H), 4.59 (d, J=13.2 Hz, 1H), 4.31 (d, J=6.1 Hz, 1H), 3.90 (d, J=13.8 Hz, 1H), 3.42-3.22 (m, 1H), 3.15-3.10 (m, 2H), 2.67 (t, J=12.7 Hz, 1H), 2.31-2.37 (m, 2H), 2.11 (s, 3H), 1.97-1.81 (m, 2H), 1.79-1.66 (m, 1H), 1.63 (s, 3H), 1.60 (s, 3H). $^{13}$C NMR (151 MHz, CDCl$_3$) δ 174.37, 174.05, 173.33, 168.97, 135.72, 135.38, 129.44, 124.32 (q, J=5.1 Hz), 122.69, 120.87, 114.72, 109.66, 88.03, 85.56, 56.99, 53.64, 48.14, 45.77, 43.82, 43.23, 40.91, 29.03, 28.91, 28.65, 28.42, 21.45, 18.27, 16.97. $^{19}$F NMR (564 MHz, CDCl$_3$): δ−62.08. ESI-MS: [M−H]$^-$ calcd for C$_{26}$H$_{26}$N$_4$O$_5$F$_3$, 531.1855; found, 531.2.

Example 3. General Computational and Biological Methods

Molecular Docking and Induced Fit Docking. Molecular docking and induced fit docking (IFD) were carried out in Schrodinger Suite (Glide, Prime). The IFD is intended to circumvent the inflexible binding site requirement of grid-based docking through use of post docking refinement steps. Protein preparation is one of the most important steps in molecular docking and IFD. The three-dimensional atomic coordinates of WT AR-LBD in complex with DHT (PDB: 1T7R) were used to prepare receptor in the Protein Preparation module. Protein structure was optimized using OPLS3 force field. This structure was used for IFD of the ligands. Ligands for docking were prepared with LigPrep. The following steps were involved in IFD: a) each ligand was docked (Glide module) with the standard precision (SP) to produce 20 different poses (default setting), b) all side chains within a 5.0 Å radius of each docked ligand pose were searched using Prime side-chain sampling algorithm, c) defined regions of the protein-ligand complexes were minimized using OPLS3, d) the top scoring docked poses (based on GlideScore and Prime energy) were analyzed and compared.

Agonist docking was performed with the WT-AR-LBD (PDB ID: 1E3G) in complex with R1881 using Schrodinger Suite 2018-3 (Glide, Prime). For antagonists, a homology model of WT-AR-LBD in open conformation was built with Schrodinger Prime using the progesterone receptor (PDB ID: 2OVM) as a template.

Cell Culture and Treatments. The LNCaP cell line were obtained from ATCC, cultured in RPMI1640 (Corning) supplemented with 10% heat-inactivated GemCell bovine serum (Gemini Bio-Products) and Penicillin-Streptomycin (Gemini Bio-Products). Cell lines stably expressing ARE-luciferase (LNCaP-luc) was generated using Cignal *Lenti* AR Reporter (Qiagen) and was continuously cultured with 500 ng/mL Puromycin (Gibco) for positive selection. Cells were maintained at 37° C. in a humidified incubator with 5% carbon dioxide. All cell lines were authenticated using NIST approved short tandem repeat (STR) DNA profiling performed by the University of Arizona Genetics Core and routinely tested negative for *mycoplasma*.

PC3 and VCaP cell lines were obtained from ATCC and cultured as recommended. Generation and culture of PC3 GFP-AR cells were described previously (14). ARE-luciferase cells were generated using Cignal *Lenti* AR Reporter (Qiagen). Cell lines were authenticated using NIST-approved short tandem repeat DNA profiling and tested negative for *mycoplasma*. Drug treatments were conducted after overnight culture in phenol red-free media supplemented with charcoal:dextran stripped FBS.

Confocal Microscopy. PC3 GFP-AR cells were seeded and stained overnight with SiR-DNA (Cytochrome). Cells were treated 180 min with drug and 90 min with ligand and imaged on an Operetta CLS microscope (PerkinElmer).

Luciferase assay. LNCaP-luc cells were seeded in clear flat bottom white polystyrene 96-well plates (Corning) at a density of 12,000 cells/well. The next day, luciferase measurements were performed after 90 min drug+24 h competitive ligand (1 nM R1881) using GloMax 96 Microplate Luminometer (Promega). Dose-response curves were fit using the delta method and t-distribution (n=1). Compounds are tested up to 10 μM. The assay's coefficient of variation of 25% was estimated from seven experiments using three EITM drugs in both LNCaP-luc and PC3-luc cells.

LNCaP cell viability assay. Cells were seeded into 96-well fibronectin coated (1 ug/cm$^2$) plates (CellCarrier, PerkinElmer) at a density of 5,000 cells/well. After 48h, media was changed to phenol red free RPMI (Corning)+2% charcoal:dextran stripped FBS (Gemini Bio-Products) supplemented with 60 pM R1881 and EITM drugs as indicated in the figure legend. Drug-treated cells were lysed with CellTiter-Glo 3D Cell Viability Assay (Promega) and transferred to white 96-well plates (Corning). Luminescence was measured utilizing GloMax 96 Microplate Luminometer (Promega). Analysis was conducted in the R statistical environment (v 3.6.0). Mean fluorescence signal per condition (n=3) was used to calculate relative percent viability, scaling R1881 to 100% and starvation (no R1881) as 0%. Visualizations were facilitated by the ggplot2 package (v3.2.1), with standard error (S.E.) shown where appropriate.

Microsome stability assays. In vitro metabolism was determined as described previously. Specifically, to measure metabolism of parent compounds, the higher throughput protocol was applied, in which 0.5 mg/ml pooled human liver microsomes (Sigma) were mixed with 1 μM drugs and phosphate buffer (0.1 M, pH 7.4) in 96-well plates. Enzymatic reactions were started by adding 1 mM NADPH (Sigma Aldrich) followed by incubation at 37° C. Fractions were quenched by transfer to ice-cold acetonitrile after the indicated incubation times. Samples were analyzed using liquid chromatography-mass spectrometry (LC/MS-MS). Rates of intrinsic clearance were determined from the amount of the parent compound consumed per min per mg of microsomal protein as described previously. To analyze accumulating metabolites, the basic protocol was used, and microsomes were incubated with 10 μM drugs for 8 h.

Luminometer Assays. For ARE-luciferase, luciferase substrate was added to lysed cells after 24-h treatment. For viability, cells were lysed with CellTiter-Glo 3D Cell Viability Assay (Promega) after 6 d of treatment. Measurements were performed in 96-well plates (Corning) using a GloMax 96 Microplate Luminometer (Promega).

AR Binding. Ligand binding was analyzed using the PolarScreen AR Competitor Assay Kit, Green, according to the manufacturer's instructions (Thermo Fisher Scientific). Fluorescence polarization was measured after a 4-h incubation using an EnVision 2103 Multilabel Plate Reader (PerkinElmer).

RT-qPCR Array. RNA was isolated using the Illustra RNAspin Mini Kit (GE Healthcare). RNA was transcribed to cDNA using RT2 First Strand Kit (Qiagen). RT-qPCR was performed using Biorad CFX Connect on a RT2 Profiler PCR Array Human Androgen Receptor Signaling Targets (Qiagen).

Example 4. Pharmaceutical Dosage Forms

The following formulations illustrate representative pharmaceutical dosage forms that may be used for the therapeutic or prophylactic administration of a compound of a formula described herein, a compound specifically disclosed herein, or a pharmaceutically acceptable salt or solvate thereof (hereinafter referred to as 'Compound X'):

| (i) Tablet 1 | mg/tablet |
|---|---|
| 'Compound X' | 100.0 |
| Lactose | 77.5 |
| Povidone | 15.0 |
| Croscarmellose sodium | 12.0 |
| Microcrystalline cellulose | 92.5 |
| Magnesium stearate | 3.0 |
| | 300.0 |

| (ii) Tablet 2 | mg/tablet |
|---|---|
| 'Compound X' | 20.0 |
| Microcrystalline cellulose | 410.0 |
| Starch | 50.0 |
| Sodium starch glycolate | 15.0 |
| Magnesium stearate | 5.0 |
| | 500.0 |

| (iii) Capsule | mg/capsule |
|---|---|
| 'Compound X' | 10.0 |
| Colloidal silicon dioxide | 1.5 |
| Lactose | 465.5 |
| Pregelatinized starch | 120.0 |
| Magnesium stearate | 3.0 |
| | 600.0 |

| (iv) Injection 1 (1 mg/mL) | mg/mL |
|---|---|
| 'Compound X' (free acid form) | 1.0 |
| Dibasic sodium phosphate | 12.0 |
| Monobasic sodium phosphate | 0.7 |
| Sodium chloride | 4.5 |
| 1.0N Sodium hydroxide solution (pH adjustment to 7.0-7.5) | q.s. |
| Water for injection | q.s. ad 1 mL |

| (v) Injection 2 (10 mg/mL) | mg/mL |
|---|---|
| 'Compound X' (free acid form) | 10.0 |
| Monobasic sodium phosphate | 0.3 |
| Dibasic sodium phosphate | 1.1 |
| Polyethylene glycol 400 | 200.0 |
| 0.1N Sodium hydroxide solution (pH adjustment to 7.0-7.5) | q.s. |
| Water for injection | q.s. ad 1 mL |

| (vi) Aerosol | mg/can |
|---|---|
| 'Compound X' | 20 |
| Oleic acid | 10 |
| Trichloromonofluoromethane | 5,000 |
| Dichlorodifluoromethane | 10,000 |
| Dichlorotetrafluoroethane | 5,000 |

| (vii) Topical Gel 1 | wt. % |
|---|---|
| 'Compound X' | 5% |
| Carbomer 934 | 1.25% |
| Triethanolamine (pH adjustment to 5-7) | q.s. |
| Methyl paraben | 0.2% |
| Purified water | q.s. to 100 g |

| (viii) Topical Gel 2 | wt. % |
|---|---|
| 'Compound X' | 5% |
| Methylcellulose | 2% |
| Methyl paraben | 0.2% |
| Propyl paraben | 0.02% |
| Purified water | q.s. to 100 g |

| (ix) Topical Ointment | wt. % |
|---|---|
| 'Compound X' | 5% |
| Propylene glycol | 1% |
| Anhydrous ointment base | 40% |
| Polysorbate 80 | 2% |
| Methyl paraben | 0.2% |
| Purified water | q.s. to 100 g |

| (x) Topical Cream 1 | wt. % |
|---|---|
| 'Compound X' | 5% |
| White bees wax | 10% |
| Liquid paraffin | 30% |
| Benzyl alcohol | 5% |
| Purified water | q.s. to 100 g |

| (xi) Topical Cream 2 | wt. % |
|---|---|
| 'Compound X' | 5% |
| Stearic acid | 10% |
| Glyceryl monostearate | 3% |
| Polyoxyethylene stearyl ether | 3% |
| Sorbitol | 5% |
| Isopropyl palmitate | 2% |
| Methyl Paraben | 0.2% |
| Purified water | q.s. to 100 g |

These formulations may be prepared by conventional procedures well known in the pharmaceutical art. It will be appreciated that the above pharmaceutical compositions may be varied according to well-known pharmaceutical techniques to accommodate differing amounts and types of active ingredient 'Compound X'. Aerosol formulation (vi) may be used in conjunction with a standard, metered dose aerosol dispenser. Additionally, the specific ingredients and proportions are for illustrative purposes. Ingredients may be exchanged for suitable equivalents and proportions may be varied, according to the desired properties of the dosage form of interest.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A compound of Formula I:

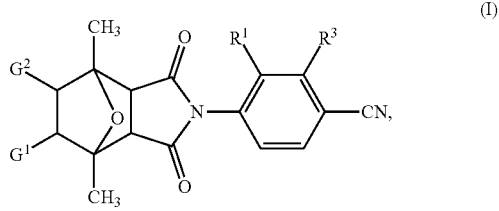

or a salt thereof;
wherein
$G^1$ is $NHR^4$;
$G^2$ is H or OH;
$R^4$ is $-C(=O)(C_1-C_6)$alkyl, wherein $R^4$ is substituted with one or more substituents selected from alkoxy, halo, haloalkyl, hydroxy, hydroxyalkyl, aryl, heteroaryl, heterocycle, cycloalkyl, amino, alkylamino, nitro, trifluoromethoxy, carboxy, carboxyalkyl, and cyano;
$R^1$ is H, halo, or $-(C_1-C_6)$alkyl; and
$R^3$ is $CF_3$ or halo.

2. The compound of claim 1, wherein the compound is dextrorotatory.

3. The compound of claim 1, wherein the compound is levorotatory.

4. The compound or salt of claim 1, wherein $G^2$ is H.

5. The compound or salt of claim 1, wherein $R^1$ is H.

6. The compound or salt of claim 1, wherein $R^3$ is $CF_3$.

7. The compound or salt of claim 1, wherein $R^4$ is $-C(=O)(C_1-C_3)$alkyl, wherein $R^4$ is substituted with one or more substituents selected from alkoxy, halo, haloalkyl, hydroxy, hydroxyalkyl, aryl, heteroaryl, heterocycle, cycloalkyl, amino, alkylamino, nitro, trifluoromethoxy, carboxy, carboxyalkyl, and cyano.

8. The compound or salt of claim 1, wherein $R^4$ is substituted with one or more substituents selected from halo, haloalkyl, hydroxy, aryl, heteroaryl, heterocycle, cycloalkyl, amino, and cyano.

9. The compound or salt of claim 8, wherein $R^4$ is substituted with one or more substituents selected from heteroaryl and heterocycle.

10. The compound or salt of claim 9, wherein $R^4$ is substituted with one or more substituents selected from heteroaryl.

11. The compound or salt of claim 9, wherein $R^4$ is substituted with one or more substituents selected from comprising heterocycle.

12. A pharmaceutical composition comprising the compound of claim 1 and a pharmaceutically acceptable diluent or carrier.

13. A compound of Formula IB:

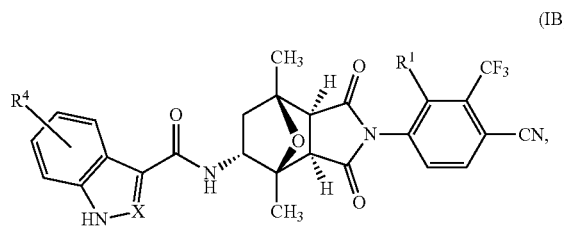

(IB)

or a salt thereof; or an enantiomer thereof;
wherein
X is CH or N;
$R^1$ is H, F, methyl, or ethyl; and
$R^4$ is H, —C(=O)CH$_3$, or —C(OH)CH$_3$.

14. The compound of claim 13, wherein the compound is:

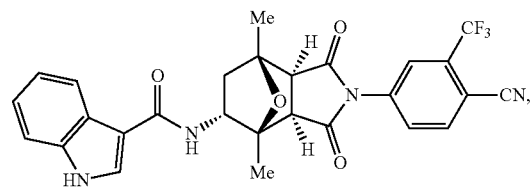 [SMILES: C[C@]12O[C@](C)(C[C@H]1NC(=O)c1c[nH]c3ccccc13)[C@H]1C(=O)N(c3ccc(C#N)c(C(F)(F)F)c3)C(=O)[C@H]12]

or a salt thereof; or an enantiomer thereof.

15. The compound of claim 13, wherein the compound is:

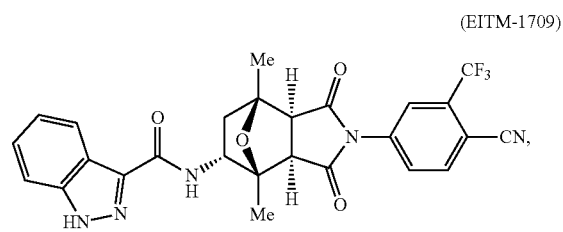 [SMILES: C[C@]12O[C@](C)(C[C@H]1NC(=O)c1n[nH]c3ccccc13)[C@H]1C(=O)N(c3ccc(C#N)c(C(F)(F)F)c3)C(=O)[C@H]12]

(EITM-1709)

or a salt thereof, or an enantiomer thereof.

16. The compound:

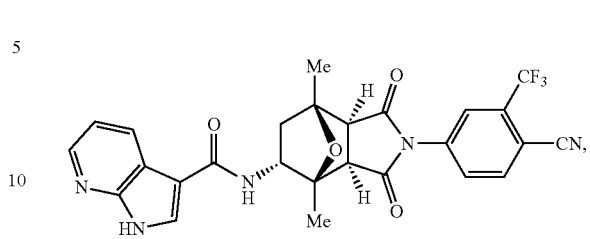

or a salt thereof; or an enantiomer thereof.

17. A method for treatment of cancer in a subject in need thereof, comprising administering to the subject an effective amount of the compound of claim 1, thereby treating the cancer.

18. The method of claim 17, wherein the cancer is prostate cancer or breast cancer.

19. The method of claim 18, wherein the cancer is prostate cancer, and wherein the prostate cancer is lethal castration-resistant prostate cancer.

20. The method of claim 17, wherein an effective serum concentration of the compound is about 1 nanomolar (nM) to about 2000 nM.

21. The method of claim 17, wherein the administering comprises infusion, injection, oral administration, or a combination thereof.

22. The method of claim 17, wherein the compound is an antagonist of the androgen receptor.

* * * * *